(12) United States Patent
Huesgen et al.

(10) Patent No.: US 12,472,319 B2
(45) Date of Patent: Nov. 18, 2025

(54) METHOD AND APPARATUS FOR PREDICITING NEUROLOGICAL OUTCOME POST-CARDIAC ARREST

(71) Applicant: UNIVERSITY OF FLORIDA RESEARCH FOUNDATION, INCORPORATED, Gainesville, FL (US)

(72) Inventors: Karl Wilhelm Huesgen, Gainesville, FL (US); Joseph A. Tyndall, Gainesville, FL (US); Kevin K. Wang, Gainesville, FL (US); Zhihui Yang, Gainesville, FL (US); Yasmeen O. Elmelige, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 1115 days.

(21) Appl. No.: 17/172,668

(22) Filed: Feb. 10, 2021

(65) Prior Publication Data
US 2021/0260319 A1  Aug. 26, 2021

Related U.S. Application Data

(60) Provisional application No. 62/972,339, filed on Feb. 10, 2020.

(51) Int. Cl.
*G01N 33/68* (2006.01)
*A61M 16/00* (2006.01)
(Continued)

(52) U.S. Cl.
CPC ....... *A61M 16/026* (2017.08); *G01N 33/6896* (2013.01); *G16H 10/40* (2018.01);
(Continued)

(58) Field of Classification Search
CPC ............ A61M 16/026; A61M 2230/00; A61M 16/024; G01N 33/6896; G01N 2800/2871;
(Continued)

(56) References Cited

U.S. PATENT DOCUMENTS

| 2022/0074954 A1* | 3/2022 | Adlbrecht | G01N 33/6896 |
| 2022/0344059 A1* | 10/2022 | Clark | G16H 50/30 |
| 2024/0302359 A1* | 9/2024 | Debad | G01N 33/5308 |

OTHER PUBLICATIONS

Elmelige, Y., Yang, Z., Chowdhury, M., Holland, A., Gul, S., Cohen, S. A., . . . Wilkerson, G. (2019). c Academic Emergency Medicine, 26, S30. doi:http://dx.doi.org/1 (Year: 2019).*

(Continued)

*Primary Examiner* — Jesse P Frumkin
(74) *Attorney, Agent, or Firm* — Timothy H. Van Dyke; WOLTER, VAN DYKE, DAVIS, PLLC

(57) ABSTRACT

A method is provided for predicting a neurological outcome of a patient post-cardiac arrest. The method includes obtaining, on a processor, first data that indicates values for two or more neurological biomarkers collected from the patient during a first time period following a cardiac arrest. The method also includes obtaining, on the processor, subsequent data that indicates values for the two or more neurological biomarkers collected at a subsequent time period after the first time period following the cardiac arrest. The method also includes determining, on the processor, third data that indicates a prediction of a neurological outcome of the patient during a treatment of the patient based on the first data and the subsequent data. A system is also provided for using a composite score that is formed with the combined use of the values for two or more biomarkers making a prediction of a neurological outcome of a patient post-cardiac arrest.

12 Claims, 34 Drawing Sheets

(51) Int. Cl.
*G16H 10/40* (2018.01)
*G16H 50/30* (2018.01)

(52) U.S. Cl.
CPC ......... *G16H 50/30* (2018.01); *A61M 2230/00* (2013.01); *G01N 2800/2871* (2013.01); *G01N 2800/325* (2013.01); *G01N 2800/52* (2013.01)

(58) Field of Classification Search
CPC ......... G01N 2800/325; G01N 2800/52; G16H 10/40; G16H 50/30; G16H 20/17; G16H 20/30; G16H 20/40; G16H 40/67; G16H 50/20; A61B 5/4836
See application file for complete search history.

(56) References Cited

OTHER PUBLICATIONS

Cronberg, T. et al., "Neuron-specific enolase correlates with other prognostic markers after cardiac arrest", Neurology, Nov. 14, 2011, 3 pages, Abstract Only.

Ebner, FLorian et al., "Serum GFAP and UCH-L1 for the prediction of neurological outcome in comatose cardiac arrest patients", Resuscitation, 2020, vol. 154, pp. 61-68.

Gul, S.S. et al., "Prognostic utility of neuroinjury biomarkers in post out-of-hospital cardiac arrest (OHCA) patient management", Medical Hypotheses, 2017, vol. 105, pp. 34-47.

Mattsson, Niklas et al., "Serum Tau and Neurological Outcome in Cardiac Arrest", Ann Neurol, 2017, vol. 82, pp. 665-675.

Moseby-Knappe, Marion et al., "Serum Neurofilament Light Chain for Prognosis of Outcome After Cardiac Arrest", JAMA Neurol, Jan. 2019, vol. 76, No. 1, pp. 64-71.

Reis, Cesar et al., "Pathophysiology and the Monitoring Methods for Cardiac Arrest Associated Brain Injury", Int. J. Mol. Sci., 2017, vol. 18, No. 129, 18 pages.

Sandroni, Claudio et al., "Predictors of poor neurological outcome in adult comatose survivors of cardiac arrest: A systematic review and meta-analysis. Part 2: Patients treated with therapeutic hypothermia", Elsevier, Oct. 2012, vol. 84, Issue 10, pp. 1324-1338.

Stammet MD, Pascal et al., "Modeling Serum Level of S100, and Bispectral Index to Predict Outcome After Cardiac Arrest", Journal of the American College of Cardiology, 2013, vol. 62, No. 9, pp. 851-858.

Stammet MD, Pascal et al., "Neuron-Specific Enolase as a Predictor of Death or Poor Neurological Outcome After Out-of-Hospital Cardiac Arrest and Targeted Temperature Management at 33 C and 36 C", Journal of the American College of Cardiology, 2015, vol. 65, No. 19, pp. 2104-2114.

Wang, Kevin K. et al., "An update on diagnostic and, prognostic biomarkers for traumatic brain injury", Expert Review of Molecular Diagnostics, 2018, 16 pages.

Zhou, Sonya E. et al., "Distinct Predictive Values of Current Neuroprognostic Guidelines in Post-Cardiac Arrest Patients", Resuscitation, Jun. 2019, 16 pages.

Elmer et al., "Association of early withdrawal of life-sustaining therapy for perceived neurological prognosis with mortality after cardiac arrest", Resuscitation. May 2016 ; 102: 127-135. doi: 10.1016/j.resuscitation.2016.01.016.

\* cited by examiner

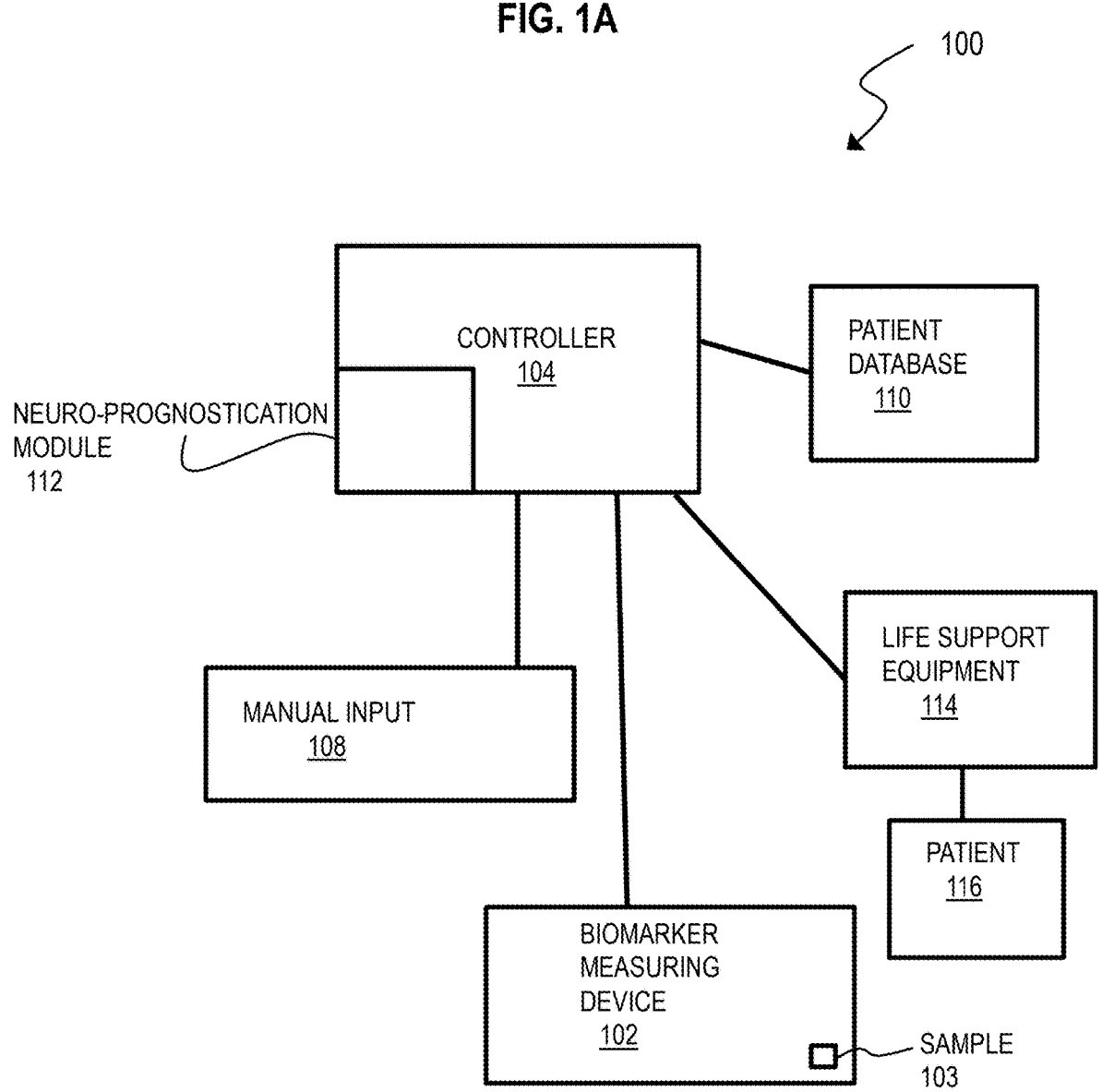

120

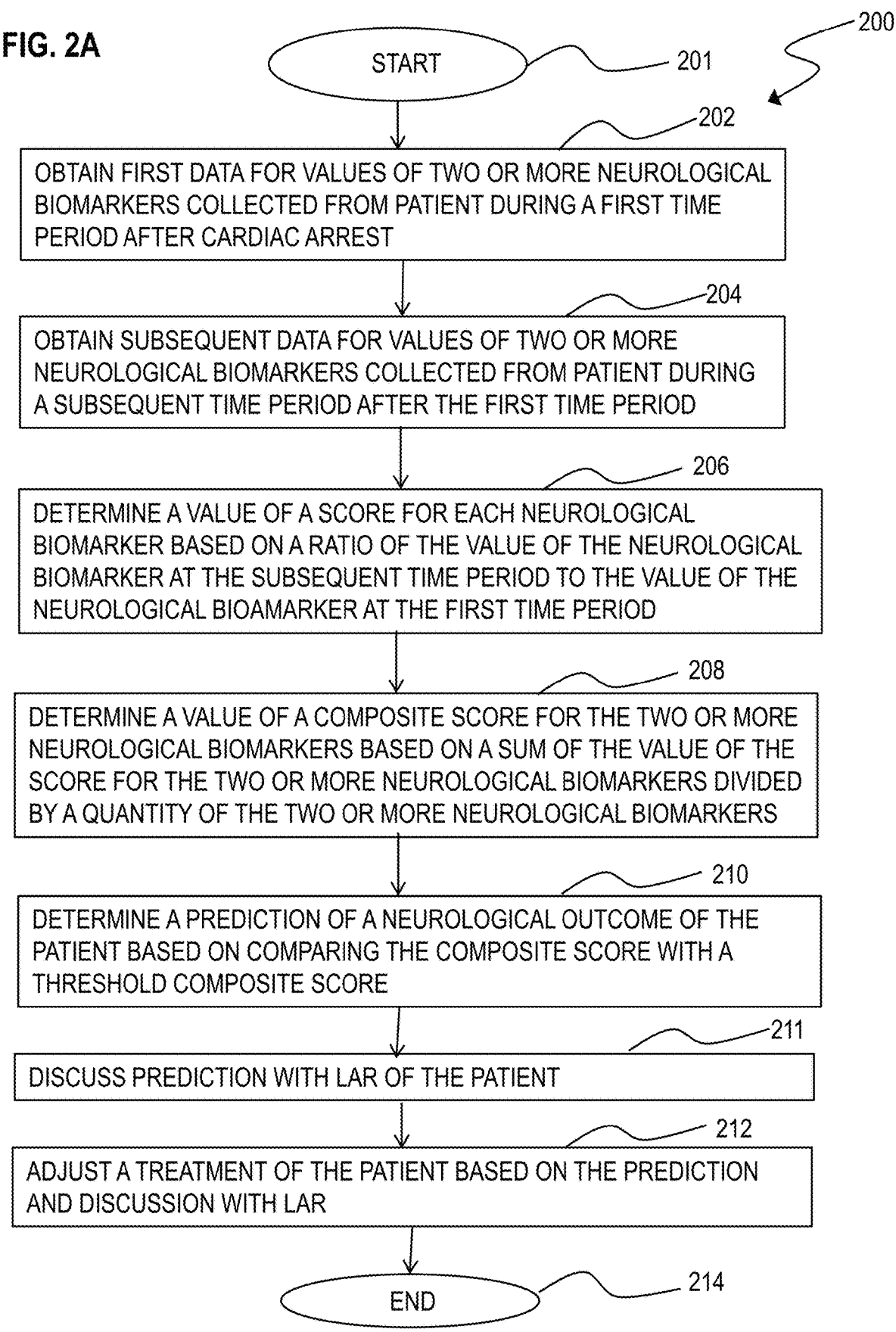

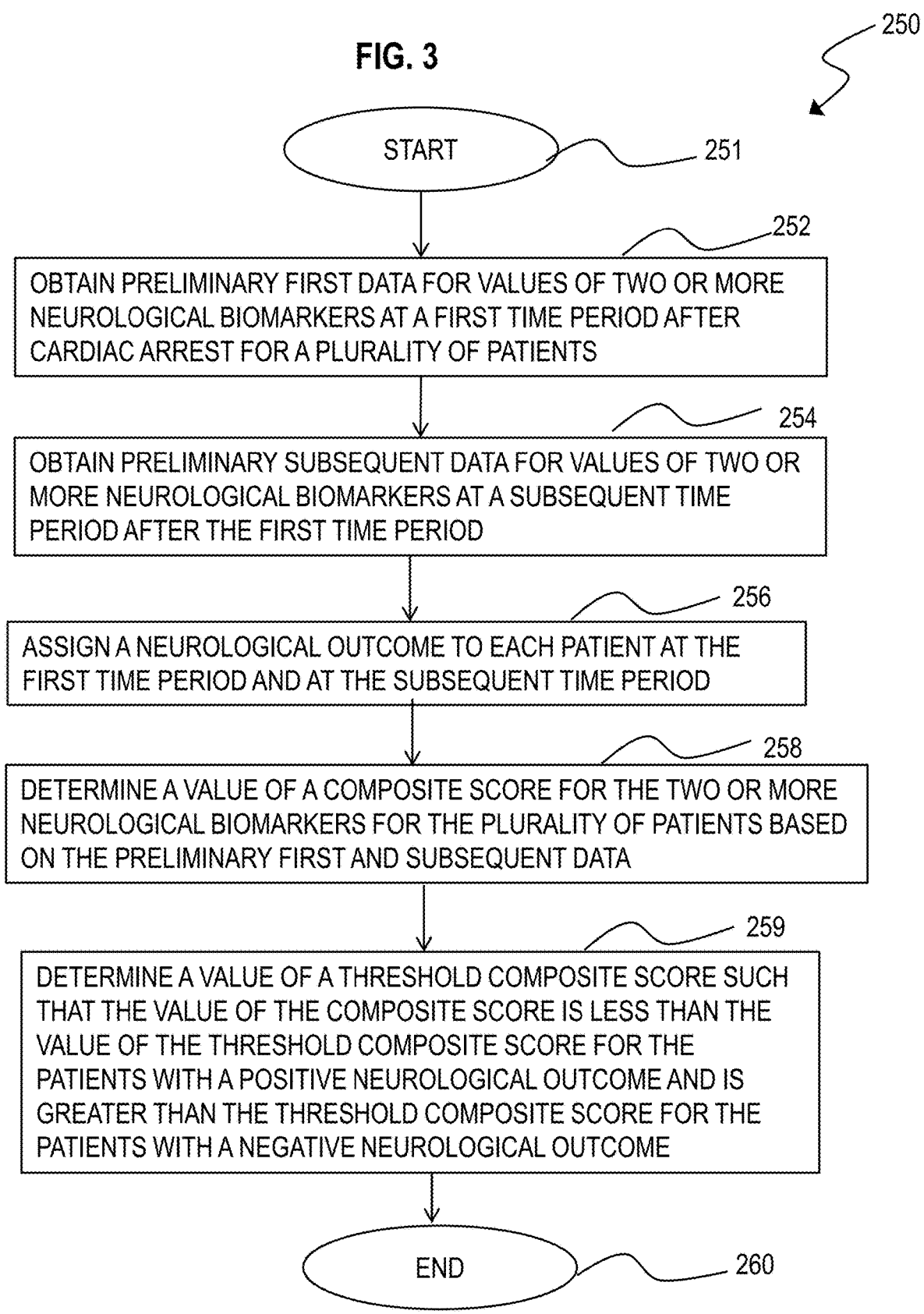

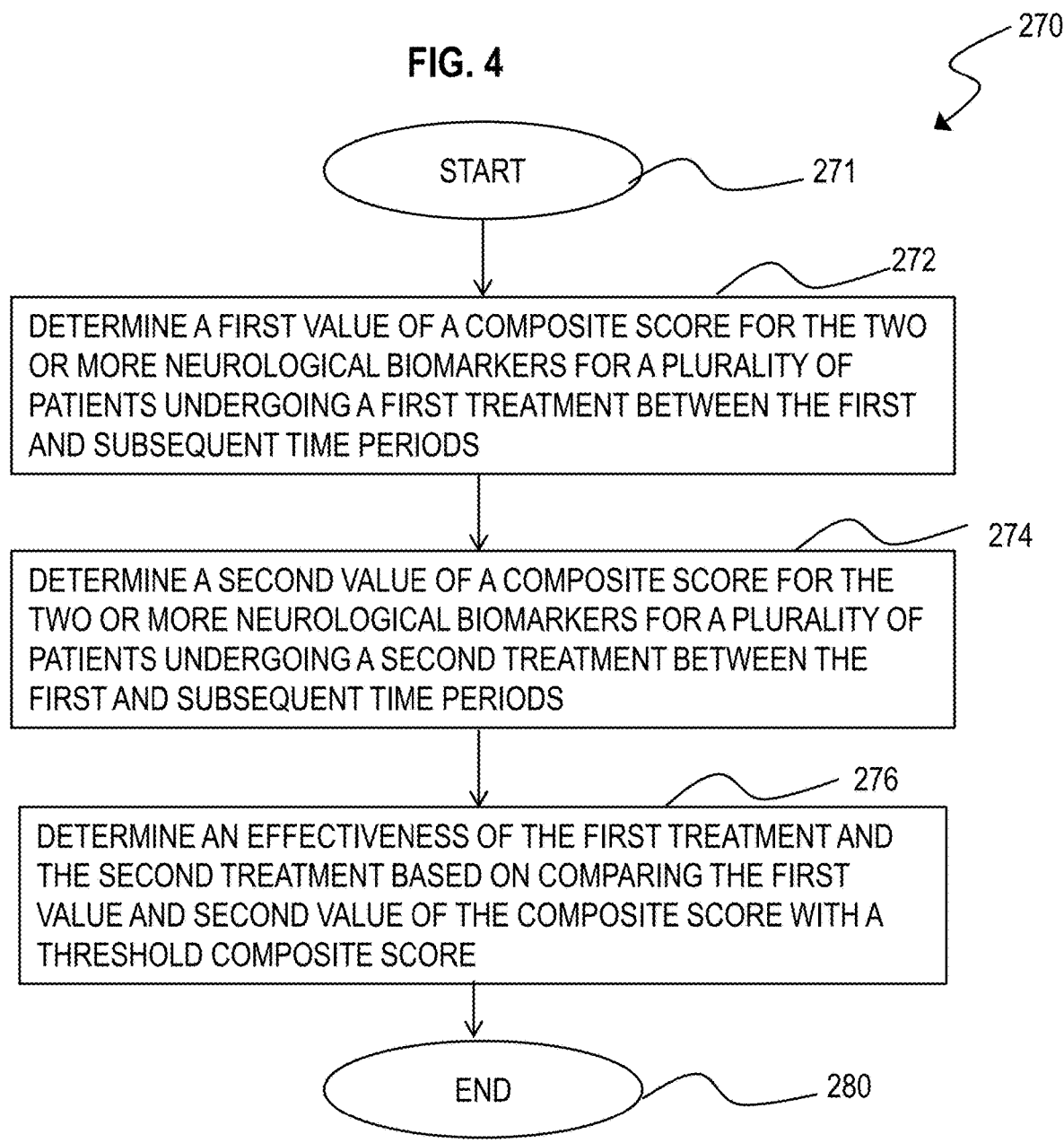

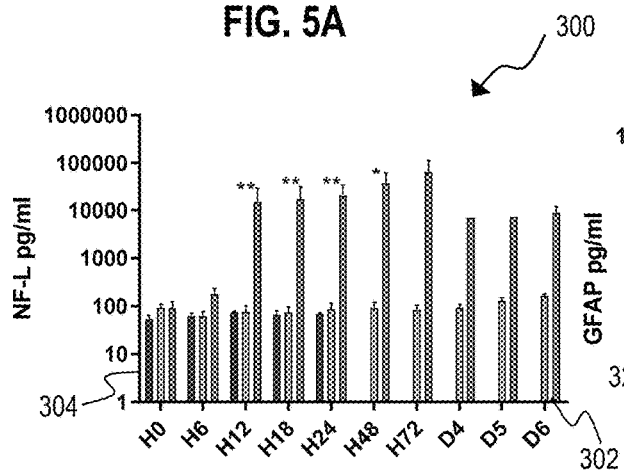
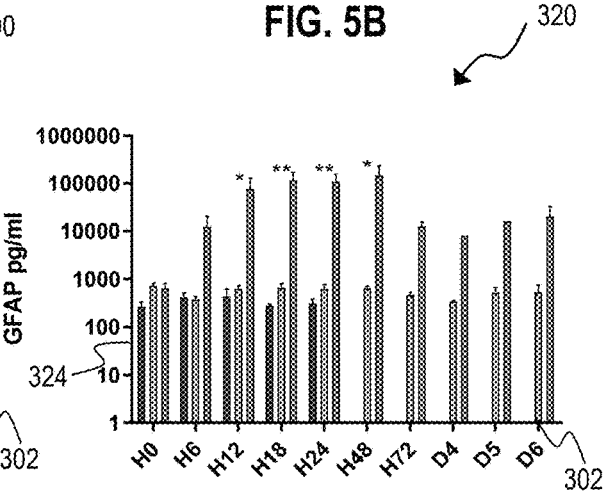
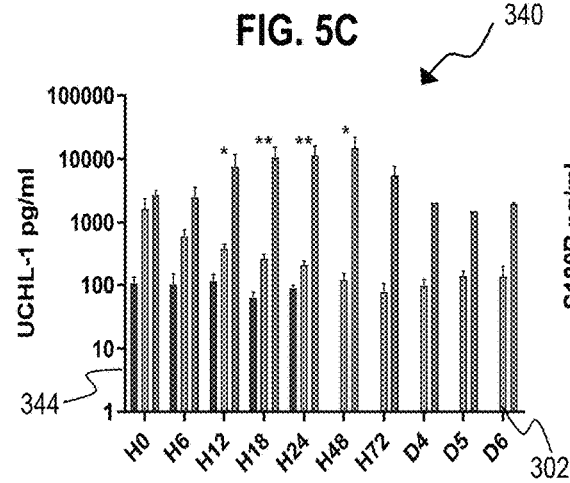
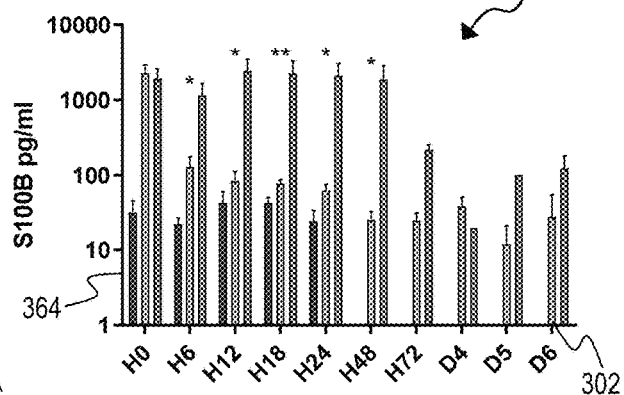
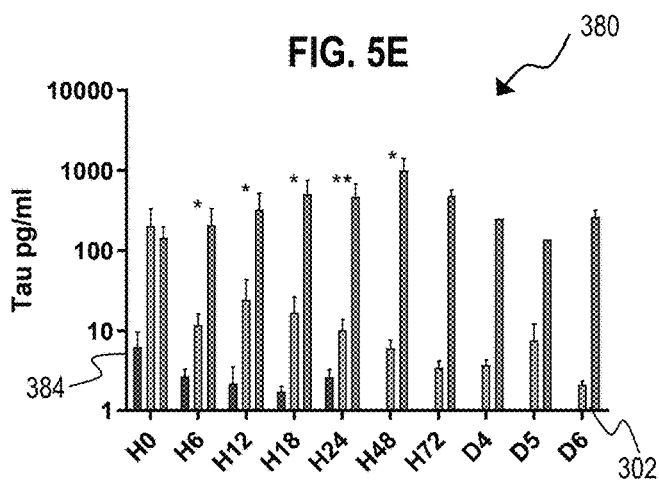

METHOD AND APPARATUS FOR PREDICITING NEUROLOGICAL OUTCOME POST-CARDIAC ARREST

BACKGROUND

The American Heart Association estimates that approximately 347,000 adult patients suffer an out-of-hospital cardiac arrest (OHCA) in the U.S. each year. Although there has been improvement in the overall rates of survival, only about 10% of those patients who suffer an OHCA survive to discharge from a hospital and only 10% of those discharged patients maintain a good neurological outcome post-discharge.

SUMMARY

The inventors of the present invention recognized that various conventional methods are available for predicting a neurological outcome of a patient who has suffered an OHCA. In one conventional method, one or more factors are considered (e.g. whether the OHCA was witnessed by another party, whether chest compressions were performed, whether drugs such as epinephrine were administered to restart circulation, whether shock therapy was performed, etc.) in predicting the neurological outcome of the patient who has suffered an OHCA. Additionally, this conventional method also performs various functional tests (e.g. cold calorics testing—instilling cold water in the ear and observing ocular deviation), performing an EEG to determine if organized electrical activity or static activity is observed, a radiologic scan of the brain to observe an amount of gray matter around the cerebral cortex to assess a degree of grey-white matter differentiation, etc. The inventors observed that these conventional methods are limited since they provide a qualitative assessment of current neurological function with outcomes at a future time based on a subjective assessment of how many of these factors and/or functional tests indicate a good neurological outcome. The inventors of the present invention recognized that this conventional method does not allow for a quantifiable prediction model for neurological outcomes but is largely limited to a subjective assessment of brain death based upon limited data. Additionally, the inventors of the present invention recognized that these conventional methods can routinely result in premature withdrawal of care from patients, where as many as 64% may have the possibility of functional recovery (See J. Elmer, C. Torres, TP Aufderheide, "Association of early withdrawal of life-sustaining therapy for perceived neurological prognosis with mortality after cardiac arrest", *Resuscitation.* 2016 May; 102:127-35., which is incorporated by reference herein). Accordingly, the inventors of the present invention developed a biomarker based model for assisting in the prediction of neurological outcomes with a focus on patients suffering anoxic brain injury after OHCA but which may be widely applicable to the assessment of anoxic brain injury and neurological resuscitation.

The inventors of the present invention also recognize that various biomarkers currently exist and are measured as a marker in the assessment of traumatic brain injury through the measurement of a neurological biomarker with comparison to a specific threshold (See S. S. Gul, K. W. Huesgen, K. K. Wang, K. Mark, J. A. Tyndall, "Prognostic utility of neuroinjury biomarkers in post out-of-hospital cardiac arrest (OHCA) patient management", *Medical Hypothesis,* 105 (2017) 34-47, which is incorporated by reference herein). However, the inventors of the present invention recognized that in assessing ischemic brain injury, predictions have limited accuracy with the use of a single biomarker. Thus, the inventors of the present invention developed the system and method which enhances the prediction of the neurological outcome of the patient, by using patterns of elevation of two or more neurological biomarkers and in some embodiments five neurological biomarkers. Additionally, the inventors of the present invention recognized that the prediction would be further limited with the measurement of neurological biomarker activity at one time period with comparison of this measured level with a threshold level [Gul et al.]. Thus, the inventors of the present invention developed the system and method which enhances the prediction of the neurological outcome of the patient, by measuring the level of multiple neurological biomarkers at multiple time periods after the OHCA and uses the levels of the neurological biomarkers at the multiple time periods to determine the prediction.

In a first set of embodiments, a method is provided for predicting a neurological outcome of a patient post-cardiac arrest. The method includes obtaining, on a processor, first data that indicates values for two or more neurological biomarkers collected from the patient during a first time period following a cardiac arrest. The method also includes obtaining, on the processor, subsequent data that indicates values for the two or more neurological biomarkers collected at a subsequent time period after the first time period following the cardiac arrest. The method also includes determining, on the processor, third data that indicates a prediction of a neurological outcome of the patient during a treatment of the patient based on the first data and the subsequent data.

In a second set of embodiments, a method is provided for determining a model for predicting the neurological outcome of the patient post-cardiac arrest. The method includes obtaining, on a processor, preliminary first data that indicates values for two or more neurological biomarkers at the first time period after the cardiac arrest during treatment of a plurality of patients. The method also includes obtaining, on the processor, preliminary subsequent data for the values of the two or more neurological biomarkers at the subsequent time period during the treatment. The method also includes determining, on the processor, the value of the composite score for the two or more neurological biomarkers for the plurality of patients. The method also includes assigning, on the processor, a neurological outcome to each patient at the first time period and the subsequent time period. The method also includes determining, on the processor, the value of the threshold composite score such that the value of the composite score is less than the value of the threshold composite score for the patients with a good neurological outcome at the subsequent time period and the value of the composite score is greater than the value of the threshold composite score for the patients with a bad neurological outcome at the subsequent time period.

In a third set of embodiments, an apparatus is provided for predicting a neurological outcome of a patient post-cardiac arrest. The apparatus includes a device configured to measure first data that indicates values for two or more neurological biomarkers collected from a patient during a first time period following a cardiac arrest. The device is further configured to measure subsequent data that indicates values for the two or more neurological biomarkers collected from the patient during a subsequent time period after the first time period. The apparatus further includes a processor connected to the device to receive the first data and the subsequent data. The apparatus further includes a memory including one or more sequence of instructions. The memory and the sequence of instructions is configured to, with the processor, cause the apparatus to determine a value of a score for each neurological biomarker based on a ratio of the value of the neurological biomarker at the subsequent time period to the value of the neurological biomarker at the first time period. The memory and sequence of instructions is further configured to cause the apparatus to determine a value of a composite score for the two or more neurological biomarkers based on a sum of the value of the score for the two or more neurological biomarkers divided by a quantity of the two or more neurological biomarkers. The memory and sequence of instructions is further configured to cause the apparatus to determine a prediction of a neurological outcome of the patient during a treatment of the patient based on comparing the value of the composite score with a value of a threshold composite score such that a good neurological outcome is based on the value of the composite score being less than the value of the threshold composite score and a bad neurological outcome is based on the value of the composite score being greater than the value of the threshold composite score.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram that illustrates an example of an apparatus for predicting a neurological outcome of a patient after a cardiac arrest, according to one embodiment;

FIG. 2 is a flow diagram that illustrates an example of a method for predicting a neurological outcome of a patient post cardiac arrest, according to one embodiment;

FIG. 3 is a flow diagram that illustrates an example of a method for determining a model for predicting a neurological outcome of a patient post cardiac arrest, according to one embodiment;

FIG. 4 is a flow diagram that illustrates an example of a method for determining an effectiveness of a treatment of a patient post cardiac arrest, according to one embodiment;

FIGS. 5A-5E illustrate an example of histograms that illustrate an example of a plurality of neurological biomarker levels at different time periods after cardiac arrest for a sample of patients, according to one embodiment;

FIGS. 16A-E. Serum biomarker levels for these groups are depicted (mean and 95% confidence interval depicted by solid line and dotted line, respectively). Composite score based on four biomarkers (formed using values for UCH-L1, GFAP, NF-L and Tau) trajectory assortment is depicted in FIG. 16F (mean and 95% confidence interval). FIG. 16G and FIG. 16H demonstrate concordance between trajectory-derived classification and neurologic outcome.

Legend: Solid line: mean; dotted line: 95% confidence interval.

FIG. 17: Receiver-operator characteristic (ROC) curves for individual biomarkers at post-injury times. (A) H0, (B) H6, (C) H12, (D) H18, (E) H24, (F) D2, (G) D3.

Figure 18:
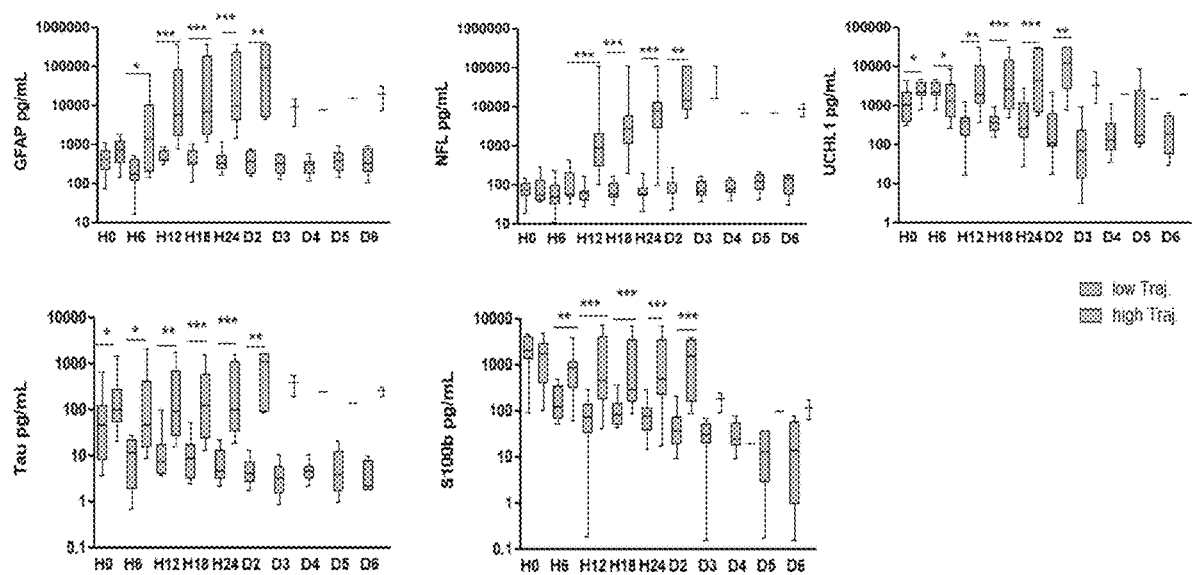

FIG. 18: Serum biomarker concentrations for low- and high-trajectory classes. Median is depicted as a line, range as box, and whiskers as full data range.

Figure 19:
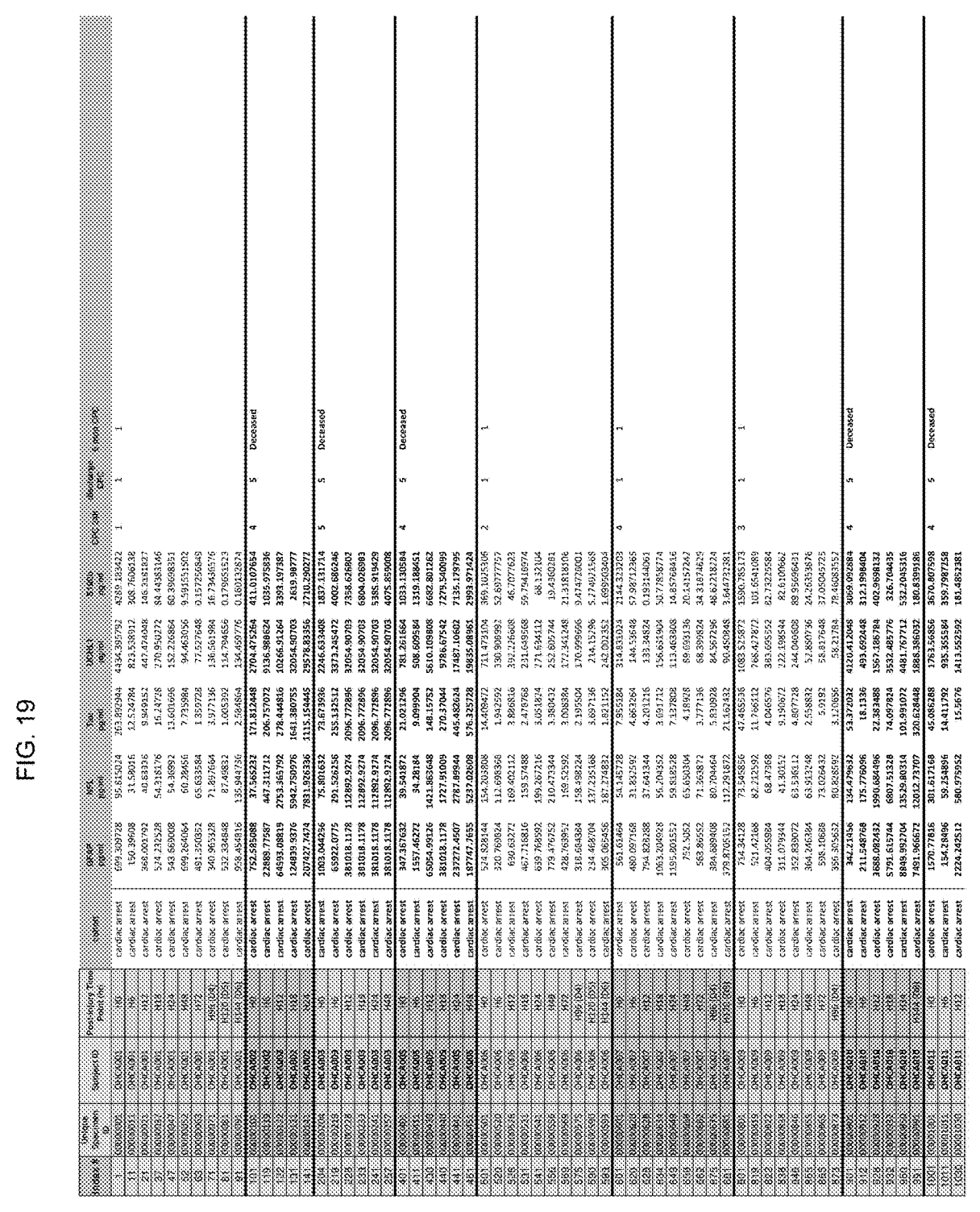
Figure 19:
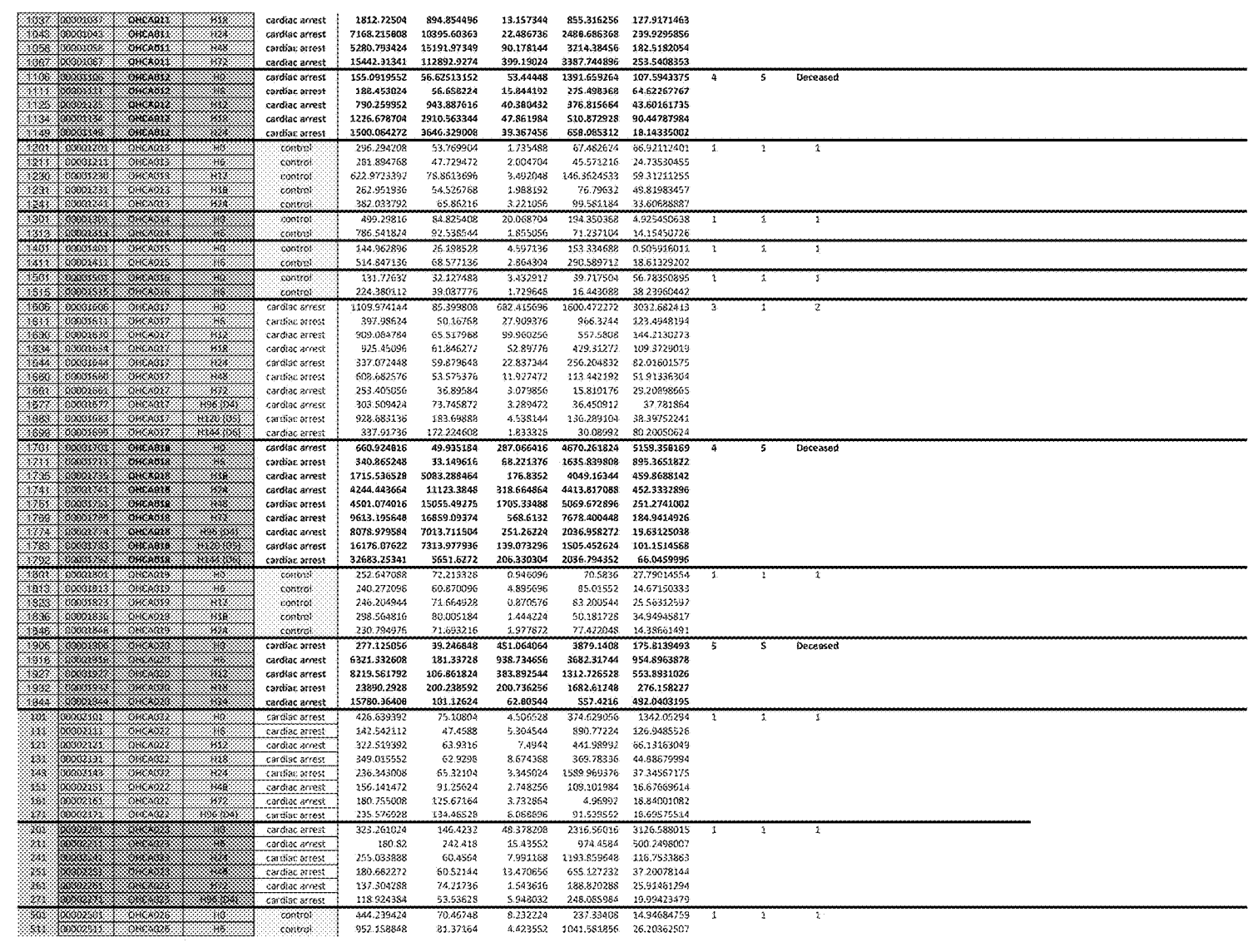
Figure 19:
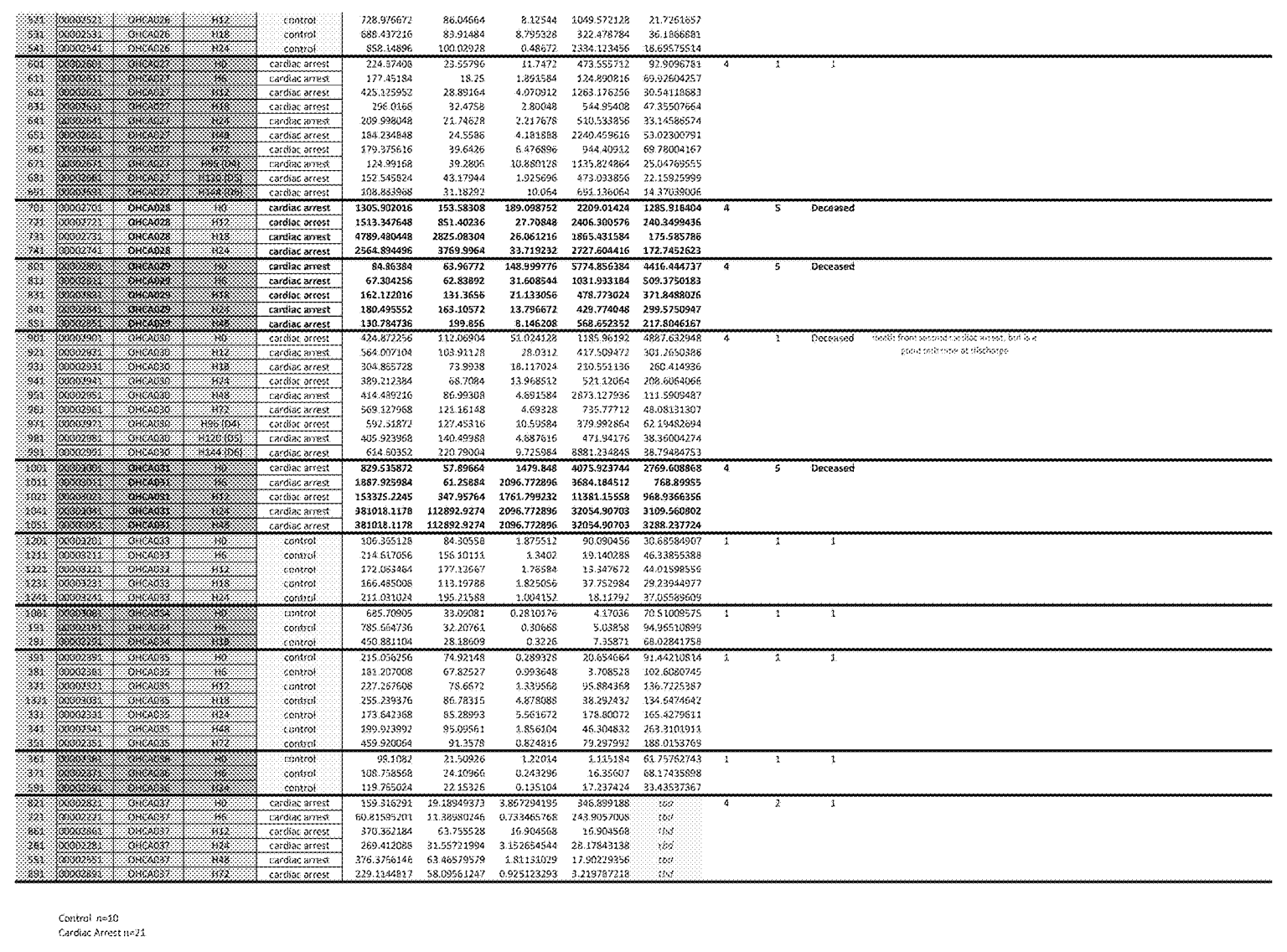

FIG. 19 provides a table of preliminary first data and preliminary subsequent data obtained from a plurality of patients.

DETAILED DESCRIPTION

A method and apparatus are described for predicting a neurological outcome of a patient after suffering a medical condition, such as an OHCA. For purposes of the following description, "neurological outcome" is defined by a Cerebral Performance Categories (CPC) scale. Table 1 below provides a description of each integer scale value of CPC from 1 to 5.

TABLE 1

Cerebral Performance Categories Scale
CPC Scale

Note: If patient is anesthetized, paralyzed, or intubated, use "as is" clinical condition to calculate scores.
CPC 1. Good cerebral performance: conscious, alert, able to work, might have mild neurologic or psychologic deficit.
CPC 2. Moderate cerebral disability: conscious, sufficient cerebral function for independent activities of daily life. Able to work in sheltered environment.
CPC 3. Severe cerebral disability: conscious, dependent on others for daily support because of impaired brain function. Ranges from ambulatory state to severe dementia or paralysis.
CPC 4. Coma or vegetative state: any degree of coma without the presence of all brain death criteria. Unawareness, even if appears awake (vegetative state) without interaction with environment; may have spontaneous eye opening and sleep/awake cycles. Cerebral unresponsiveness.
CPC 5. Brain death: apnea, areflexia, EEG silence, etc.

Safar P. Resuscitation aller Brain Ischemia, in Grenvik A and Safar P Eds: Brain Failure and Resuscitation, Churchill Livingstone, New York, 1981: 155-184.

For purposes of this description, a "good neurological outcome" is defined by one or more of the CPC scale and a "bad neurological outcome" is defined by one or more of the CPC scale whose value is greater than the value in the good neurological outcome. In one embodiment, "good neurological outcome" is defined by CPC 1-2 and "bad neurological outcome" is defined by CPC 3-5. In another embodiment, "good neurological outcome" is defined by CPC 1-3 and "bad neurological outcome" is defined by CPC 4-5. Although some of the embodiments of the method and apparatus are practiced with respect to one definition of "good neurological outcome" and "bad neurological outcome", the same embodiments of the method and apparatus can be practiced with another definition of "good neurological outcome" and "bad neurological outcome" using the same practice discussed herein.

Figure 12:
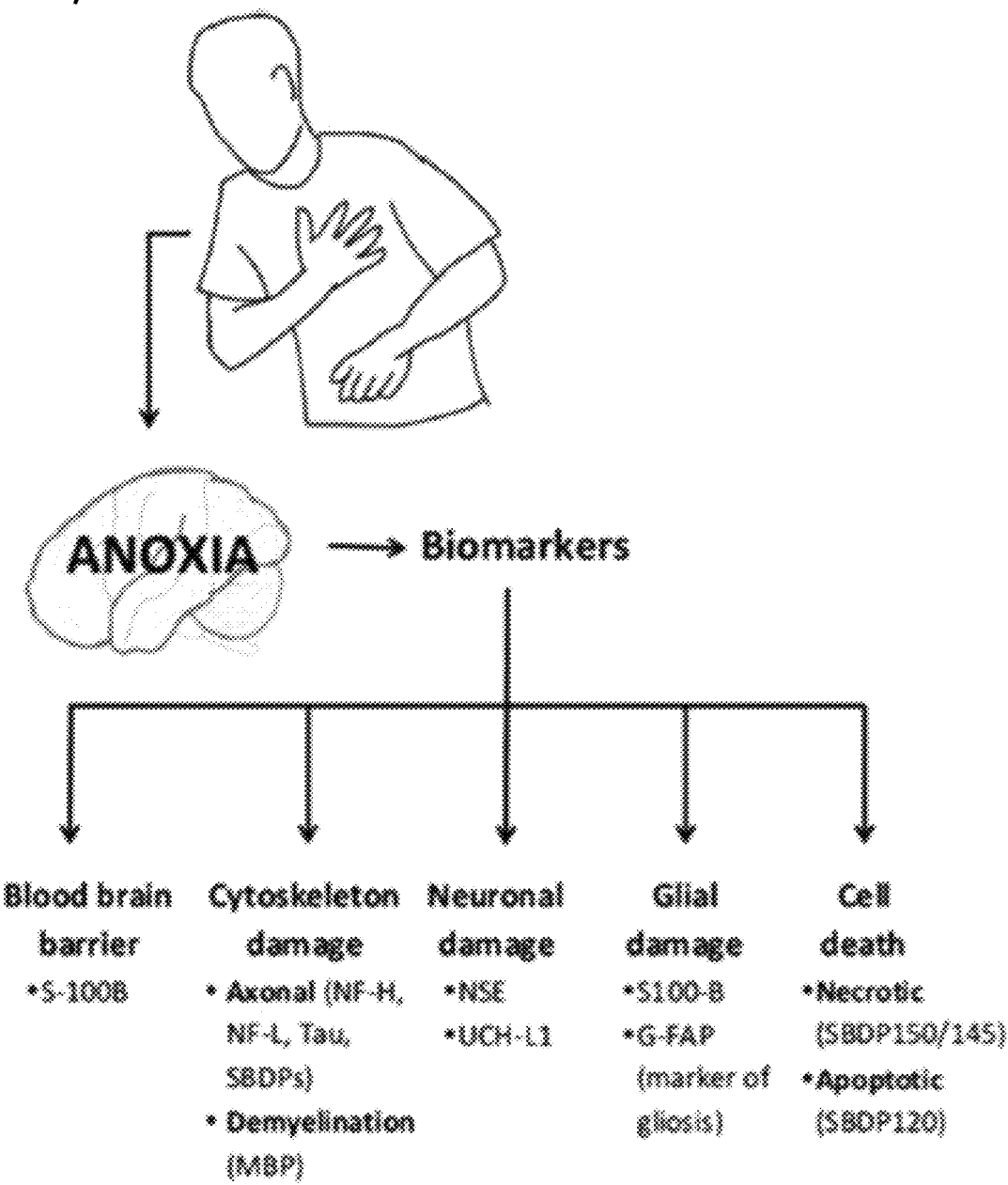
FIG. 12 is a diagram that illustrates the neurological biomarkers released after cardiac arrest.

For purposes of the following description, "neurological biomarker" is defined by one or more peptide biomarkers that are released from the brain tissue into the bloodstream following cardiac arrest (e.g. OHCA), neurological injury and/or return of spontaneous circulation (ROSC). FIG. 12 depicts one or more peptide biomarkers that are released from the brain tissue into the blood. As appreciated by one of ordinary skill in the art, in the hours to days after hypoxic-ischemic brain injury of OHCA, brain-specific proteins are released into the bloodstream. The inventors of the present invention recognized that higher brain-specific protein biomarker levels predict a reduced rate of survival to discharge and higher degree of neurological injury in survivors. In one embodiment, the "neurological biomarker" is defined to include one or more of S-100B (S100 calcium-binding protein B), Glial-Fibrillary Acidic Protein (GFAP), Ubiquitin C-terminal hydrolase L1 (UCH-L1), Neurofilaments compose of light chains (NF-L) and Tau (τ). However, the meaning of "neurological biomarker" in the context of this description is not limited to these specific biomarkers and can include other biomarkers such as those listed in FIG. 12.

In other embodiments, parameters other than neurological biomarkers can be measured and used in the method and apparatus for predicting a neurological outcome. In one embodiment, this parameter includes MicroRNA (miRNA). In this embodiment, the method and apparatus uses MicroRNA level changes using similar steps as discussed in the embodiments herein that use the level of protein biomarkers Gul, S. S., Huesgen, K., Wang, K. K., & Tyndall, J. A. (2017). MicroRNAs as Potential Prognosticators of Neurological Outcome in Out-Of-Hospital Cardiac Arrest Patients. *Biomarkers in Medicine,* 11 (12), 1113-1123, which is incorporated by reference herein).

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of predicting a neurological outcome of a patient after an OHCA, for purposes of adjusting a level of treatment for the patient at a medical facility (e.g. hospital, nursing home, long term care facility, etc.). However, the invention is not limited to this context. In an embodiment, the invention is used in any context that involves global brain ischemia. In another embodiment, the invention is used in any context involving post-cardiac assessment of brain injury or in a setting of brain resuscitation (e.g. where multi-marker panels can be used to monitor brain perfusion or brain injury in the setting of ICU care and resuscitation). In other embodiments, after discussion with the patient's Legally Authorized Representative (LAR) for healthcare decision-making, the decision may be to maintain active care or withdraw care. In still other embodiments, the invention is used in the context of any condition that damages the brain. In some embodiments, the invention can be utilized in clinical applications (e.g. regarding injury quantification and/or early-mid injury detection). In one example embodiment, the invention can be utilized in the context of brain trauma (e.g. where biomarker profiles can more accurately detect brain injury than other methods such as CT scans, etc.). In still other embodiments, the invention can be utilized in the context of Cerebral Vascular Accidents (CVA, strokes). In one embodiment, the invention can be used in the detection and quantification of CVA. In still other embodiments, the invention can be utilized in the context of other injuries where the brain does not get sufficient oxygen (e.g. drowning). In still other embodiments, the invention can be utilized to assess neurodegenerative conditions (e.g. Alzheimer's or Multiple Sclerosis) that cause neuronal damage and loss. In this embodiment, the invention can be utilized in the early detection or quantification of the neurodegenerative condition. In still other embodiments, the invention can be utilized in the context of toxin-induced brain damage (e.g. alcohol or other drugs). In still other embodiments, the invention can be utilized in assessing the effectiveness of different treatments or therapies for medical conditions (e.g. OHCA).

1. Overview

Out-of-hospital cardiac arrest (OHCA) remains a major public health challenge, and while survival rates have increased, the threat of profound neurologic disability often overshadows successful return of spontaneous circulation (ROSC). Overall, approximately 10% of OHCA patients survive to hospital discharge,[1] and due to neural tissues' exquisite sensitivity to hypoxic-ischemic brain injury (HIBI),[2] a high proportion of survivors sustain neurologic injury ranging from mild cognitive impairment to brain death.[3-5] However, the magnitude of HIBI after cardiac arrest is initially uncertain and is influenced by multiple factors including baseline patient characteristics and adequacy of resuscitative measures.[6,7] Outcome uncertainty is further amplified in OHCA due to incomplete information regarding downtime, initial cardiac rhythm, and handoffs between multiple providers. These sources of uncertainty leave clinicians with imprecise, qualitative estimations regarding patient prognoses, which in turns hampers families' and clinicians' decision-making regarding goals of care and resource allocation. Currently, there are no sufficiently objective clinical, radiologic, or laboratory tools for early and accurate prognostication of neurologic outcome immediately following ROSC.[8-10]

The ideal neuroprognostic tool in the setting of coma from HIBI would have 100% specificity for poor outcome identification, be employable early after ROSC, provide rapid results, and require few resources for implementation. Quantitative serum measurement of neural and astroglial proteins is a promising avenue for outcome prediction following OHCA[11] with potential for incorporation into clinical practice. The most-studied biomarkers in the setting of HIBI are neuron specific enolase (NSE), S-100B, and neurofilament light chain (NF-L).[12-16] NSE and S100B have shown the most clinical utility thus far, and, in conjunction with other neuroprognostication modalities, are recommended to be incorporated into neuroprognostication. However, the reliability of these biomarkers has been questioned in the setting of variable therapeutic hypothermia and post-anoxic seizure effects, inter-assay variation, hemolysis-related inaccuracy, undescribed protein kinetics, and unacceptable false positive rates despite serum concentrations greatly exceeding proposed cut-offs.[8,14,17] Currently, no single biomarker has proven sufficiently reliable to independently predict neurological outcomes after cardiac arrest.

Provided herein are studies that demonstrate the feasibility of employing an ultra-early comprehensive panel of neuron- and glia-specific protein biomarkers within one hour of ROSC, and to explore the pharmacodynamics of these biomarkers in the characterization of short- and intermediate-term neurologic outcomes after OHCA. It was demonstrated that early and serially measured blood levels of astroglial fibrillary acidic protein (GFAP), NF-L, Ubiquitin C-Terminal Hydrolase L1 (UCH-L1), Tau, and S100B immediately following ROSC has the potential to predict neurologic outcomes at time of discharge and at 6-month follow-up.

DESCRIPTION OF SPECIFIC EMBODIMENTS

FIG. 1A is a block diagram that illustrates an example of a system 100 for predicting a neurological outcome of a patient at a future time period after suffering an OHCA. As illustrated in FIG. 1A, a system 100 includes a biomarker measuring device 102 configured to measure values for two or more neurological biomarkers in a sample 103 (e.g. blood) drawn from the patient 116. In an example embodiment, the device 102 is as Quanterix Simoa® device, such as the SR X® device using the neurology 4-plex A or B kits (Billerica, MA). In another example embodiment, any device 102 appreciated by one of ordinary skill in the art that can be used to measure a value of the neurological biomarker can be used in the system 100. In an example embodiment, serum or plasma fraction is prepared from this sample 103 and/or serum biomarker levels are quantified by a quantitative ELISA (e.g. in-house assays).

Figure 1B:
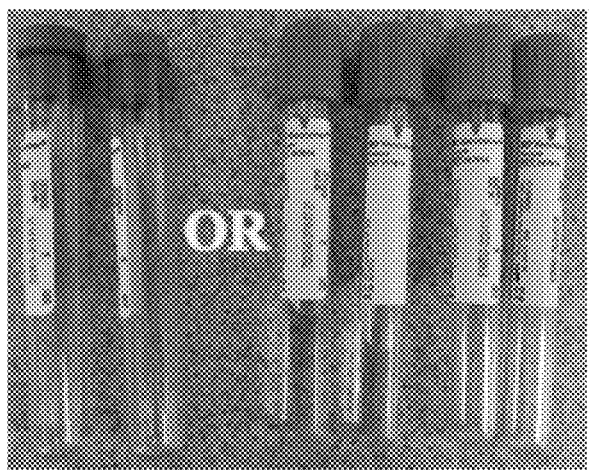
FIG. 1B is an image that illustrates an example of vials for collecting a blood sample used in the apparatus of FIG. 1A, according to one embodiment.

In an embodiment, as depicted in FIG. 1B the sample 103 is collected from the patient 116 using one or more vials 120 (e.g. 20 milliliters or ml). In one embodiment, the sample 103 is collected within a first time period (e.g. within one hour) after the OHCA and/or after early return of spontaneous circulation (ROSC) following the OHCA. In another embodiment, the sample 103 is collected within a subsequent time period defined as one or more subsequent time periods after the first time period. In one embodiment, the subsequent time period is one or more incremental time periods (e.g. every 6 hours) over a first interval (e.g. 24 hours) following ROSC. In one embodiment, the sample 103 is also collected within a second subsequent time period defined as one or more subsequent second incremental time period (e.g. every 24 hours) after the first interval (e.g. 24 hours) following ROSC over a second interval (e.g. 6 days and/or up until hospital discharge and/or death). In an embodiment, each sample 103 collected during the first time period is placed in the device 102 and first data is measured that indicates the values for two or more neurological biomarkers of those samples 103 collected during the first time period. In another embodiment, each sample 103 collected during the one or more subsequent time period(s) is placed in the device 102 and subsequent data is measured that indicates the values for two or more neurological biomarkers of those samples 103 collected during the subsequent time period(s).

In one embodiment, the data from the biomarker measuring device 102 is manually inputted into controller 104. In an alternative embodiment, the biomarker measuring device 102 is communicatively coupled with a controller 104 and transmits a signal indicating the first data or subsequent data for each sample 103 to the controller 104. In one embodiment, the controller 104 stores the first data or subsequent data for each sample 103 in a patient database 110 based on an identifier for the time period and an identifier for the patient 116 for each sample 103.

The controller 104 includes a neuro-prognostication module 112 to predict a neurological outcome of the patient 116 at a future time period (e.g. a time period after the first and subsequent time periods when the samples 103 were collected). In one embodiment, the future time period is a discharge time period of the patient 116 from the medical facility (e.g. hospital, nursing home, long term care facility, etc.) that is treating the patient 116 for the OHCA. For purposes of this description, "discharge time period" can vary from patient to patient depending on various factors (e.g. comorbid conditions, degree of injury, family support, financial resources, and many other factors). In some embodiments, the "discharge time period" is about one week or about two weeks (e.g. after the first time period and/or subsequent time period) as the medical conditions get sorted out, outpatient or rehab resources are identified, etc. In another embodiment, "discharge time period" is a discrete time point in any given chart where there is usually a determination of how the patient is doing now and the likely needs for the future. In some embodiments, for a given patient, clinicians don't know exactly how long (e.g. how many days) the discharge time period will be after the OHCA, but the discharge time period is a specific step that will happen (assuming discharge also includes death/withdrawal of care, and the patient doesn't exist within the hospital indefinitely). In some embodiments, the discharge time period generally means leaving the hospital census (e.g. leaving the hospital premises). In still other embodiments, the discharge time period occurs when the patient goes home from the hospital or goes to a rehabilitation facility (e.g. they need long-term physical therapy but don't need doctors, etc. on a daily basis) or extended-care facility (e.g. which might manage ventilators for severely-injured patients, etc.). In still other embodiments, the discharge time period occurs when the patient expires (e.g. dies or has withdrawal of life-sustaining care).

In another embodiment, the future time period is a fixed time period (e.g. 6 months) after the ROSC, where the fixed time period is longer than the first interval and second interval over which the samples 103 are collected. In some embodiments, the fixed time period (e.g. 6 months) is used a follow up (e.g. to the discharge time period) or a double check as well as a generally-accepted time point at which patients have regained maximal function. In some embodiments, the controller 104 is a computer system as described below with reference to FIG. 10 or a chip set described below with reference to FIG. 11. The module 112 is configured to cause the apparatus 100 to determine third data that indicates a prediction of a neurological outcome of the patient at the future time period based on the first data and/or the subsequent data. In some embodiments, the module 112 is configured to cause the system 100 to determine the prediction based on the first data or the subsequent data. In one embodiment, the module 112 includes one or more instructions to cause the system 100 to determine the prediction where the instructions are based on the method 200 discussed below in the flowchart of FIG. 2A and/or the method 250 discussed below in the flowchart of FIG. 2B and/or in the context of the example embodiments discussed herein.

In one embodiment, the module 112 causes the system 100 to transmit one or more signals to adjust a level of treatment of the patient 116. In one example embodiment, the module 112 causes the controller 104 to transmit a signal to medical equipment (e.g. life support equipment 114) that is communicatively coupled to the controller 104, to adjust a level of treatment of the patient 116, based on the prediction. For purposes of this description, "life support equipment" is defined as any medical equipment appreciated by one of ordinary skill in the art that may be used by medical professionals (e.g. clinicians) to achieve the goal of sustaining life (e.g. feeding tube, total parenteral nutrition, mechanical ventilation, heart/lung bypass, urinary catheterization, dialysis, cardiopulmonary resuscitation and/or defibrillation). In still other embodiments, the module 112 causes the controller 104 to transmit a signal to medical equipment to deliver intravenous drugs and/or perform thermal regulation techniques (e.g. Targeted Thermal Management (TTM)) with chilled fluids and external devices and/or arterial and venous catheterization. In some embodiments, TTM is utilized since post-OHCA patients have better outcomes when the body/brain is kept at lower temperatures immediately after the cardiac arrest. As appreciated one of ordinary skill in the art, the best temperature, the degree to which this helps, and the technique to do this optimally are all subjects of active research.

In one example embodiment, where the prediction indicates a good neurological outcome at the future time period, the controller 104 transmits a signal to the medical equipment to maintain and/or initiate a level of treatment of the patient 116. In another example embodiment, where the prediction indicates a good or bad neurological outcome at the future time period, the controller 104 transmits a signal to communicate the prediction to medical personnel (e.g. physicians), such as using a display 1014. In an embodiment, the prediction determined by the controller 104 helps guide rather than dictate the decision-making process regarding the level of treatment of the patient 116. In one embodiment, after the prediction of the good or bad neurological outcome is communicated to the medical personnel, information would be communicated by the physician to the patient's Legally-Authorized Representative (LAR) for healthcare decision-making (e.g. their surrogate decision-maker(s) for further discussion of goals of care, the patient's autonomy vs medical futility, etc.). Thus, in this embodiment medical decision-making is not determined by the controller 104 but rather by information used by the physicians and family (and sometimes other interested parties, e.g. medical ethics or legal consultants) to determine the correct level of treatment or care. In some embodiments, the prediction of neurological outcome won't always result in withdrawal of care and instead might result in maintenance of care at the current level. In an example embodiment, if the prediction is not a bad neurological outcome, the physicians may discuss with the patient's LAR that treatment or care shouldn't be withdrawn. In some embodiments, the family or clinicians may expect a bad neurological outcome and thus one advantage of the system is to suggest ongoing treatment or care.

However, the module 112 and the sequence of instructions need not be configured to cause the system 100 to adjust the level of treatment of the patient nor is the system 100 required to include the medical equipment (e.g. life support equipment 114) for treating the patient 116. Additionally, the system 100 does not include the patient 116. The hardware used to form the controller 104 of the system 100 is described in more detail below in the Hardware Overview section.

FIG. 2A is a flow diagram that illustrates an example of a method 200 for predicting a neurological outcome of a patient post cardiac arrest, according to one embodiment. Although the flow diagram of FIG. 2A, and subsequent flow diagrams FIG. 2B-2C, is each depicted as integral steps in a particular order for purposes of illustration, in other embodiments one or more steps, or portions thereof, are performed in a different order, or overlapping in time, in series or in parallel, or are deleted, or one or more other steps are added, or the method is changed in some combination of ways.

After starting at block 201, in step 202, first data is obtained, on the controller 104, that indicates values for two or more neurological biomarkers in the sample 103 collected from the patient 116 during the first time period (e.g. within an hour after ROSC). In step 204, second or subsequent data is obtained, on the controller 104 that indicates values for two or more neurological biomarkers in the sample 103 collected from the patient 116 during the one or more second or subsequent time periods (e.g. every 6 hours for 24 hours after ROSC and/or every day for 6 days after ROSC, etc.).

In step 206, a value of a score for each neurological biomarker is determined by the controller 104 based on a ratio of the value of the neurological biomarker at the subsequent time period (e.g. subsequent data) to the value of the neurological biomarker at the first time period (e.g. first data). In an embodiment, the score for each neurological biomarker is determined by:

$$\text{Marker score} = \frac{\text{marker level at subsequent time period}}{\text{marker level at first time period}} \times 100 \qquad (1)$$

where marker score is the score for each neurological biomarker; marker level at the subsequent time period is the value for the neurological biomarker in the sample 103 during one of the subsequent time periods (from the subsequent data) and the marker level at the first time period is the value for the neurological biomarker in the sample collected during the first time period. In an example embodiment, where the neurological biomarkers are one or more of UCH-L1, GFAP, NF-L and Tau, equation (1) can be written for each neurological biomarker as:

$$UCH-L1 \text{ score over } 0H = \frac{UCH-L1 \text{ level at subsequent time period}}{UCH-L1 \text{ level at } 0H} \times 100 \qquad (2)$$

$$GFAP \text{ score over } 0H = \frac{GFAP \text{ level at subsequent time period}}{GFAP \text{ level at } 0H} \times 100 \qquad (3)$$

$$NF-L \text{ score over } 0H = \frac{NF-L \text{ level at subsequent time period}}{NF-L \text{ level at } 0H} \times 100 \qquad (4)$$

$$Tau \text{ score over } 0H = \frac{Tau \text{ level at subsequent time period}}{Tau \text{ level at } 0H} \times 100 \qquad (5)$$

Where 0H indicates that the first time period is within the zeroth hour of the ROSC (e.g. between 0 minutes and 59 minutes after the ROSC and/or within one hour after the ROSC).

In step 206, the value for the score of each neurological biomarker is determined by the controller 104 using one or more of equations (1)-(5), which are provided in the module 112 and/or is stored in a memory of the controller 104 and/or is stored in the database 110. In one embodiment, in step 206 the controller 104 determines the value of the score for each neurological marker that is detected in the sample 103 for one or more subsequent time periods. In other embodiments, in step 206 the user (e.g. medical professional at the medical facility) inputs using a manual input 108 (e.g. keyboard, mouse, etc.) how many and/or which neurological biomarkers that the controller 104 is to determine the score in step 206 using one or more of equations (1)-(5). In an example embodiment, the value of the score for each neurological biomarker is determined for a plurality of subsequent time periods (e.g. based on the subsequent data from step 204 collected for the plurality of subsequent time periods).

In step 208, a value of a composite score for the two or more neurological biomarkers is determined by the controller 104 based on a sum of the value of the scores of each neurological biomarker (calculated in step 206) divided by a quantity of the two more neurological biomarkers. In an embodiment, the composite score for the two or more neurological biomarkers is determined by:

$$\text{Composite score} = \frac{\text{marker}_1 \text{ score} + \text{marker}_2 \text{ score} + \ldots \text{marker}_N \text{ score}}{N} \qquad (6)$$

where $\text{marker}_1$ score is the score of a first neurological biomarker in the sample 103 (using equation 1); $\text{marker}_2$ score is the score of a second neurological biomarker in the sample 103 (using equation 1); and $\text{marker}_N$ score is the score of a $N^{th}$ neurological biomarker in the sample 103 and N is a quantity of neurological biomarkers in the sample 103 and/or a quantity of neurological biomarkers being used to determine the prediction. In an example embodiment, where the neurological biomarkers are UCH-L1 and GFAP, equation (6) can be written as a two marker composite score as:

$$2 \text{ Composite score} = \frac{UCH-L1 \text{ score over } OH + GFAP \text{ score over } OH}{2} \qquad (7)$$

However, equation (7) merely represents one example embodiment of a 2 composite score and in other embodiments, any two of the neurological biomarkers (e.g. two or more of UCH-L1, GFAP, NF-L, S100b and Tau) can be used to form a 2 composite score equation that is similar to equation (7). In an example embodiment, where the neurological biomarkers are UCH-L1, GFAP, NF-L and Tau, equation (6) can be written as a four marker composite score as:

$$4 \text{ Composite score} = \frac{UCH-L1 \text{ score} + GFAP \text{ score} + NF-L \text{ score} + Tau \text{ score}}{4} \quad (8)$$

However, equation (8) merely represents one example embodiment of a 4 composite score and in other embodiments, less or more than four of the neurological biomarkers (e.g. three of the neurological biomarkers; five of the neurological biomarkers such as the four neurological biomarkers of equation 8 and S100B, etc.) can be used to form a composite score using equation (6). In an example embodiment, the value of the composite score is determined for a plurality of subsequent time periods (e.g. using the value of the score for the two or more neurological biomarkers determined for the plurality of subsequent time periods determined in step 206). Although equations (1)-(8) are provided above, various other equations could be derived to predict the neurological outcome of a patient, based on the method 250 and/or the example embodiments discussed below (e.g. equation to assess whether the NF-L or GFAP biomarker level increases a threshold amount between H6 and H12 to indicate a bad neurological outcome as discussed in FIGS. 3A-3B and/or equation to assess whether the UCHL-1 or S100B biomarker level decreases a threshold amount from H0 to H6/H12/etc. to indicate a good neurological outcome as discussed in FIGS. 3C-3D, etc.)

In step 210, a prediction is determined by the controller 104 based on the first data from step 202 and/or the subsequent data from step 204. In an embodiment, the prediction is determined by the controller 104 by comparing the measured value for the two or more neurological biomarkers at the first time period and/or the subsequent time period with respective threshold values for the first time period and/or the subsequent time period. In this embodiment, steps 206 and 208 of the method 200 are omitted and the prediction in step 210 is determined by comparing the measured values of the two or more neurological biomarkers in steps 202 and/or 204 with two or more threshold values. In an example embodiment, the threshold values for the two or more neurological biomarkers are provided by the example embodiment of the method 250 and Table 4 discussed below.

In another embodiment, in step 210 the prediction is determined by the controller 104 by comparing the composite score for the two or more neurological markers from step 208 with a threshold composite score. In one embodiment, the threshold composite score is determined using the method 250 of FIG. 2B. In one embodiment, a good neurological outcome at a future time period (e.g. at a time of discharge from the medical facility, at a fixed time period in the future such as 6 months after ROSC, etc.) is determined based on the value of the composite score from step 208 being less than the threshold composite score. In an embodiment, a bad neurological outcome at the future time period is determined based on the value of the composite score from step 208 being greater than the threshold composite score.

In another embodiment, in step 211 the prediction is discussed with the Legally-Authorized Representative (LAR) of the patient. In an embodiment, in step 211 the controller 104 transmits a signal to communicate the prediction to medical personnel (e.g. physicians), such as on a display 1014. In another embodiment, the prediction determined by the controller 104 helps guide rather than dictate the decision-making process regarding the level of treatment of the patient 116. In one embodiment, after the prediction of the good or bad neurological outcome is communicated to the medical personnel, information is communicated by the medical personnel to the patient's LAR for healthcare decision-making (e.g. their surrogate decision-maker(s) for further discussion of goals of care, the patient's autonomy vs medical futility, etc.). In an embodiment, in step 211 the discussion with the LAR includes discussion of the background, utility and reliability of the prediction. In another embodiment, in step 211 the medical personnel and the LAR discuss the patient's wishes (if known), review relevant documentation (e.g. advance directives, designated power of attorney or DPOA designation, etc.). In another embodiment, in step 211 the medical personnel and the LAR discuss the specific biomarker prediction and the basis of the prediction (e.g. specific biomarker level profiles of the patient, specific biomarker level profiles of patients with good or bad neurological outcome, etc.).

In another embodiment, in step 211 if the prediction is a bad neurological outcome then the discussion in step 211 involves a discussion of the patient's wishes in the case of medical futility and possible withdrawal of treatment or care. In another embodiment, in the event of a prediction of a bad neurological outcome, step 211 involves a discussion of organ donation services that may occur before the withdrawal of treatment or care in step 212. In one embodiment, prior to the withdrawal of treatment or care in step 212, clinical tests (e.g. pause the ventilator to see whether rising $CO_2$ causes spontaneous breathing or flushing cold water in the ear to provoke brainstem reflexes, etc.) are performed to confirm poor neurological function.

In another embodiment, in step 211 if the prediction is a good neurological outcome, the discussion between the medical personnel and the LAR includes the patient's wishes in case of possible good outcome, but still needing invasive/intensive care or treatment. In some embodiments, the patient or LAR are reluctant to have invasive care (e.g. do not want breathing tube, CPR etc. in cases of cardiac arrest) if there is perception of "they wouldn't want to live like this," but may change their decision if they know there is a higher likelihood of eventual good quality of life.

In step 212, a level of treatment of the patient 116 is adjusted, based on the prediction determined in step 210 and/or the discussion with the LAR in step 211. In one embodiment, in step 212 the controller 104 transmits a signal to output the prediction on a display (e.g. display 1014). In another embodiment, in step 212 the treatment is adjusted based on the prediction and the discussion in step 211 between the medical professionals at the medical facility communicating the prediction to family and/or LAR of the patient 116. In an example embodiment, the level of treatment is adjusted in step 212 based on consent obtained from the family and/or LAR in step 211 to adjust the level of treatment based on the prediction. In one embodiment, in step 212 the controller 104 transmits a signal to the life support equipment 114 to adjust the level of treatment based on the prediction and the discussion in step 211. In one example embodiment, after step 211 the medical professional inputs an outcome of the discussion in step 211 to the controller 104 using the manual input 108. In one example embodiment, where the prediction indicates a good neurological outcome at the future time period, in step 212 the controller 104 transmits a first signal to the life support equipment 114 to maintain and/or initiate treatment to the patient 116.

In an embodiment, in the event that step 212 involves withdrawal of treatment or care, typically vasoactive medications are stopped and respiratory support is withdrawn (e.g. ventilator is turned off and endotracheal tube withdrawn). In this embodiment, patient death typically happens shortly thereafter.

FIG. 2B is a flow diagram that illustrates an example of a method 250 for determining a model for predicting a neurological outcome of a patient post-cardiac arrest, according to one embodiment. The method starts at block 251 and step 252 involves obtaining preliminary first data for values of two or more neurological biomarkers at the first time period (e.g. within one hour) after ROSC for a plurality of patients. In an embodiment, the preliminary first data is obtained from each patient in step 252 in a similar manner that the first data is obtained from the patient 116 in step 102 (e.g. a sample 103 is obtained at the first time period and placed in the device 102). Table 2 below indicates one example embodiment of inclusion and exclusion criteria for the plurality of patients as well as criteria for controls.

includes a column "subject ID" which is a unique identifier for each patient from which the samples 103 were obtained in steps 252 and 254. FIG. 19 also includes a column for the time period of the sample 103 collected from each patient (e.g. H0 indicates the first time period, 6H/H12/H18/etc. indicates the subsequent time periods or incremental time periods every 6 hours after the first time period, etc.). FIG. 19 also includes a column "cohort" that identifies whether each patient is an OHCA patient or a control patient. FIG. 19 also includes columns that indicate the measured value of each neurological biomarker ("GFAP pg/ml", "NFL pg/ml", "Tau pg/ml", "UCHL1 pg/ml", "S100b pg/ml") where pg/ml is the units in picograms per milliliter of the value of each biomarker level at each respective time period.

In step 256, a neurological outcome is assigned to each patient at a time period (e.g. discharge, 6 months after ROSC, etc.) that is after the first time period and subsequent time period when the preliminary first data and preliminary subsequent data is collected in steps 252 and 254. In one embodiment, the neurological outcome is assigned at the time period based on the CPC scale (e.g. Table 1) and is based on clinical observations of the patient at the time period. FIG. 19 indicates an example embodiment where the neurological outcome of each patient is provided in a column ("Discharge CPC", "6 month CPC", etc.). In another embodiment, the neurological outcome of each patient is assessed and/or assigned at the first time period (e.g. within 24 hours after ROSC). In an example embodiment, FIG. 19 indicates the assigned neurological outcome of the patient at

TABLE 2

| Cardiac Arrest cohort | Control cohort |
|---|---|
| Inclusion criteria | |
| ≥18 years old | |
| Non-traumatic out-of-hospital cardiac arrest | Chest pain |
| Exclusion criteria | |
| Advanced directives against resuscitation | EKG changes: New ST-elevation consistent with myocardial infarction |
| Traumatic cardiac arrest | |
| In hospital cardiac arrest | NSTEMI |
| Failure to attain ROSC | Hemodynamically unstable |
| Visible signs of death (livor mortis, rigor mortis) | |
| Females of child bearing age with positive pregnancy test | |
| Neurodegenerative disease or other neurological disorder (dementia, Parkinson's disease, multiple sclerosis, seizure disorder, or brain tumors) | |
| History of neurosurgery within the last 30 days | |
| Acute brain injury within the last 30 days (ischemic/hemorrhagic stroke, traumatic brain injury) | |
| Subject is anemic OR donated blood within the last 8 weeks OR has a hematological disorder that requires transfusions | |
| Subject has history of liver failure OR renal failure | |
| Prisoners | |

Step 254 involves obtaining preliminary subsequent data for values of two or more neurological biomarkers at one or more subsequent time period (e.g. every 6 hours for the first 24 hours after ROSC and/or every day for up to 6 days after ROSC, etc.). In an embodiment, the preliminary subsequent data is obtained from each patient in a similar manner as the subsequent data was obtained from the patient 116 in step 104 (e.g. a sample 106 is obtained at the subsequent time period and placed in the device 102).

FIG. 19 includes one example embodiment of preliminary first data and preliminary subsequent data obtained from a plurality of patients during steps 252 and 254. FIG. 19 includes a column "unique specimen ID" which is a unique identifier for each sample 103 analyzed by the device 102 in steps 252 and 254 for the plurality of patients. FIG. 19 also the first time period in a column ("CPC 24H"). In one embodiment, in step 256 each patient is segregated into either a good neurological outcome or class 1 (e.g. CPC 1-3, CPC 1-2, etc.) or a bad neurological outcome or class 2 (e.g. CPC 4-5, CPC 3-5, etc.) category based on the assigned neurological outcome in step 256. In an example embodiment, Table 3 below depicts the neurological outcome assigned at discharge ("CPC discharged") and the neurological outcome assigned at 6 months ("CPC 6 mon"). Additionally, Table 3 provides a column of whether the patient had a good neurological outcome or bad neurological outcome at discharge ("CPC discharged group") and whether the patient was in class 1 (good neurological outcome) or class 2 (bad neurological outcome) at discharge ("four markers class").

TABLE 3

| ID | CPC_discharged | CPC_6mon | CPC_discharged_group | four markers_class |
|---|---|---|---|---|
| OHCA001 | 1 | 1 | good outcome | 1 |
| OHCA006 | 1 | 1 | good outcome | 1 |
| OHCA007 | 1 | 1 | good outcome | 1 |
| OHCA009 | 1 | 1 | good outcome | 1 |
| OHCA022 | 1 | 1 | good outcome | |
| OHCA023 | 1 | 1 | good outcome | 1 |
| OHCA017 | 1 | 2 | good outcome | 1 |
| OHCA030 | 1 | deceased | good outcome | 1 |
| OHCA027 | 1 | tbd | good outcome | 1 |
| OHCA010 | 4 | deceased | bad outcome | 2 |
| OHCA012 | 4 | deceased | bad outcome | 2 |
| OHCA018 | 4 | deceased | bad outcome | 2 |
| OHCA005 | 4 | deceased | bad outcome | 2 |
| OHCA020 | 5 | deceased | bad outcome | 2 |
| OHCA028 | 5 | deceased | bad outcome | 2 |
| OHCA031 | 5 | deceased | bad outcome | 2 |
| OHCA002 | 5 | deceased | bad outcome | 2 |
| OHCA003 | 5 | deceased | bad outcome | 2 |

In step 258, a value of a composite score for the two or more neurological biomarkers for the plurality of patients is determined based on the preliminary first data and preliminary subsequent data (e.g. using one or more of equations (6)-(8)).

Figure 8A:
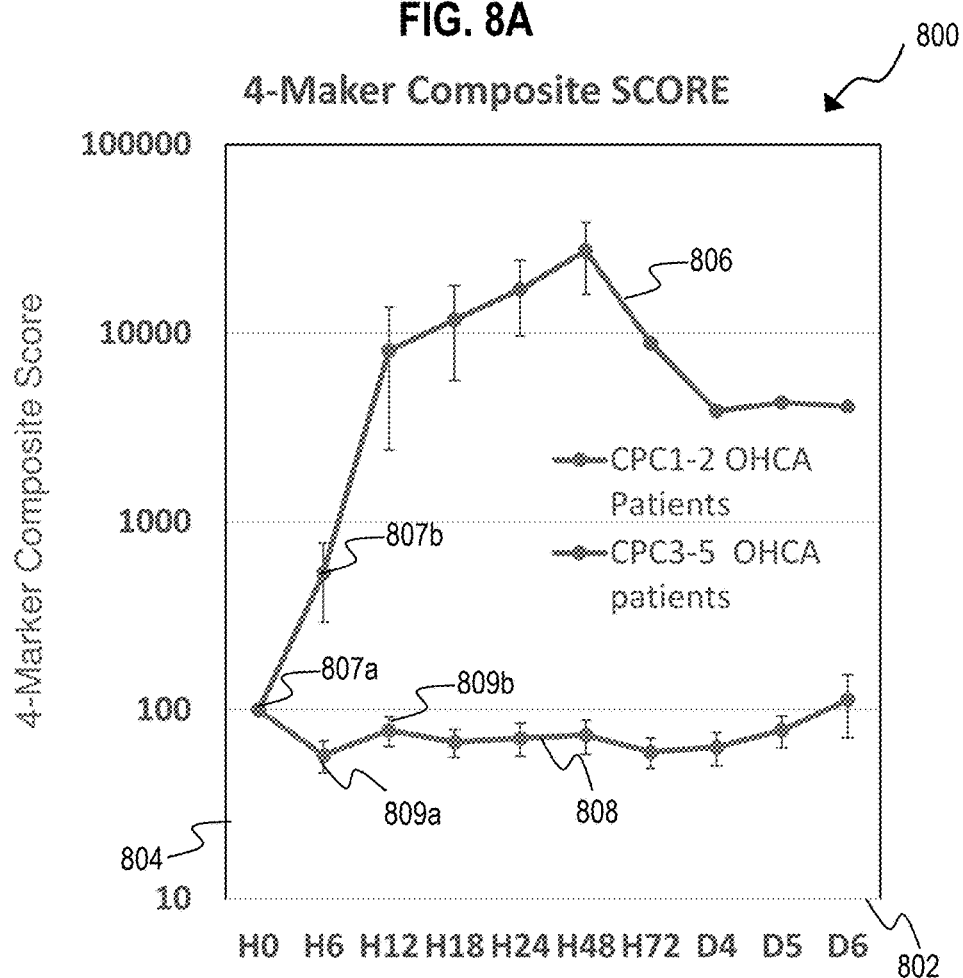
FIG. 8A illustrates an example of a graph that illustrate an example of a pair of curves that indicate a composite score (using UCH-L1, GFAP, NF_L and Tau) at different time periods after cardiac arrest for sample patients with a good and bad neurological outcome, according to one embodiment.

In step 259, a value of a threshold composite score is determined to distinguish the patients with the good neurological outcome from the patients with the bad neurological outcome, based on the composite score. The value of the threshold composite score can be determined by any method or means appreciated by one of ordinary skill in the art. In one embodiment, the value of the threshold composite score is determined so that the value of the composite score is less than the value of the threshold composite score for the patients with the good neurological outcome (or class 1) and the value of the composite score is greater than the value of the threshold composite score for the patients with the bad outcome (or class 2). FIG. 8A depicts a graph 800 where the horizontal axis 802 is time in units of hours/days after ROSC and the vertical axis 804 is unitless (four marker composite score). Data points 807a, 807b are marked on the graph 800 that indicate the composite scores (e.g. using equation 8) from step 258 of the patients with the bad neurological outcome (or class 2) and data points 809a, 809b are marked on the graph 800 that indicate the composite scores from step 258 of the patients with the good neurological outcome (or class 1). A first curve 806 is drawn through the data points 807 and a second curve 808 is drawn through the data points 809. In an embodiment, the value of the threshold composite score is determined manually by viewing the graph 800 so that the threshold composite score is about 100 and/or a threshold composite score between about 80 and about 120. In other embodiments, the controller 140 automatically determines the threshold composite score based on the data points 807, 809 using any software appreciated by one of ordinary skill in the art that can determine the best value that is an effective threshold between the good neurological outcome patients (e.g. curve 808) and the bad neurological outcome patients (e.g. curve 806). In one embodiment, the value of the threshold score is either inputted by the user (e.g. using manual input 108) and/or is stored by the controller 104 in a memory and/or module 112 of the controller 104. In an embodiment, the value of the threshold composite score is based on the equation of the composite score. In an example embodiment, if the composite score equation is a simple ratio (e.g. without the 100 multiplier), then the threshold composite is about 1 and/or between about 0.2 and about 1.2. FIG. 8D depicts a similar graph 870 as FIG. 8A except that the vertical axis 874 is a unitless two composite score (e.g. using equation 7) and the vertical axis 804 is a four marker composite score (e.g. using equation 8). The curves 876, 878 of FIG. 8D are similar to the curves 806, 808 of FIG. 8A with the exception that the curves 876, 878 are based on the two composite score (e.g. equation 7).

FIG. 2C is a flow diagram that illustrates an example of a method 270 for determining an effectiveness of a treatment of a patient post cardiac arrest, according to one embodiment. In step 272, a first value of a composite score for the two or more neurological biomarkers is determined for one or more patients undergoing a first treatment (e.g. TTM at a first temperature, life support equipment, intravenous drugs, arterial and venous catheterization, ibuprofen, music therapy, etc.) between the first time period and the subsequent time period. In one embodiments, one or more of equations (1)-(6) are utilized to determine the first value of the composite score for the first treatment. In some embodiments, step 272 includes determining a first change in a value of one or more neurological biomarker levels between the first time period and the subsequent time period for the one or more patients undergoing the first treatment.

In step 274, a second value of a composite score for the two or more neurological biomarkers is determined for one or more patients undergoing a second treatment that is different from the first treatment (e.g. TTM at a second temperature different than the first temperature, life support equipment, intravenous drugs, arterial and venous catheterization, ibuprofen, music therapy, etc.) between the first time period and the subsequent time period. In one embodiments, one or more of equations (1)-(6) are utilized to determine the second value of the composite score for the second treatment. In some embodiments, step 272 includes determining a second change in a value of one or more neurological biomarker levels between the first time period and the subsequent time period for the one or more patients undergoing the second treatment. In some embodiments, the method 270 is used to only assess the effectiveness of one treatment and thus in this embodiment step 274 is omitted.

In step 276, an effectiveness of the first treatment is determined by comparing the first value of the composite score (from step 272) with a threshold composite score (e.g. from step 259) that distinguishes patients with a good neurological outcome from patients with a bad neurological outcome. In step 276, an effectiveness of the second treatment is determined by comparing the second value of the composite score (from step 272) with a threshold composite score (e.g. from step 259) that distinguishes patients with a good neurological outcome from patients with a bad neurological outcome.

In one embodiment, the effectiveness of the first or second treatments is determined based on a difference between the first or second value of the composite score and the threshold composite score. In some embodiments, a positive effectiveness of the treatment is determined based on a negative difference (e.g. the composite score for the treatment is less than the threshold composite score) and/or an extent of the positive effectiveness is based on a magnitude of the negative difference. In an example embodiment, if the first value of the composite score is 95, the second value of the composite score is 85 and the threshold composite score is 100, then the second treatment is determined to be more effective than the first treatment, since the second value of the composite score is less than the threshold composite score by a greater extent (15) than the first value of the composite score (5). In an example embodiment, if the first value of the composite score is 200, the second value of the composite score is 150 and the threshold composite score is 100, then the first treatment is determined to be less effective than the second treatment, since the first value of the composite score is greater than the threshold composite score by a greater extent (100) than the second value of the composite score (50).

In another embodiment, step 276 determines the effectiveness of the first treatment by comparing the first change in the value of the one or more neurological biomarker levels (from step 272) with a change in the value of one or more neurological biomarker levels associated with patients having a good neurological outcome. In an example embodiment, FIGS. 3C-3D depict that patients with a good neurological outcome (green colored bars) experience quantified decreases in the value of the UCH-L1 and S100B neurological biomarkers between a first time period (H0) and a subsequent time period (H6, H12, etc.). Thus, in this embodiment, the effectiveness of the first treatment and/or the second treatment are respectively determined by comparing the first change and/or second change in the value of one or more neurological biomarker levels (e.g. UCH-L1, S100B, etc.) with the change in the value of the one or more neurological biomarkers associated with patients having a good neurological outcome (e.g. UCH-L1, S100B level changes as depicted in FIGS. 3C-3D).

In still other embodiments, step 276 can determine a relative effectiveness between the first and second treatments by merely comparing the first value and the second value of the composite scores and/or comparing the first change with the second change in the value of the one or more neurological biomarker levels. In this embodiment, the threshold composite score is not needed and instead the relative effectiveness between the first and second treatment is based on which composite score value is less (e.g. first treatment is deemed more effective if the first value of the composite score is less than the second value of the composite score). In another embodiment, the relative effectiveness between the first treatment and the second treatment is based on which change in the value of the one or more neurological biomarker levels is less (e.g. first treatment is deemed more effective if the first change is −100 pg/ml and the second change is −25 pg/ml or if the first change is +10 pg/ml and the second change is +150 pg/ml).

The inventors of the present invention recognized that the methods 200, 250 of FIGS. 2A-2B that precisely quantify brain injury with one or more neurological biomarker profiles advantageously can be used to gauge how well treatments or interventions (e.g. TTM) actually work. The inventors of the present invention recognized that conventional methods for measuring treatment effectiveness use a first group of patients (e.g. a couple of hundred) who receive a first treatment and a second group of patients (e.g. a couple of hundred) who receive a second treatment. These conventional methods then look at whether there is a difference in survival or neurologic outcome of the first and second groups of patients, and then infer that the first treatment or second treatment made the difference. The inventors of the present invention recognized that these are blunt outcome measurements, with a lot of background noise, so likely overlook treatments or interventions that have a small (but real) effect.

Thus, the inventors of the present invention developed the method 270 which overcomes these drawbacks of conventional methods used to assess the effectiveness of treatments or interventions. In an example embodiment, the method 270 can assess that a first treatment (e.g. TTM at 33 degrees C.) that reduces the value of the one or more neurological biomarker levels by a first extent (e.g. 10%) is less effective than a second treatment (e.g. TTM at 36 degrees C.) that reduces the value of the one or more neurological biomarker levels by a second extent (e.g. 12.5%) that is greater than the first extent. In another example embodiment, the method 270 permits the determination of the effectiveness of additional treatments or interventions so that multiple treatments or interventions can be simultaneously performed on the patient, whose collective effect on the value of the one or more neurological biomarkers can add up to something significant. In an example embodiment, the method 270 may determine that other treatments or interventions reduce the value of the one or more neurological biomarker values by a certain amount (e.g. ibuprofen brings it down 2.5%, and background music brings it down an additional 2.5%) and thus the method 270 can be used to determine multiple treatments or interventions that can be simultaneously performed on the patient whose collective effect is significant (e.g. 17.5% reduction when collective treatments TTM at 36 degrees, ibuprofen and background music are simultaneously performed).

In one embodiment of the method 250, steps 258 and 259 are omitted and thresholds of two or more neurological biomarker levels are determined to predict the assigned neurological outcome of the patients (from step 256). In this embodiment, steps 206 and 208 are omitted from the method 200 so that the thresholds of the two or more neurological biomarker levels determined in the method 250 are compared with the first data and/or subsequent data obtained in steps 202 or steps 204 to determine the prediction in step 210.

FIGS. 3A-3E illustrate histograms that depict an example of a plurality of neurological biomarker levels at different time periods after cardiac arrest for a sample of patients, according to one embodiment. FIG. 3A depicts a histogram 300 that illustrates an example of the NF-L biomarker levels at different time periods after OHCA for a sample of patients, based on steps 252, 254, 256. The horizontal axis 302 for each histogram is time in units of hours/days. The vertical axis 304 is protein levels of NF-L in units of pg/ml. In an embodiment, controls are represented by the blue bar (e.g. left bar) at each time period and remain relatively level across the time periods. In an embodiment, the good outcome patients are represented by the green bar (e.g. center bar) at each time period and remain relatively level across the time periods. In another embodiment, the poor outcome patients are represented by the red bar (e.g. right bar) at each time period which elevates at 6 hours after ROSC (e.g. H6). Statistical significance between the good outcome and bad outcome is maintained between 12 hours (H12) and 48 hours (H48) after ROSC.

FIG. 3B depicts a histogram 320 that illustrates an example of the GFAP biomarker levels at different time periods after OHCA for a sample of patients, based on steps 252, 254, 256. The horizontal axis 302 for each histogram is time in units of hours/days. The vertical axis 324 is protein levels of GFAP in units of pg/ml. The histogram 320 of the GFAP biomarker levels has similar characteristics as the histogram 300 of the NF-L biomarker levels in FIG. 3A. Statistical significance (about 100,000) between the good outcome and bad outcome is maintained between 12 hours (H12) and 48 hours (H48) after ROSC.

FIG. 3C depicts a histogram 340 that illustrates an example of the UCHL-1 biomarker levels at different time periods after OHCA for a sample of patients, based on steps 252, 254, 256. The vertical axis 344 is protein levels of UCH-L1 in units of pg/ml. The histogram 340 of the UCH-L1 biomarker level indicates that the control levels (e.g. blue bar) remains relatively level; that the good outcome patients and bad outcome patients both spike at the first time period (e.g. H0); that the biomarker levels of the good outcome patients decrease with time; that the biomarker levels of the bad outcome patients increase with time and that statistical significance between the good outcome and bad outcome is maintained between 12 hours (H12) and 48 hours (H48) after ROSC.

FIG. 3D depicts a histogram 360 that illustrates an example of the S100B biomarker levels at different time periods after OHCA for a sample of patients, based on steps 252, 254, 256. The vertical axis 364 is protein levels of S100B in units of pg/ml. The histogram 360 of the S100B biomarker level indicates that the control levels (e.g. blue bar) remains relatively level; that the good outcome patients and bad outcome patients both spike at the first time period (e.g. H0); that the biomarker levels of the good outcome patients decrease with time; that the biomarker levels of the bad outcome patients increase and then plateau with time patients and a 100% sensitivity or 100% rate of predicting the good neurological outcome of the patients. The inventors of the present invention noted that a 100% specificity is advantageous since it provides an enhanced and accurate prediction regarding whether or not a patient 116 (e.g. when performing steps 210 and 212) will have a bad neurological outcome at a future time period. This assists the medical professionals when consulting the family or guardians of the patient 116 in reassuring them that a level of treatment is not being prematurely withdrawn in step 212, if a suggestion is made to reduce the level of care in step 212 based on a prediction of a bad neurological outcome. Table 4 provides a cutoff or threshold for each neurological biomarker value and each subsequent time period (e.g. quantified and determined by a Wilcoxon rank sum test). In an example embodiment, the Wilcoxon rank sum test was used to find statistical significance. The ROC curves 600 of FIG. 6 were then derived and from those we found the cutoff value at each statistically significant time point where that biomarker had 100% specificity for bad neurological outcome. Table 4 provides values with 100% specificity for bad neurological outcome. Values in bold in table 4 indicate where 100% sensitivity is also reached.

TABLE 4

| Hour | GFAP Cutoff (pg/mL) | Sens (%) | Spec (%) | NF-L Cutoff (pg/mL) | Sens (%) | Spec (%) | UCHL-1 Cutoff (pg/mL) | Sens (%) | Spec (%) | Tau Cutoff (pg/mL) | Sens (%) | Spec (%) | S100B Cutoff (pg/mL) | Sens (%) | Spec (%) |
|---|---|---|---|---|---|---|---|---|---|---|---|---|---|---|---|
| 6  | —       | —    | —   | —       | —   | —   | —       | —   | —   | 48.07  | 50   | 100 | 310.48 | 87.5 | 100 |
| 12 | 1566.66 | 85.7 | 100 | 375.19  | 85.7 | 100 | 935.15  | 85.7 | 100 | 124.06 | 57.1 | 100 | 163.90 | 85.7 | 100 |
| 18 | 1144.94 | 100  | 100 | 179.91  | 100 | 100 | 470.09  | 100 | 100 | 63.50  | 75   | 100 | 118.65 | 87.5 | 100 |
| 24 | 1347.93 | 100  | 100 | 1493.58 | 87.5 | 100 | 414.53  | 100 | 100 | 31.10  | 87.5 | 100 | 164.94 | 87.5 | 100 |
| 48 | 2640.28 | 100  | 100 | 2723.75 | 100 | 100 | 1733.50 | 100 | 100 | 51.05  | 100  | 100 | 117.22 | 100  | 100 | and that statistical significance between the good outcome and bad outcome is maintained between 12 hours (H12) and 48 hours (H48), and at 6 hours (H6) after ROSC.

FIG. 3E depicts a histogram 380 that illustrates an example of the Tau biomarker levels at different time periods after OHCA for a sample of patients, based on steps 252, 254, 256. The vertical axis 384 is protein levels of Tau in units of pg/ml. The histogram 360 of the Tau biomarker level indicates that the control levels (e.g. blue bar) remains relatively level; that the good outcome patients and bad outcome patients both spike at the first time period (e.g. H0); that the biomarker levels of the good outcome patients decrease with time; that the biomarker levels of the bad outcome patients increase with time and that statistical significance between the good outcome and bad outcome is maintained between 12 hours (H12) and 48 hours (H48) at 6 hours (H6) after ROSC.

Figure 6:
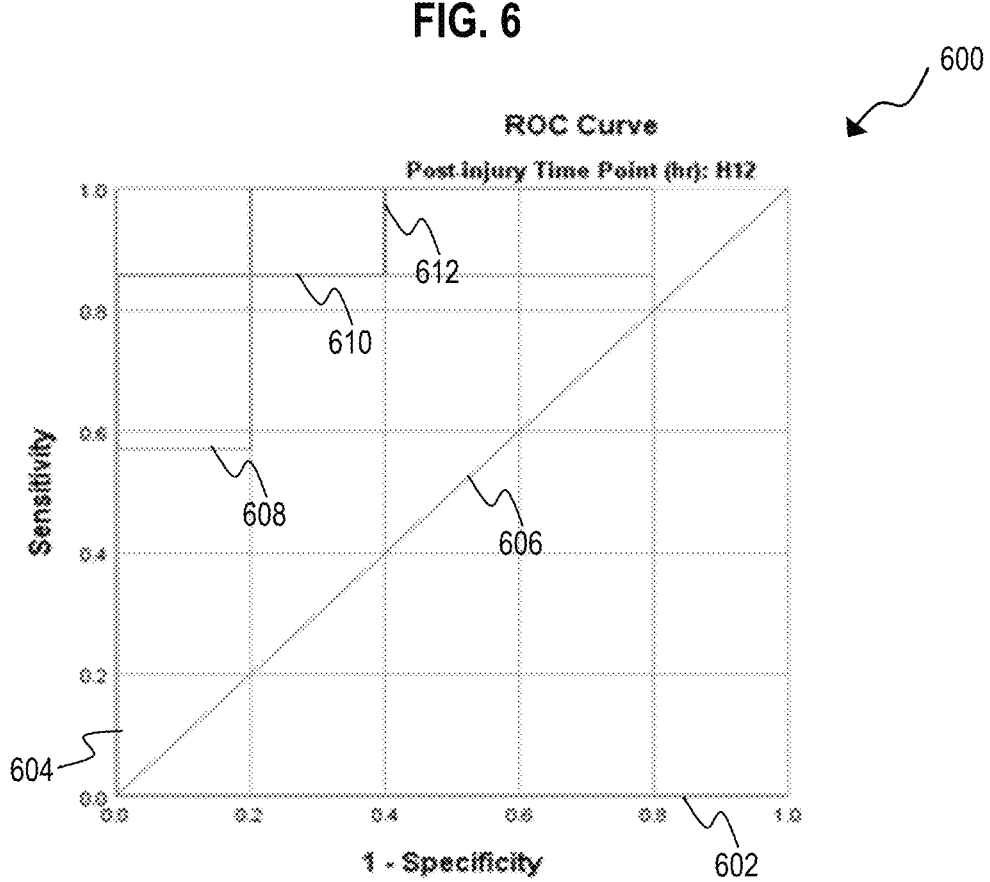
FIG. 6 illustrates an example of a plurality of receiver operating characteristic (ROC) curves for a respective plurality of neurological biomarkers, according to one embodiment.

FIG. 6 illustrates an example of a plurality of receiver operating characteristic (ROC) curves 600 for a respective plurality of neurological biomarkers, according to one embodiment. In an embodiment, the curves 600 are based on the data in Table 4 below for different neurological biomarkers based on a subsequent time period of 12 hours (H12). In another embodiment, the data in table 4 is based on the accuracy (e.g. sensitivity % or rate of predicting the positive neurological outcome and specificity % or rate of predicting the bad neurological outcome) of each respective neurological biomarker level at each subsequent time period to predict a neurological outcome of the patient. Those entries highlighted in red in Table 4 have a 100% specificity or 100% rate of predicting the bad neurological outcome of the In one example embodiment, the GFAP neurological biomarker level at 18 hours after ROSC (H18) provides 100% sensitivity (prediction of the good neurological outcome) and 100% selectivity (prediction of bad neurological outcome), based on a threshold of about 1144.94 pg/ml. Thus, in this example embodiment, 100% of those patients with a GFAP neurological biomarker level greater than 1144.94 pg/ml had a bad outcome (CPC 3-5) whereas 100% of those patients with a GFAP neurological biomarker level less than 1144.94 pg/ml had a good outcome (CPC 1-2). Curve 606 is a reference line. ROC curves 608, 610, 612 (85% sensitivity) represent the GFAP, NF-L and S100B neurological biomarkers at 12 hours after ROSC (H12) that each provide 85.7% sensitivity, based on various numerical thresholds in Table 4. In an example embodiment, those biomarker level thresholds with a 100% sensitivity and 100% selectivity (e.g. GFAP, NFL-L, UCHL-1 at H18; GFAP and UCHL-1 at H24; GFAP, NF-L, UCHL-1, Tau and S100B at H48) are stored in the memory and/or module 112 of the controller 104. In an example embodiment, one or more of these thresholds are utilized in step 210 of the method 200 to obtain a prediction based on the first data and/or subsequent data obtained in steps 202 and 204, where steps 206 and 208 are omitted.

Figure 8B:
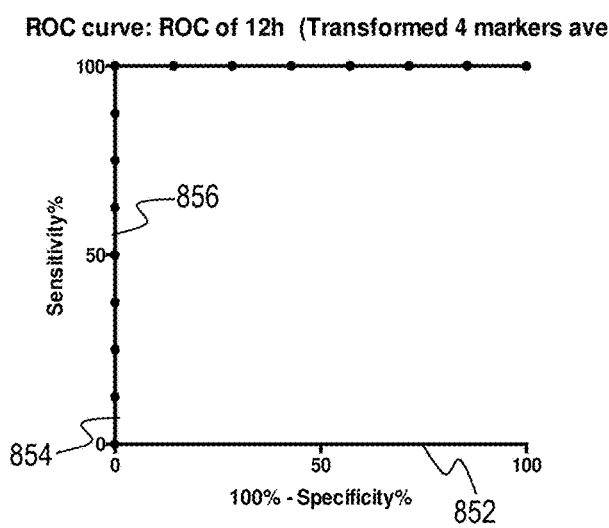
FIG. 8B illustrates an example of a receiver operating characteristic (ROC) curve based on a subsequent time period value for the curves of FIG. 8A, according to one embodiment.
Figure 8C:
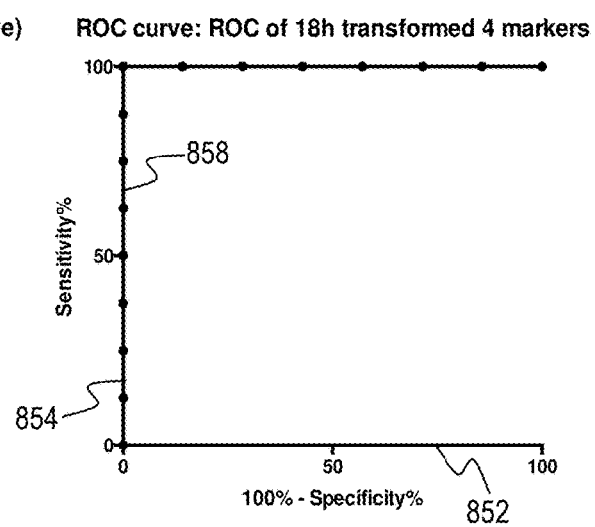
FIG. 8C illustrates an example of a receiver operating characteristic (ROC) curve based on a subsequent time period value for the curves of FIG. 8A, according to one embodiment.
Figure 8D:
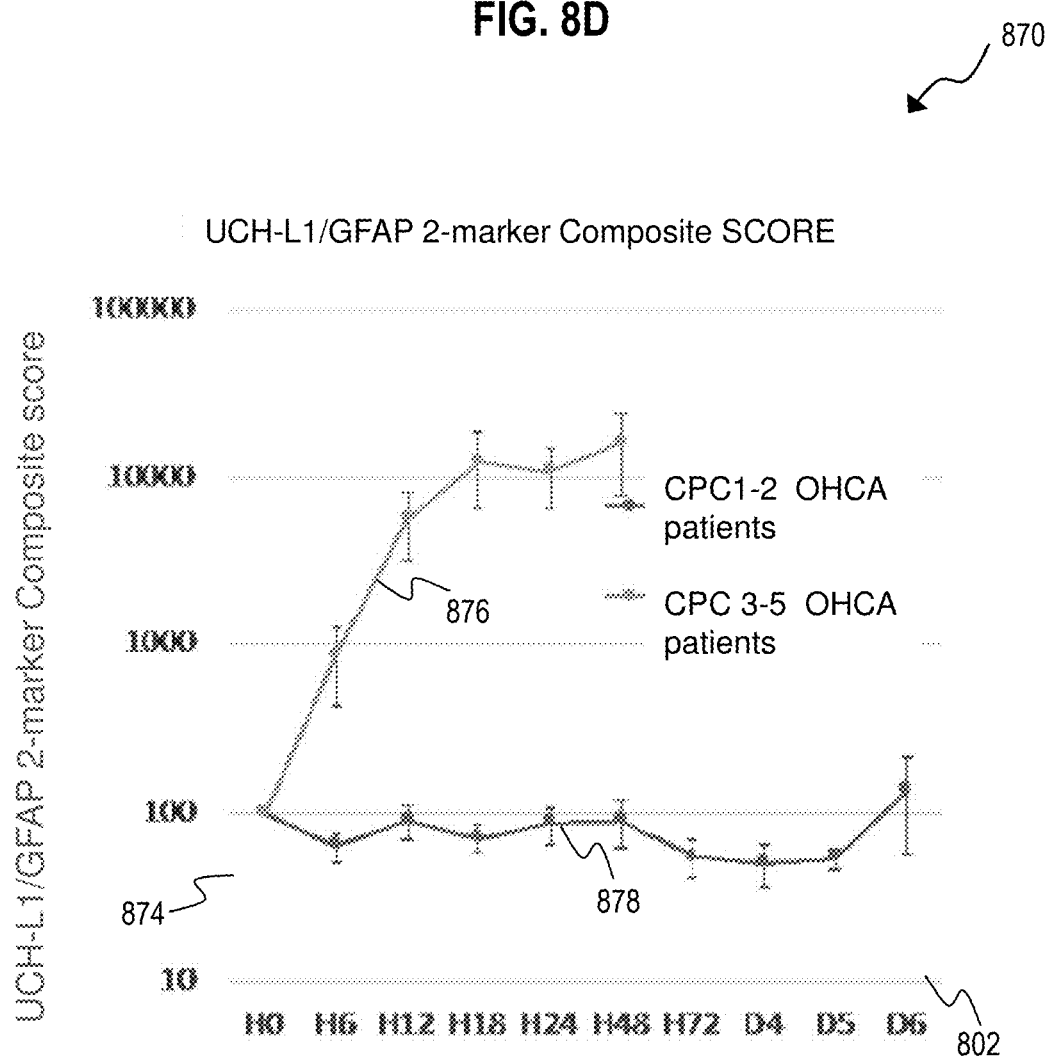
FIG. 8D illustrates an example of a graph that illustrate an example of a pair of curves that indicate a composite score (formed using values for 2 biomarkers UCH-L1 and GFAP) at different time periods after cardiac arrest for sample patients with a good and bad neurological outcome, according to one embodiment.

FIGS. 8B-8C depict respective ROC curves 856, 858 for the four marker composite score based on the subsequent time period of 12 hours (curve 856) and 18 hours (curve 858). Both curves 856, 858 provides 100% sensitivity and 100% selectivity and thus the four marker composite score (using the 12 hour subsequent time period or 18 hour subsequent time period) had a 100% accuracy in terms of predicting the good neurological outcome and bad neurological outcome of the patients. This is advantageous in terms of communicating the prediction determined in step 210 to the family of the patient 116 when deciding on whether and/or how to adjust the level of treatment in step 212.

Figure 7A:
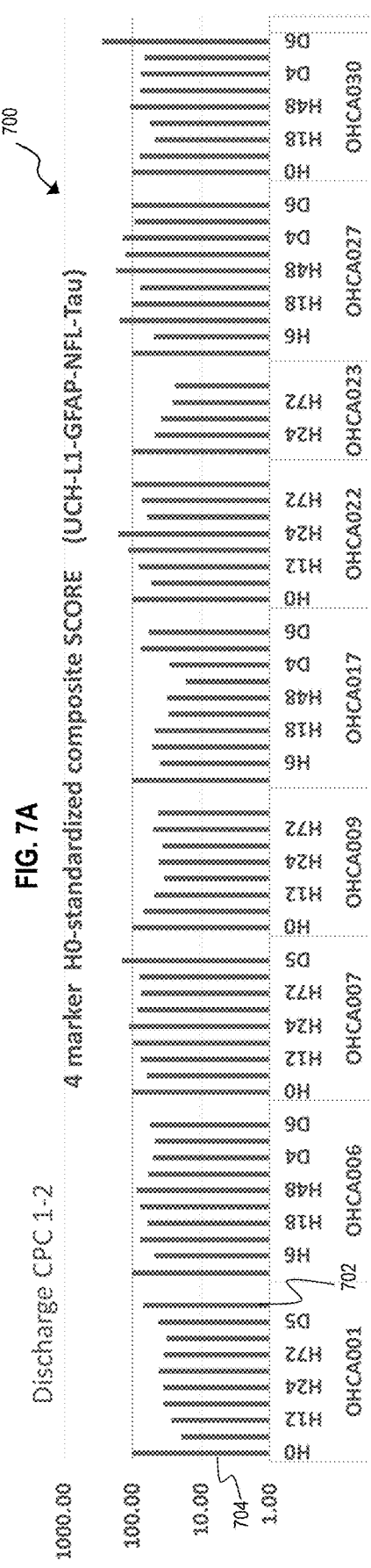
FIG. 7A illustrates an example of a bar graph that illustrate an example of a composite score at different time periods after cardiac arrest for a sample of patients with a good neurological outcome, according to one embodiment.
Figure 7B:
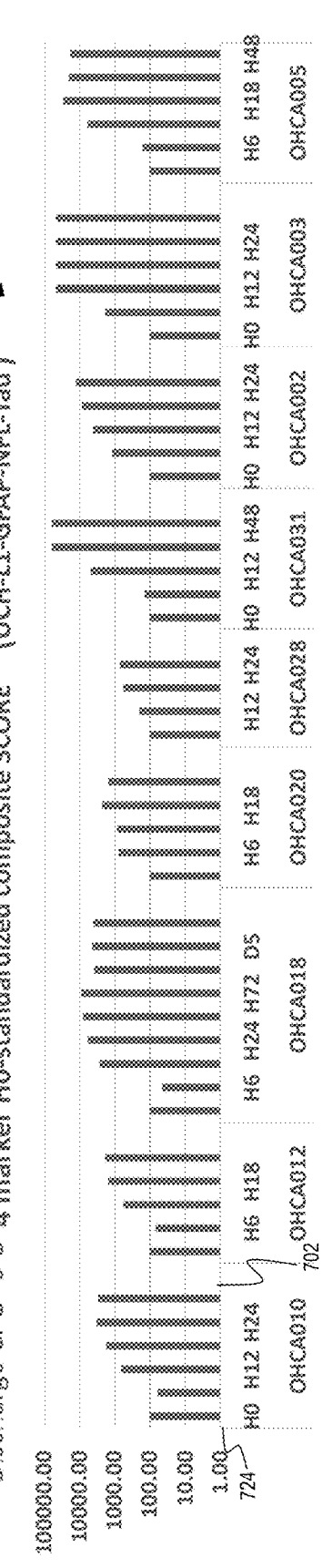
FIG. 7B illustrates an example of a bar graph that illustrate an example of a composite score at different time periods after cardiac arrest for a sample of patients with a bad neurological outcome, according to one embodiment.

FIG. 7A illustrates an example of a bar graph 700 that illustrate an example of a four marker composite score at different time periods after cardiac arrest for a sample of patients with a good neurological outcome, according to one embodiment. The horizontal axis 702 is time in units of hours (H0, H12, etc.). The patients are also listed along the axis 702 based on identifiers (OHCA001, OHCA002, etc.). The vertical axis 704 is the four marker composite score based on equation (8). In an embodiment, the patients depicted in the bar graph 700 are those with a good neurological outcome (e.g. CPC 1-2 at discharge). As depicted in the bar graph 700, the value of the four composite score for each patient with the good neurological outcome remains at or below about 100, and those patients with a value above 100 remain at or below 100 for a substantial majority of the time period (e.g. from 0H to D6). FIG. 7B illustrates an example of a four marker composite score at different time periods after cardiac arrest for a sample of patients with a bad neurological outcome, according to one embodiment. The vertical axis 724 is the value of the four composite score based on equation (8). In an embodiment, the patients depicted in the bar graph 720 are those with a bad neurological outcome (e.g. CPC 3-5 at discharge). As depicted in the bar graph 720, the value of the four composite score for each patient with the bad neurological outcome remains above about 100, and those patients with a value below 100 remain above 100 for a substantial majority of the time period (e.g. from OH to D6). FIGS. 7E and 7F depict similar bar graphs 770, 780 as the bar graphs 700, 720 except using a two marker composite score (e.g. using equation (7)).

Figure 7C:
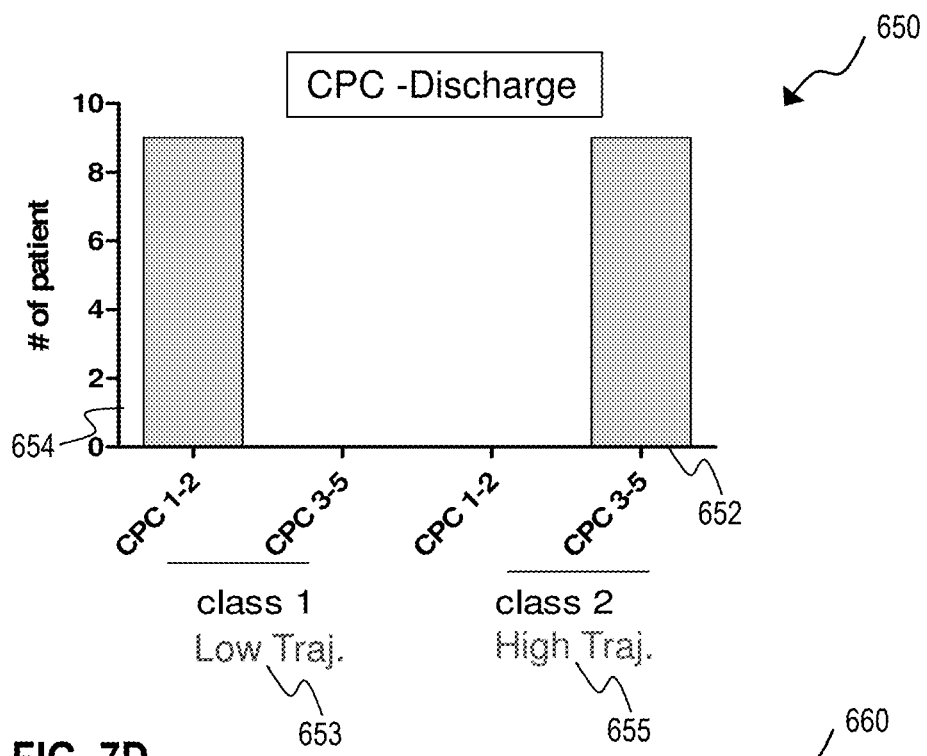
FIG. 7C illustrates an example of a bar graph that illustrates a quantity of patients with a good and bad neurological outcome at a subsequent time period based on a good and bad neurological outcome at a first time period, according to one embodiment.

FIG. 7C illustrates an example of a bar graph 650 that illustrates a quantity of patients with a good and bad neurological outcome at a subsequent time period (e.g. discharge) based on a good and bad neurological outcome at a first time period, according to one embodiment. The horizontal axis 652 is good or bad outcome (e.g. CPC 1-2 or CPC 3-5) of the patient at discharge and the vertical axis 654 is a quantity of patients with the good or bad outcome at discharge. The bar graph 650 depicts that nine patients had a good outcome (e.g. CPC 1-2) at discharge and no patients had a bad outcome (e.g. CPC 3-5) among those who had an initial good outcome 653 (e.g. during the first time period or OH). The bar graph 650 also depicts that nine patients had a bad outcome (e.g. CPC 4-5) at discharge and no patients had a good outcome (e.g. CPC 1-2) among those who had an initial bad outcome 655 (e.g. during the first time period or OH).

Figure 7D:
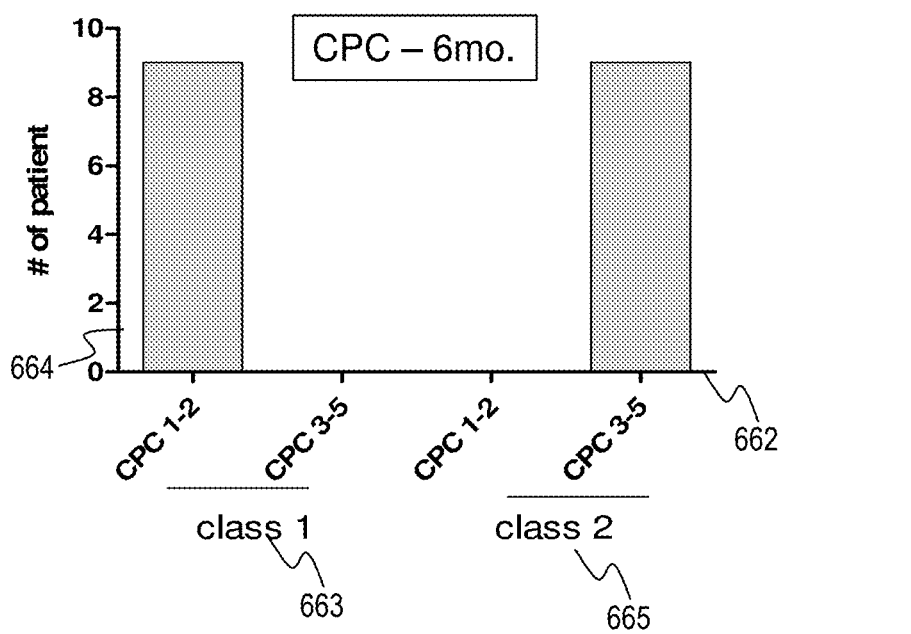
FIG. 7D illustrates an example of a bar graph that illustrates a quantity of patients with a good and bad neurological outcome at a subsequent time period based on a good and bad neurological outcome at a first time period, according to one embodiment.
Figures 7E, 7F:
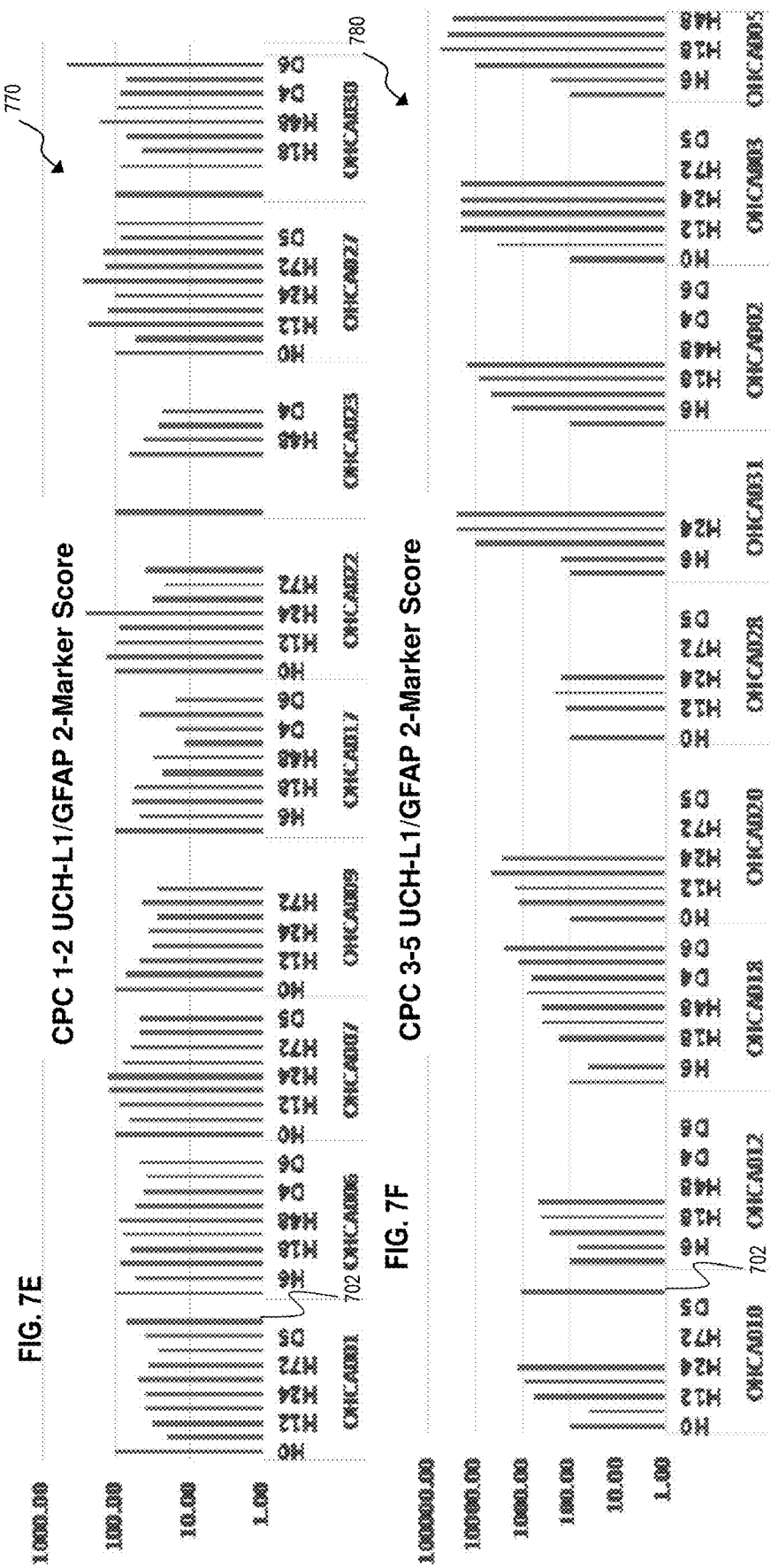
FIG. 7E illustrates an example of a bar graph that illustrate an example of a composite score at different time periods after cardiac arrest for a sample of patients with a good neurological outcome, according to one embodiment.
FIG. 7F illustrates an example of a bar graph that illustrate an example of a composite score at different time periods after cardiac arrest for a sample of patients with a bad neurological outcome, according to one embodiment.

FIG. 7D illustrates an example of a bar graph 660 that illustrates a quantity of patients with a good and bad neurological outcome at a subsequent time period (e.g. 6 months) based on a good and bad neurological outcome at a first time period, according to one embodiment. The horizontal axis 662 is good or bad outcome (e.g. CPC 1-2 or CPC 3-5) of the patient at 6 months and the vertical axis 664 is a quantity of patients with the good or bad outcome at 6 months. The bar graph 660 depicts that nine patients had a good outcome (e.g. CPC 1-2) at 6 months and no patients had a bad outcome (e.g. CPC 3-5) among those who had an initial positive outcome 663 (e.g. during the first time period or OH). The bar graph 660 also depicts that nine patients had a bad outcome (e.g. CPC 3-5) at 6 months and no patients had a good outcome (e.g. CPC 1-2) among those who had an initial bad outcome 655 (e.g. during the first time period or OH).

Figure 9:
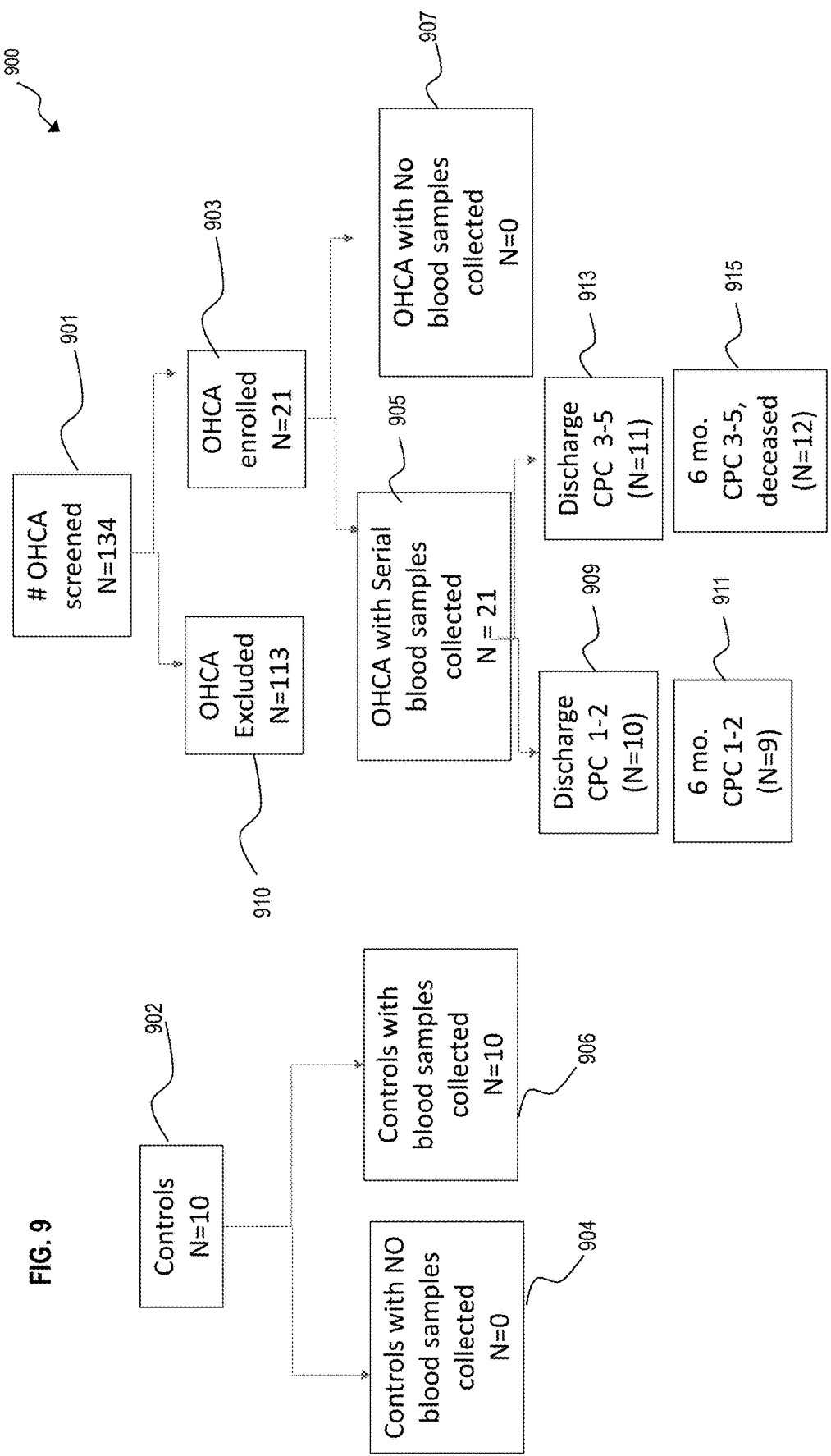
FIG. 9 is a flow diagram that illustrates an example of a method for performing the method of FIG. 2B, according to one embodiment.

FIG. 9 is a flow diagram 900 that illustrates an example of a3 method for performing the method of FIG. 8B, according to one embodiment. In an embodiment. The method begins at block 901 where a number of subjects are screened (e.g. using Table 2). Some of the screened subjects were excluded (block 910) and the remaining screened subjects were included or enrolled (block 903). Table 5 provides an example embodiment of data regarding the screening of the subjects.

TABLE 5

| EXCLUDED | |
|---|---|
| "Vulnerable" | 1 |
| Anemia | 3 |
| Brain Injury, Acute | 2 |
| Competing Study | 8 |
| Consent, no LAR | 3 |
| Consent, Refusal | 2 |
| DNR | 1 |
| ESLD | 2 |
| ESRD | 5 |
| Expired < 6 hrs | 3 |
| IHCA | 1 |
| Neuro Dz | 6 |
| No ROSC | 30 |
| Not true OHCA (no loss of pulses) | 3 |
| Out of Window (post-arrest transfer) | 14 |
| Pediatric | 5 |
| Prisoner | 10 |
| Pt transferred rapidly to another unit | 4 |
| Trauma | 10 |
| Total Excluded | 113 |
| Total eligible OHCAs enrolled | 21 |
| Total screened | 134 |

The number of controls are counted in block 902. Blood samples 103 are collected from all of the controls (blocks 904, 906). The non-control subjects are counted at block 903. Blood samples are collected from all of the enrolled non-control subjects (block 905, 907). The neurological outcome of the subjects is classified and counted at discharge as either good (CPC 1-2 at block 909) or bad (CPC 3-5 at block 913). Additionally, the neurological outcome of the subjects is classified and counted at 6 months as either good (CPC 1-2 at block 915) or bad (deceased or CPC 3-5 at block 911). It should be noted that the number of subjects shown in FIG. 9 are merely one example of a number of subjects that were screened, a number of controls, and a number of enrolled subjects and thus does not limit the scope of the embodiments of the present invention.

3. Hardware Overview

Figure 10:
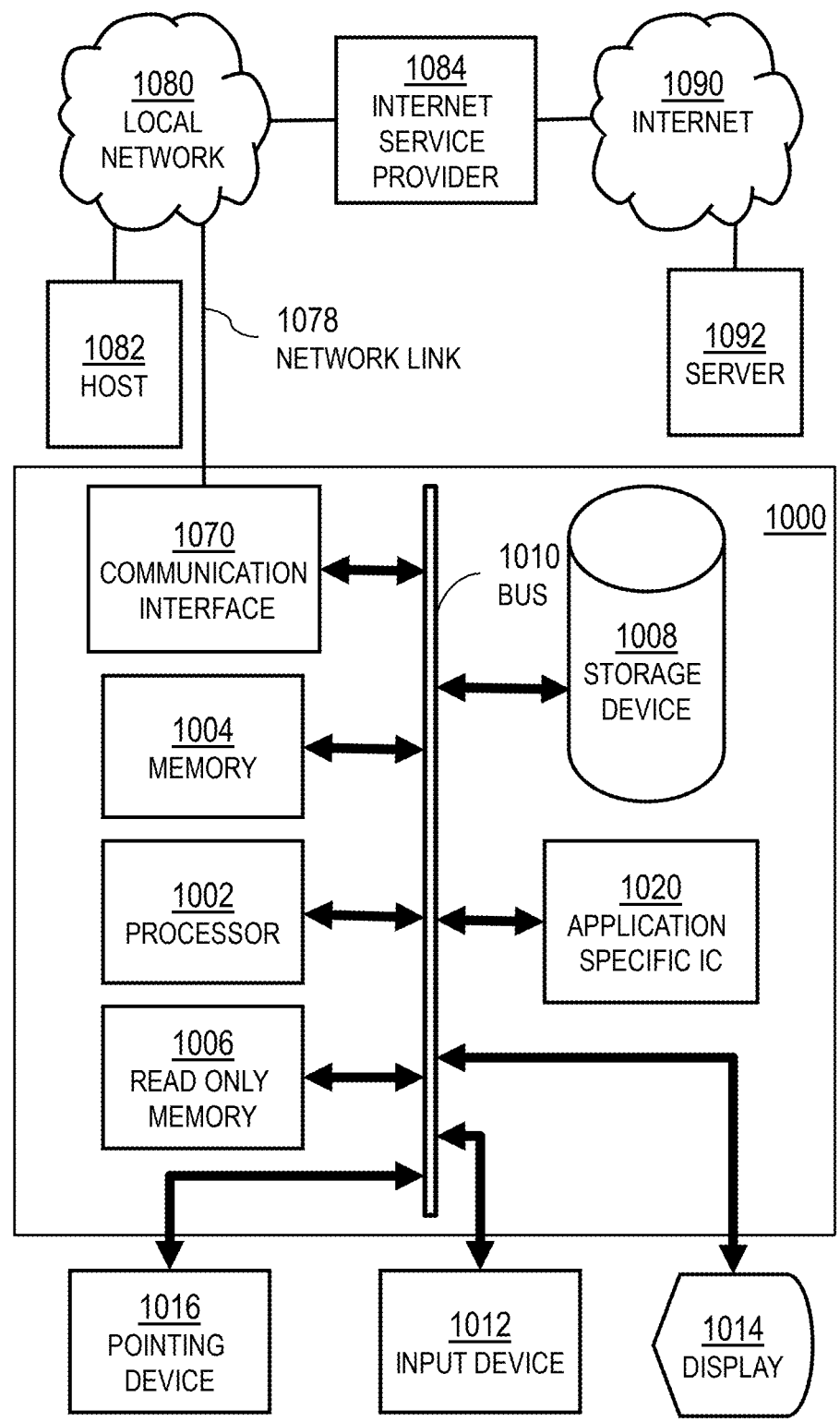
FIG. 10 is a block diagram that illustrates a computer system upon which an embodiment of the invention may be implemented.

FIG. 10 is a block diagram that illustrates a computer system 1000 upon which an embodiment of the invention may be implemented. Computer system 1000 includes a communication mechanism such as a bus 1010 for passing information between other internal and external components of the computer system 1000. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of one or more methods described herein.

A sequence of binary digits constitutes digital data that is used to represent a number or code for a character. A bus 1010 includes many parallel conductors of information so that information is transferred quickly among devices coupled to the bus 1010. One or more processors 1002 for processing information are coupled with the bus 1010. A processor 1002 performs a set of operations on information. The set of operations include bringing information in from the bus 1010 and placing information on the bus 1010. The set of operations also typically include comparing two or more units of information, shifting positions of units of information, and combining two or more units of information, such as by addition or multiplication. A sequence of operations to be executed by the processor 1002 constitutes computer instructions.

Computer system 1000 also includes a memory 1004 coupled to bus 1010. The memory 1004, such as a random access memory (RAM) or other dynamic storage device, stores information including computer instructions. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of computer instructions. The computer system 1000 also includes a read only memory (ROM) 1006 or other static storage device coupled to the bus 1010 for storing static information, including instructions, that is not changed by the computer system 1000. Also coupled to bus 1010 is a non-volatile (persistent) storage device 1008, such as a magnetic disk or optical disk, for storing information, including instructions, that persists even when the computer system 1000 is turned off or otherwise loses power.

Information, including instructions, is provided to the bus 1010 for use by the processor from an external input device 1012, such as a keyboard containing alphanumeric keys operated by a human user, or a sensor. A sensor detects conditions in its vicinity and transforms those detections into signals compatible with the signals used to represent information in computer system 1000. Other external devices coupled to bus 1010, used primarily for interacting with humans, include a display device 1014, such as a cathode ray tube (CRT) or a liquid crystal display (LCD), for presenting images, and a pointing device 1016, such as a mouse or a trackball or cursor direction keys, for controlling a position of a small cursor image presented on the display 1014 and issuing commands associated with graphical elements presented on the display 1014.

In the illustrated embodiment, special purpose hardware, such as an application specific integrated circuit (IC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1070 sends and receives electrical, acoustic or electromagnetic signals, including infrared and optical signals that carry information streams, such as digital data.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1002, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1002, except for carrier waves and other signals.

Logic encoded in one or more tangible media includes one or both of processor instructions on a computer-readable storage media and special purpose hardware, such as ASIC 1020.

Network link 1078 typically provides information communication through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090. A computer called a server 1092 connected to the Internet provides a service in response to information received over the Internet. For example, server 1092 provides information representing video data for presentation at display 1014.

The invention is related to the use of computer system 1000 for implementing the techniques described herein. According to one embodiment of the invention, those techniques are performed by computer system 1000 in response to processor 1002 executing one or more sequences of one or more instructions contained in memory 1004. Such instructions, also called software and program code, may be read into memory 1004 from another computer-readable medium such as storage device 1008. Execution of the sequences of instructions contained in memory 1004 causes processor 1002 to perform the method steps described herein. In alternative embodiments, hardware, such as application specific integrated circuit 1020, may be used in place of or in combination with software to implement the invention. Thus, embodiments of the invention are not limited to any specific combination of hardware and software.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server 1092 transmits program code for a particular application, requested by a message sent from computer 1000, through Internet 1090, ISP equipment 1084, local network 1080 and communications interface 1070. The received code may be executed by processor 1002 as it is received, or may be stored in storage device 1008 or other non-volatile storage for later execution, or both. In this manner, computer system 1000 may obtain application program code in the form of a signal on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red a carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
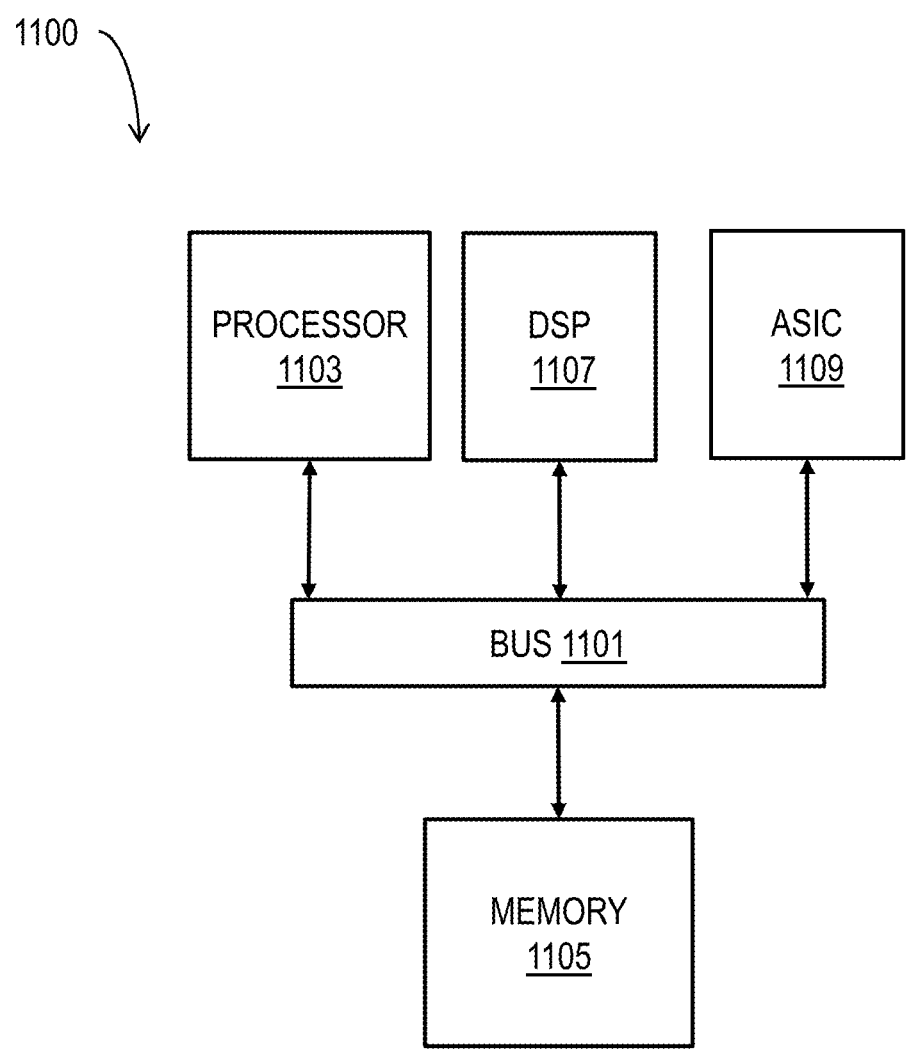
FIG. 11 is a block diagram that illustrates a chip set upon which an embodiment of the invention may be implemented.

FIG. 11 illustrates a chip set 1100 upon which an embodiment of the invention may be implemented. Chip set 1100 is programmed to perform one or more steps of a method described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of a method described herein.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1105 also stores the data associated with or generated by the execution of one or more steps of the methods described herein.

Examples

The following Examples further support the principles set forth in the description above.
Methods
Study Design and Populations
This pilot study was a prospective, observational study of adult (age ≥18 years) non-traumatic OHCA patients presenting to a tertiary care academic emergency department (ED) via local emergency medical services (EMS) agencies between May 1, 2017 and Jan. 28, 2020. OHCA cohorts consisted of a convenience sample of patients from whom initial blood sample collection was feasible within one hour from ROSC, and who had ROSC sustained for greater than 1 hour. Patients who were pregnant, incarcerated, or had advance directives precluding resuscitative measures were excluded. Exclusion criteria also included preexisting medical conditions with significant probability of altering circulating concentrations of brain proteins not due to OHCA-induced brain injury. Specifically, patients with neurologic disorders (e.g. Alzheimer's disease, multiple sclerosis, seizure disorders), brain injuries (e.g. cerebrovascular accident, traumatic brain injury), or brain cancer were excluded. End-stage liver disease (ESLD) and end-stage renal disease (ESRD) patients were also excluded given unpredictable effects of impaired renal or hepatic clearance on baseline or post-cardiac arrest biomarker levels. Using the same inclusion and exclusion criteria, the control cohort consisted of 10 age- and gender-matched ED patients admitted for chest pain observation.

Cardiac arrest resuscitation and subsequent care followed standard practices, including targeted temperature management for eligible patients. Following prehospital or ED ROSC, initial blood samples (H0; 0-59 minutes) were collected during ED resuscitative measures. Subsequent blood samples were collected at post-arrest hours 6, 12, 18, 24, and five days thereafter, until death, withdrawal of life-sustaining treatment (WLST), or hospital discharge. Control patients' blood was drawn following the same time course.

The study was approved by the local institutional review board (IRB Project #: 201700133; Clinical trial #: NCT03112486). Delayed written informed consent was obtained within 48 hours from each patient or the patient's legally authorized representative (LAR) for healthcare decision-making if the patient did not regain medical decision-making capacity.

Outcome Measures

Biomarker analyses were performed by investigators blinded to clinical data. GFAP, NF-L, UCH-L1, and Tau concentrations were measured using the same batch of reagents using a SIMOA neuro 4-plex kit in SR-X immunoassay analyzer (Quanterix Corp, Boston, MA, USA) running ultrasensitive paramagnetic bead-based enzyme-linked immunosorbent assays. Serum S100B concentrations were measured using commercial sandwich ELISA kits (cat #EZHS100B-33K, EMD Millipore, Burlington M A). All assays were conducted according to manufacturer protocols. Lab protocols are included in supplemental materials.

Patients' neurologic outcome as defined by Cerebral Performance Category (CPC)[18] was ascertained in person by research staff at time of hospital discharge or at last neurologic status before WLST or non-WLST death. Neurologic outcome was dichotomized into good (CPC 1-2) and poor (CPC 3, 4, 5) outcome, consistent with contemporary approaches.[1,8,19] To confirm CPC accuracy, retrospective chart review was performed by two independent investigators, including a board-certified neurointensivist (CBM) blinded to biomarker data. Re-evaluation of all survivors' neurologic status was performed at six months via chart review or telephone call.

Statistical Analysis

Biomarker values were logarithmically transformed to attain normal distribution. Descriptive statistics (i.e., mean, median, standard deviation, interquartile range) were calculated for continuous variables. Mann-Whitney U and Kruskal-Wallis tests were conducted to assess differences between groups for continuous variables. Frequencies and percentages were determined for categorical variables, and Chi-square, with Fisher's exact test, was used to determine associations for categorical variables. The accuracy of biomarker levels to differentiate between good and poor outcome was evaluated by the receiver operating characteristic (ROC) analysis. All tests were two tailed, with a significance level set at 0.05 and the analysis was performed in Stata 15.0.

A composite biomarker profile was developed utilizing multiple biomarkers' deviations from initial value. As GFAP, NF-L, UCH-L1, and Tau represent astroglial injury, axonal injury, neuron cell body injury, and neurodegeneration, respectively, they were used to represent potential major neuropathological pathways. S100B was not included in the combined score as it functions similarly to GFAP as an astroglial biomarker. In order to standardize individual biomarkers' deviation from their respective initial (H0) concentrations, the serum concentration at a given time point (e.g., H6) was divided by its H0 concentration, then multiplied by 100 to obtain a marker score (Equation 1. We then generated a composite marker score at each time point from the weighted sum of each markers' deviations from H0 (Equation 2). Statistical significance was assessed using Mann-Whitney U.

Equation 9:
Marker score at time point=(marker concentration at time point/marker at concentration at $H0$)×100

Equation 10:
Composite score=(marker$_1$score+marker$_2$score+ ... marker$_N$ score)/$N$ The predictive utility of early biomarker changes over time was assessed using trajectory analysis. Using machine learning independent of patient outcome data (described in below), group membership into low- or high-trajectory progression was ascertained for each patient.[20,21]

Supplemental Description of Biomarker Assays:

Frozen samples and calibrator were equilibrated to room temperature and diluted with specific sample diluent. For SIOMA assay, calibrators, samples, detector, and beads were dispensed in each well and plates were incubated at 30° C. with shaking at 800 rpm for 30 minutes. After washing steps, 100 µl SBG was added to each well and plates were incubated at 30° C. with shaking at 800 rpm for 10 minutes. After washing steps, beads were re-suspended twice at 1000 rpm for 1 minute. A final washing step was performed, and plates were dried for 10 minutes before being transferred to the SR-X for reading. For S100B assay, calibrators, and samples were incubated at 4° C. overnight. After washing steps, detector was added and incubated at room temperature for 1 hour, followed by wash steps and TMB substrate incubation. The plates were read at 490 nm immediately after adding stop solution. In cases of readings greater than upper limit of detectability, the maximal registered value was recorded.

Trajectory analyses were conducted using SAS 9.4, R 3.4, and R studio 1.0 statistical software. Using the LCMM 1.7.8 package in R (arxiv.org/pdf/1503.00890.pdf), we used unconditional LCMM for ordinal data to model the combination of four biomarkers' trajectories over time and to classify patients into distinct latent trajectory classes. The only variables used to infer latent class were subject, combined biomarker levels (ratios to the 0-6 h data point), and time. We used unconditional LCMM (instead of conditional LCMM) because our primary aim was to describe the "raw" latent biomarker trajectories in the population without imposing any conditions or predictors on the model. Our secondary aim was to then explore predictors of these unconditional trajectories. LCMM assumes that the population is heterogeneous and is divided into distinct groups, with each group having its own trajectory of combined biomarker levels versus time. LCMM, like other likelihood-based methods, can analyze data with missing observations. If missing observations are missing in a way that depends only on observed values, then the estimates will be unbiased. Starting with a one-class model, we fitted models with increasing numbers of classes until we reached the inflection point of the Akaike information criterion (AIC). The AIC is a way to identify the point at which the benefits of improved model fit are outweighed by the cost of model complexity. We additionally examined the log likelihood, a measure of goodness of model fit regardless of model complexity, and the Bayesian information criteria (BIC). The BIC is similar to the AIC but has a slightly different threshold such that increased model complexity is penalized more heavily than it is in the AIC, generally resulting in an inflection point at a less complex model.

Results

Figure 13:
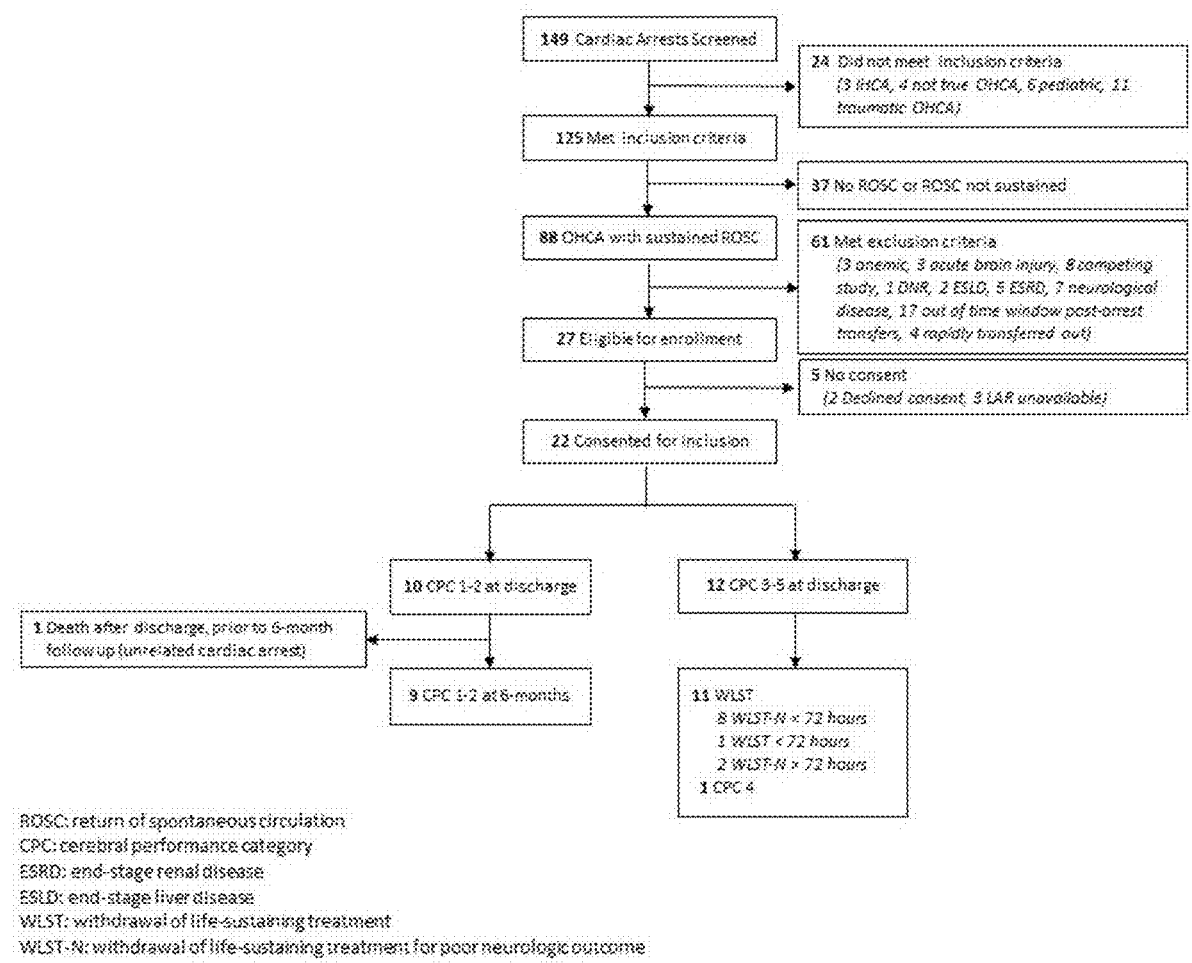
FIG. 13: Flow diagram for out-of-hospital cardiac arrest patient enrollment and outcomes. Abbreviations: CPC: cerebral performance category; ESRD: end-stage renal disease; ESLD: end-stage liver disease; ROSC: return of spontaneous circulation; WLST: withdrawal of life-sustaining treatment.
Figure 14:
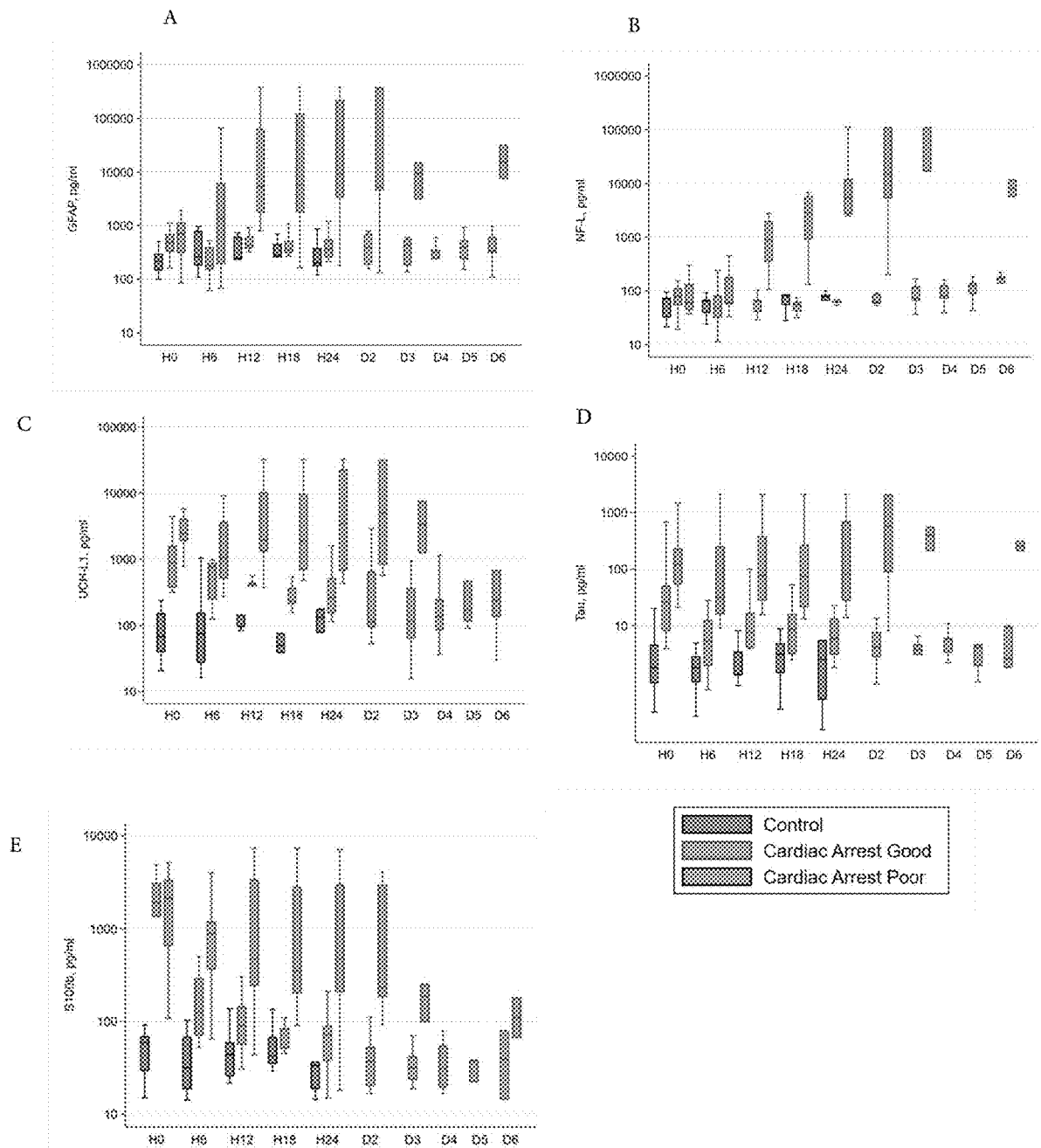
FIG. 14: Log-scale biomarker concentrations over time in control, good neurological outcome, and poor neurological outcome patients. Shown are median (line), upper and lower quartiles (box) and range (whiskers).

Study Population:

Screening, enrollment, and outcomes are depicted in FIG. 13. A total of 149 patients were screened, and 22 were included in the study. Of these, 10 were discharged with CPC 1 or 2, 1 had discharge CPC of 4, and 11 had WLST. Of the 11 WLST patients, 10 had WLST for due to perceived poor neurologic prognosis, and one patient had WLST for non-neurologic poor overall prognosis. The control cohort consisted of 10 non-OHCA chest pain observation patients. Characteristics of OHCA patients and controls are shown in Table 6. Statistically significant differences between good and poor neurologic outcomes were observed in cardiac arrest type, targeted temperature management treatment, and downtime duration.

Individual Biomarker Relation to Neurologic Outcome:

Log-scale median and interquartile range serum concentrations of (a) GFAP, (b) NF-L, (c) UCH-L1, (d) Tau, and (e) S100B over time in control, good outcome, and poor outcome patients are depicted in FIG. 14(a)-(e). Control patients' serum biomarker concentrations remained at baseline throughout hospitalization for all biomarkers. The earliest significant difference between good and poor outcome patients' serum biomarkers were at H12 for GFAP (good: median 425 pg/ml, IQR 370-630; poor: median 5954 pg/ml, IQR 1712-65055 pg/ml; p<0.001), H12 for NF-L (good: median 64 pg/ml, IQR 41-69; poor: median 898 pg/ml, IQR 348-1990 pg/ml; p<0.001), H0 for Tau (good: median 31 pg/ml, IQR 8-51; poor: median 124 pg/ml, IQR 53-238 pg/ml; p=0.025), H0 for UCH-L1 (good: median 898 pg/ml, IQR 375-1600; poor: median 2475 pg/ml, IQR 1898-4098 pg/ml; p=0.008), and H6 for S100B (good: median 123 pg/ml, IQR 70-290; poor: median 895 pg/ml, IQR 360-1199 pg/ml; p=0.002). Statistically significant differences persisted until D3 for all biomarkers. See Table 7 for full data set.

ROC curves for all biomarkers during time points H0 through D3 are depicted in FIG. 17. To maximize utility in detection of poor neurologic outcome, cutoff values (pg/ml) were derived corresponding to 100% specificity for poor neurologic outcome. The earliest cutoff for each was GFAP 1513 pg/ml (H12; sens: 90%), NF-L 173.7 pg/ml (H12; sens: 90%), Tau 1479 pg/ml (H0; sens 8.33%), UCH-L1 4670 pg/ml (H0; sens 16.67), and S100B 509.37 pg/ml (H6; sens 72.73). Simultaneous 100% sensitivity and specificity were reached on D3 for GFAP (3019 pg/ml), NF-L (16859 pg/ml), UCH-L1 (1228 pg/ml), and S100B (97.69). See Table 8 for full result set.

Figure 15A:
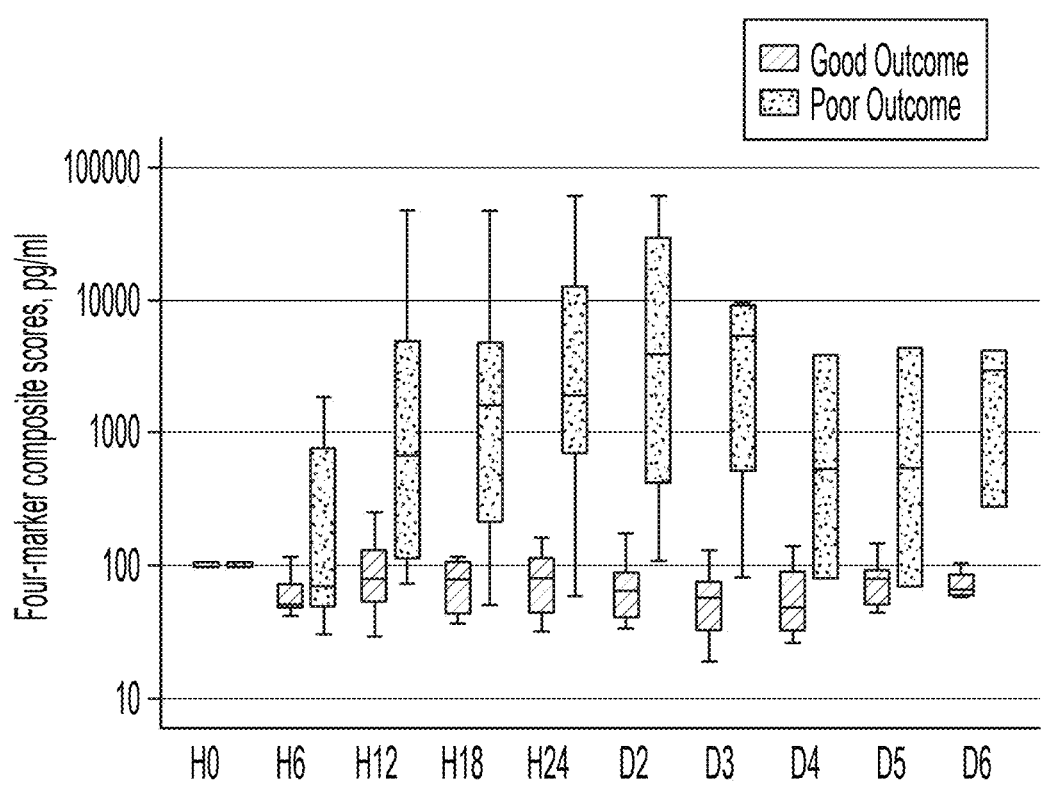
FIG. 15: Four-marker composite score differentiates neurological outcome. (a) Log-scale four-marker composite scores (formed using values for UCH-L1, GFAP, NF-L and Tau) over time are depicted as median (line), upper and lower quartiles (box) and range (whiskers). Statistically significant difference is reached at H12 (p=0.003; Mann-Whitney). 4-marker ROC curves for H6, H12, H18, H24, D2, and D3 are depicted in (b)-(g), respectively.
Figure 15C:
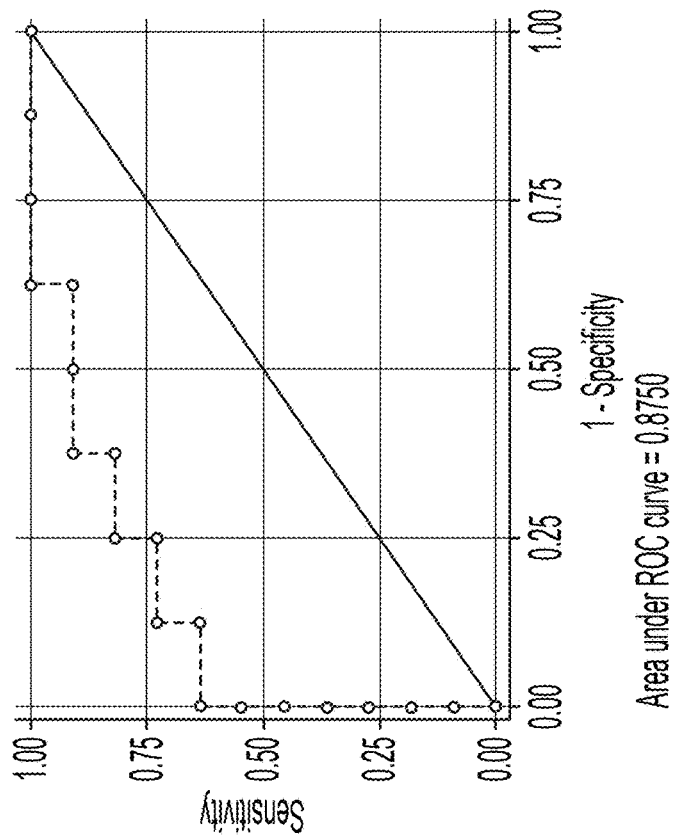
Figure 15B:
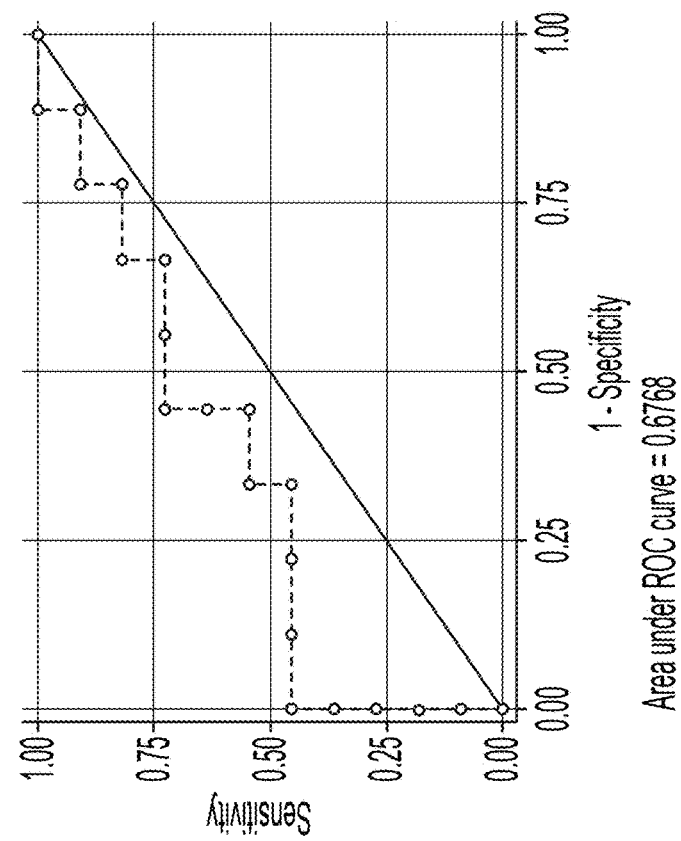
Figures 15D, 15E:
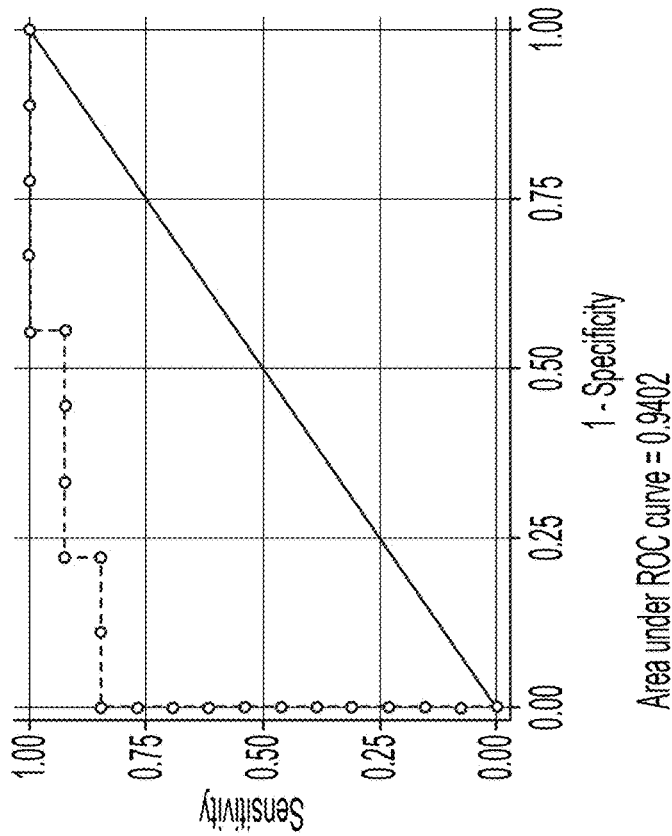
Figure 15G:
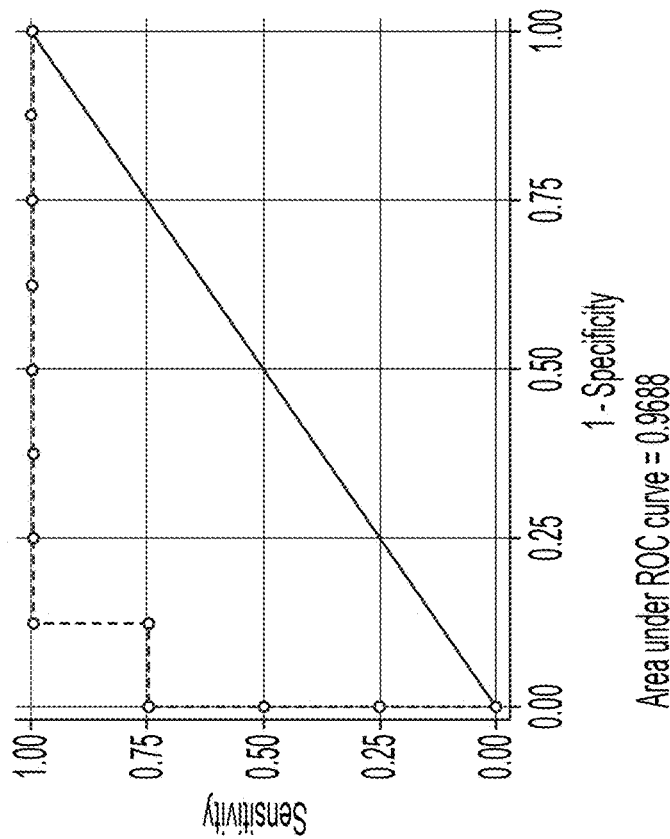
Figure 15F:
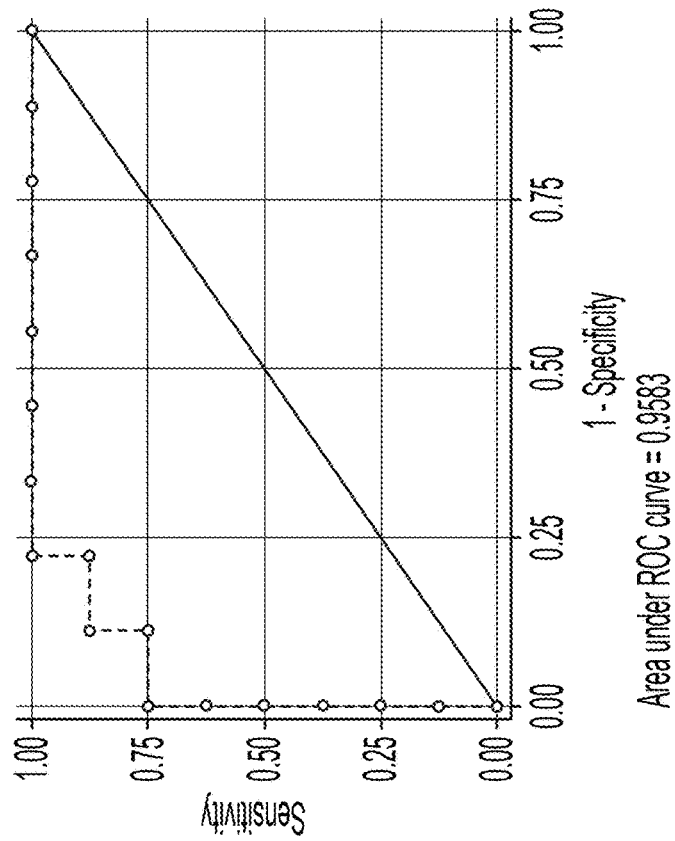

Composite Biomarker Score Relation to Neurologic Outcome:

FIG. 15(a) depicts log-scale 4-marker (GFAP, NF-L, UCH-L1, Tau) standardized composite scores over time for good and poor outcome patients. For good outcome patients, the weighted composite score remained slightly negative due to down trending UCH-L1 and Tau. In contrast, the four-marker composite score for poor outcome patients rose sharply upward, reaching statistically significant difference at H12 (good: median 78.03 pg/ml, IQR 52.03-111.25; poor: median 749 pg/ml, IQR 198.46-4870.63 pg/ml; p=0.003) and continuing to D3. ROC curves for 4-marker composite scores at 6, 12, 18, and 24 hours are shown in FIG. 15(b)-(g).

Figure 16A:
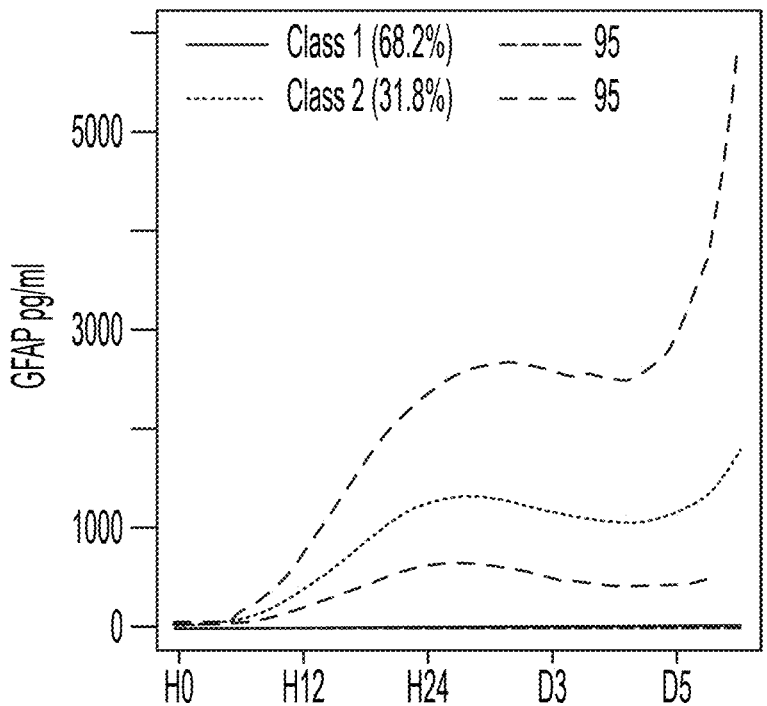
FIGS. 16A-H: Outcome prediction derivation through trajectory analysis. Individual patients' biomarker trajectories were independently sorted for best fit into low- or high-trajectory groups (Class 1 and Class 2, respectively.
Figure 16D:
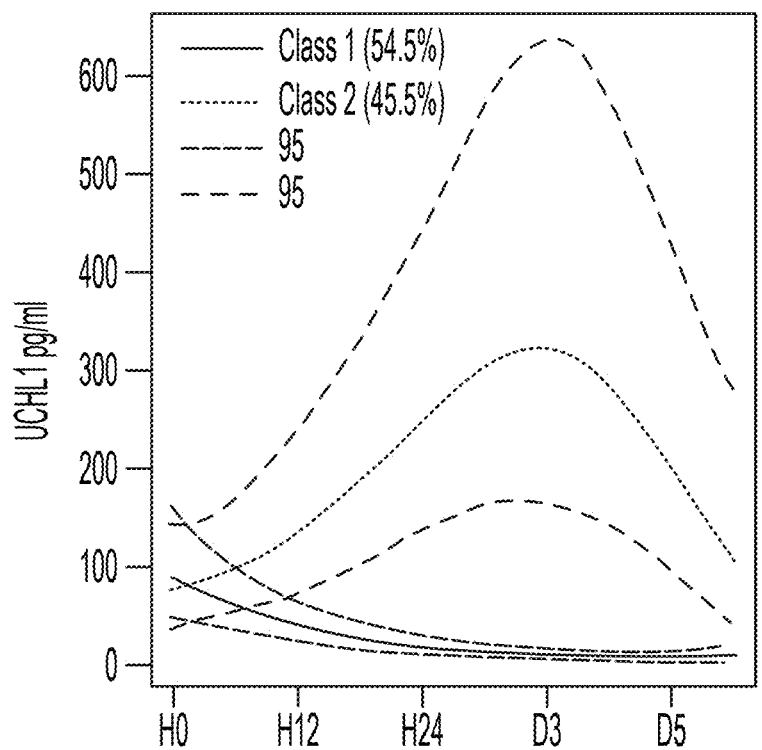
Figure 16B:
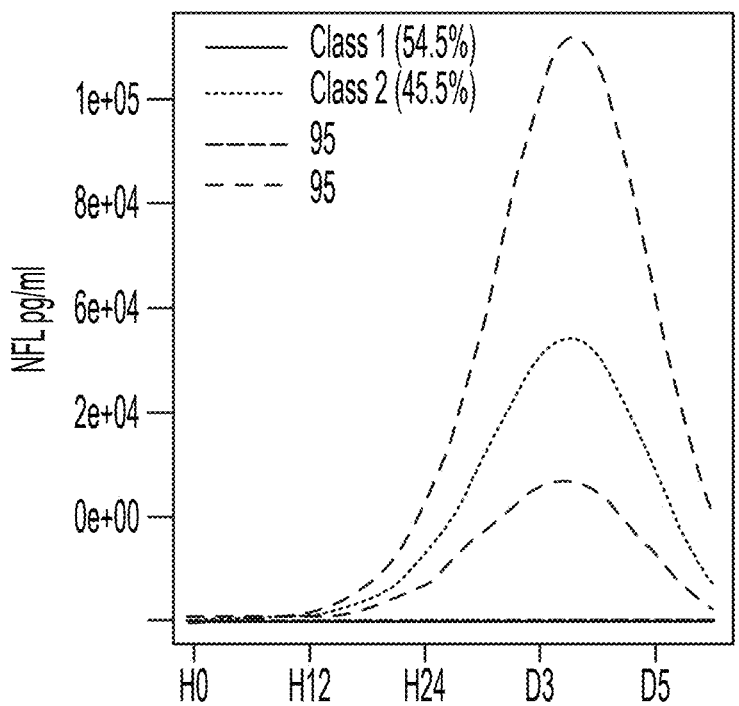
Figure 16E:
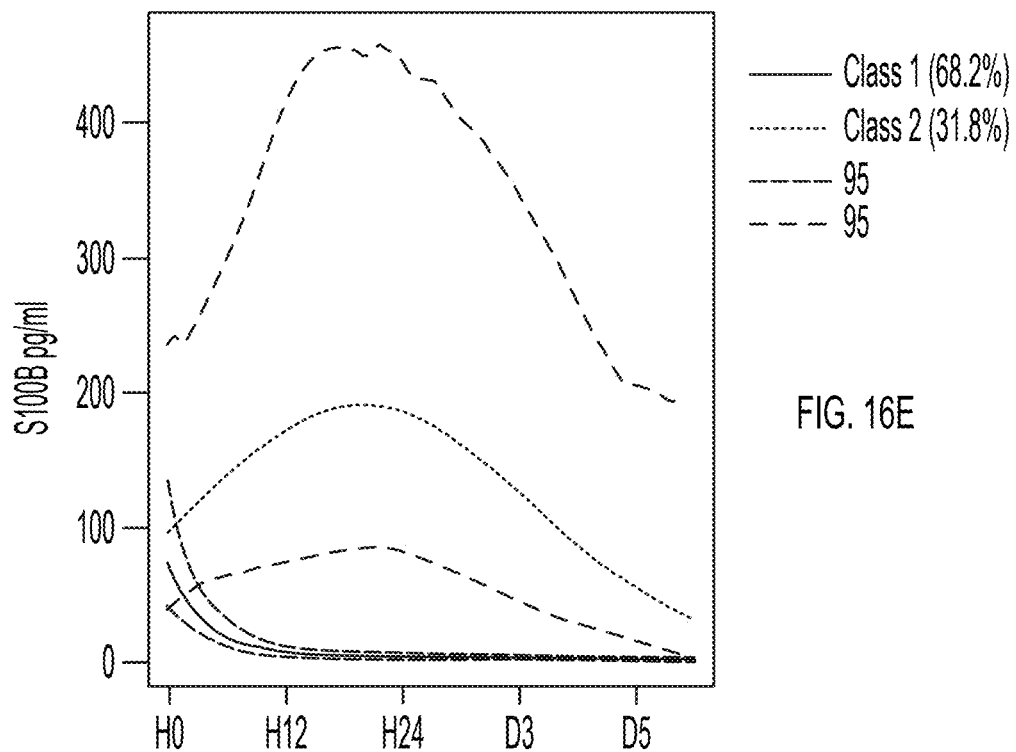
Figure 16C:
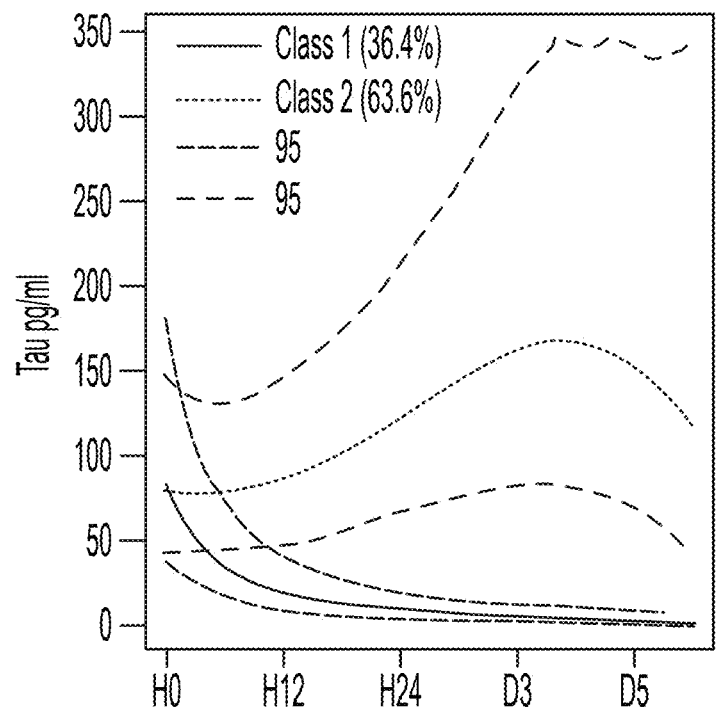
Figure 16F:
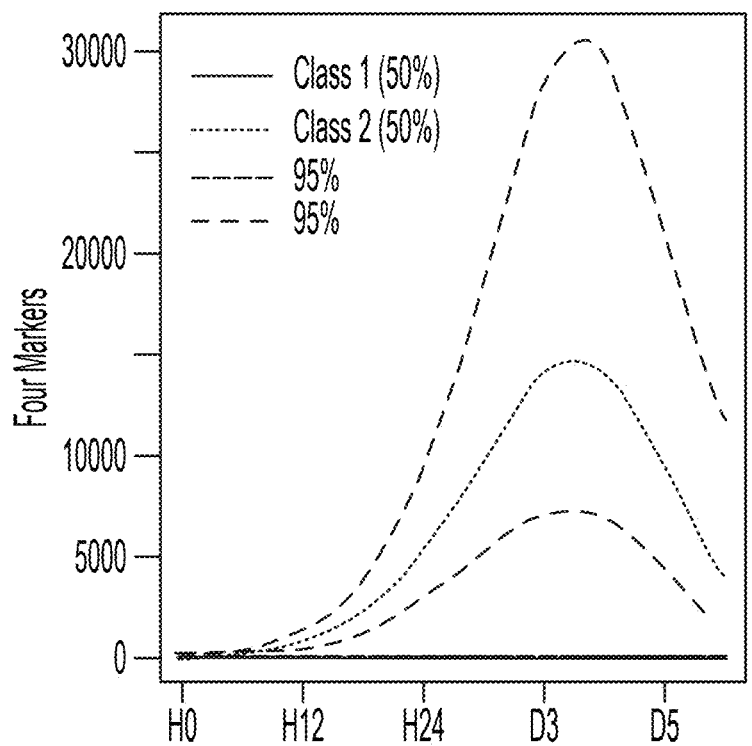
Figure 16G:
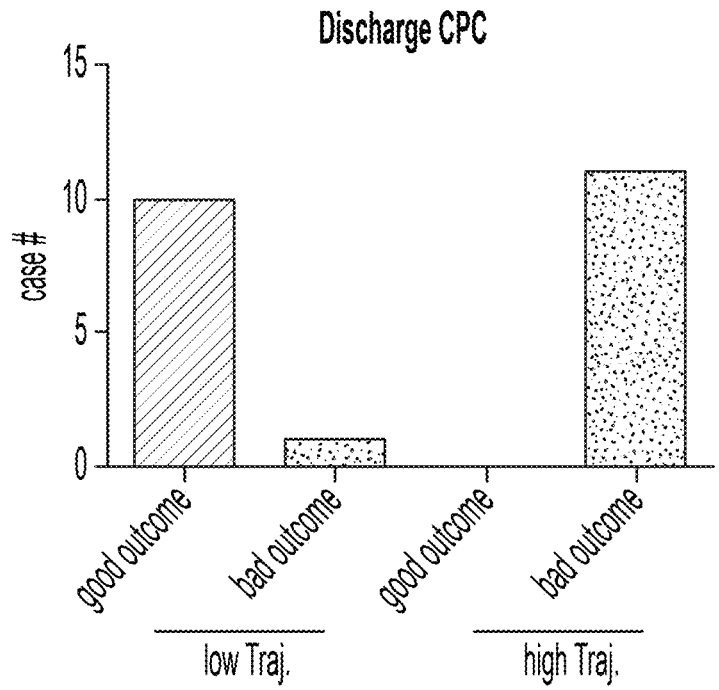
Figure 16H:
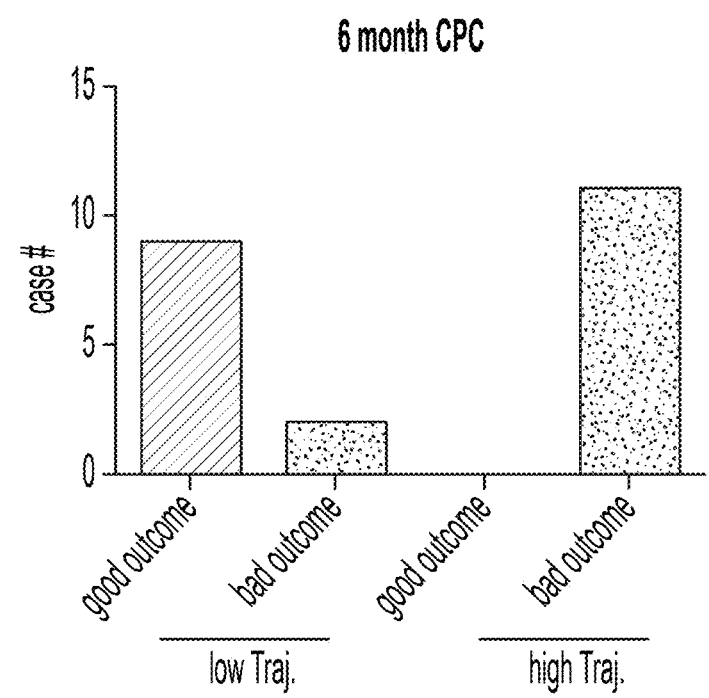
Figure 17B:
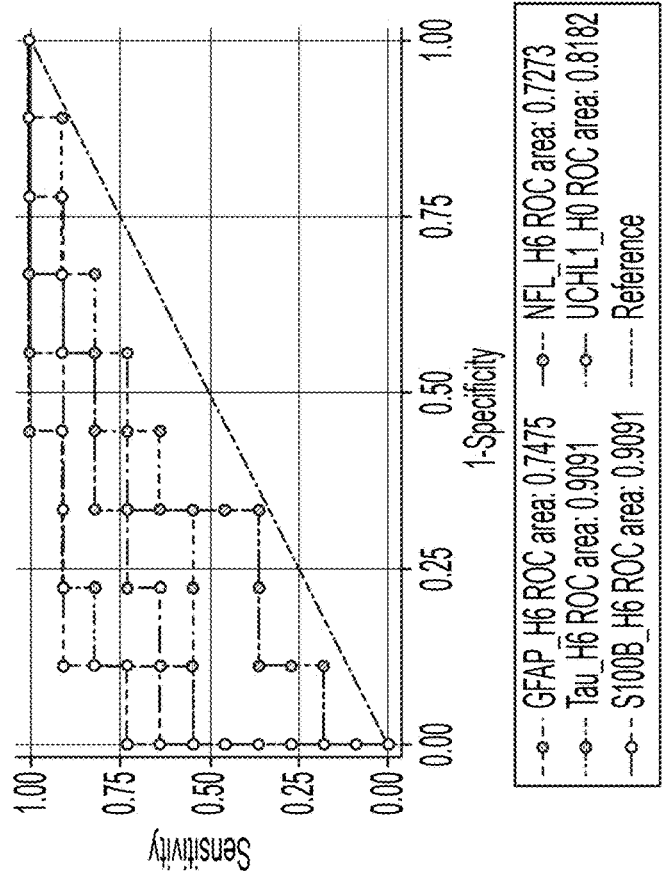
Figure 17A:
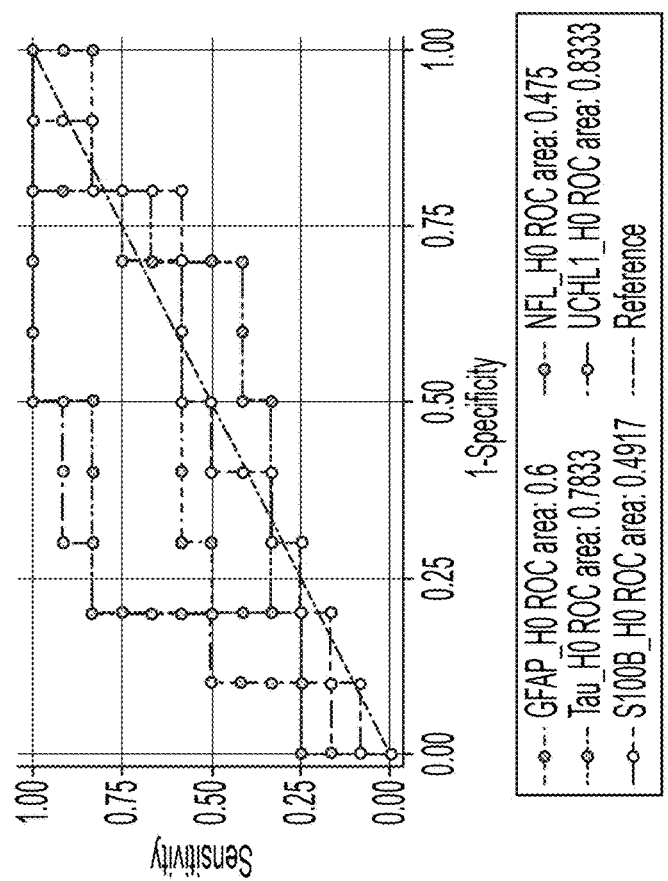
Figure 17D:
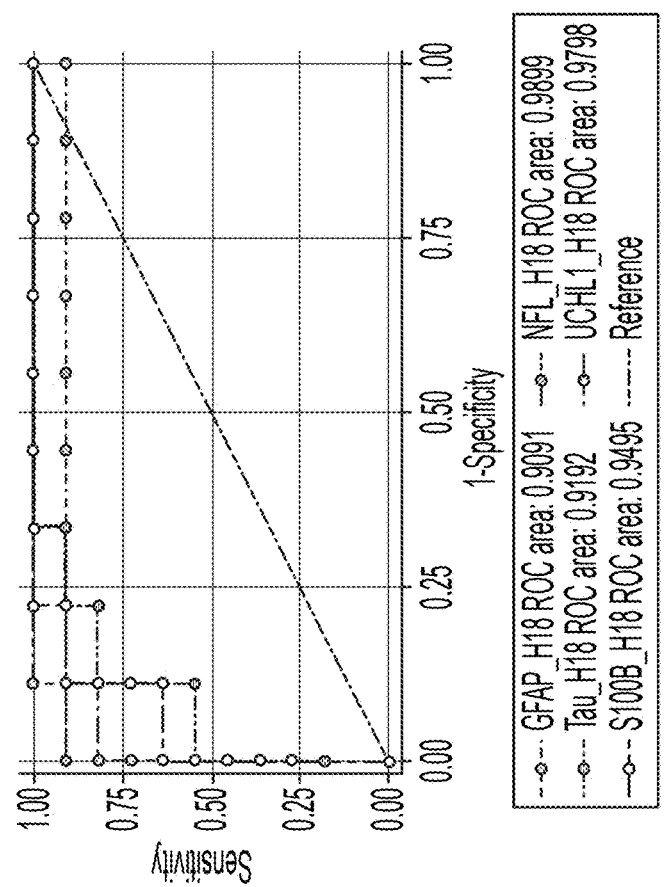
Figure 17C:
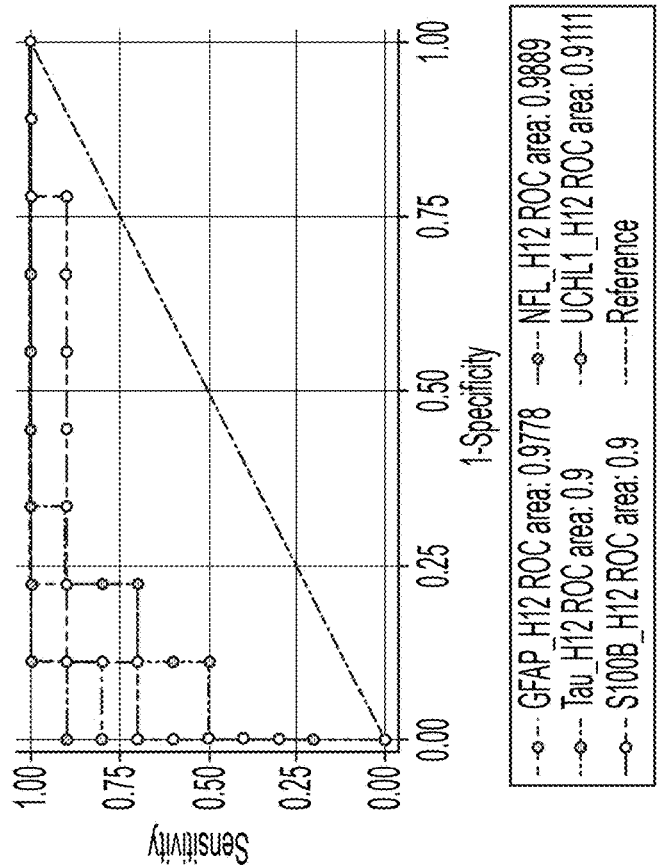
Figures 17E, 17F:
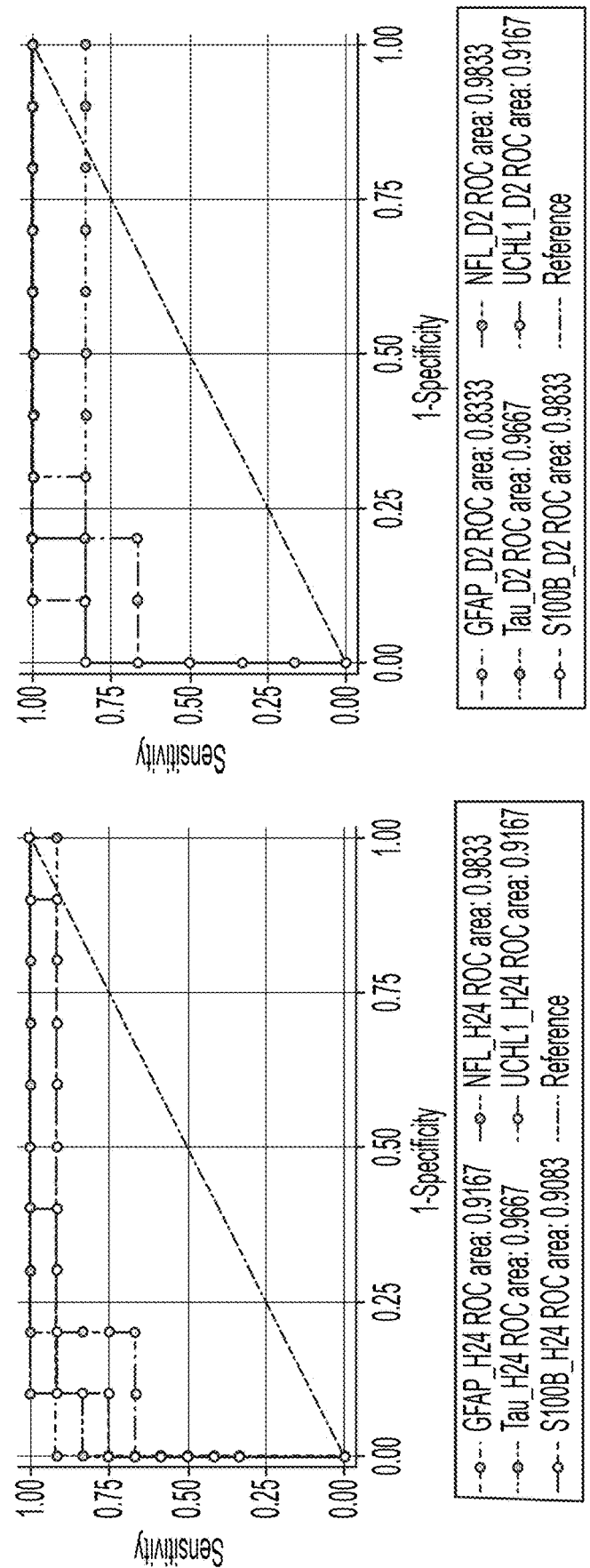
Figure 17G:
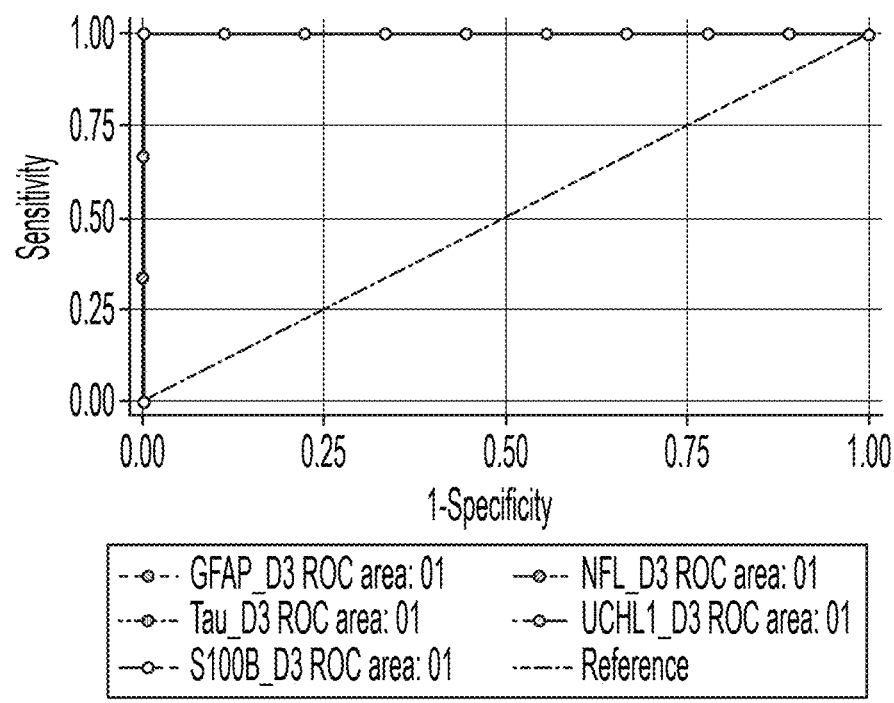

Trajectory Analysis of Neurologic Outcome:

Based on machine-learning, two groups with the best fit membership for low trajectory (Class 1) and high trajectory (Class 2) marker score data were developed. FIG. 16(a)-(f) depicts low and high trajectory groups for 5 individual biomarkers and the 4-marker composite score (formed using values for UCH-L1, GFAP, Tau and NF-L). The percent membership for high trajectory class range from 38.9% for GFAP score to 55.6% for the four-marker score. Concordance of four-marker score trajectory group membership in independently predicting patient outcome is shown in FIG. 16(g)-(h). Excluding a separate fatal cardiac arrest, identical results were obtained at 6 months. The odds ratio for poor outcome being in the composite low trajectory class is 0.0525 (95% CI: 0.0029 to 0.9719; z statistics 1.979, p=0.0478). The two classes' respective biomarker median and interquartile range concentrations over time are shown in FIG. 18(a)-(e). Earliest significant class differences in biomarkers levels are shown at H0 for Tau and UCH-L1, H6 for GFAP and S100B, and H12 for NFL.

DISCUSSION

In the pilot study of biomarker pharmacodynamics in predicting neurological outcome after OHCA provided in the above examples, the data supports the hypothesis that ultra-early and serial measurement of serum biomarkers of brain injury is both feasible and of neuroprognostic significance.

In individual biomarkers' serial measurement, two patterns became apparent. In OHCA patients with good neurologic outcome, GFAP and NF-L remained at baseline, whereas poor outcome patients' GFAP and NF-L levels rose over several orders of magnitude to become significantly different by H12. This suggests early elevations in GFAP and NF-L portend poor prognosis (death or functional dependence), while unchanging concentrations suggest good prognosis (independent state). In contrast, both good and poor outcome patients' UCH-L1, Tau, and S100B concentrations became immediately elevated (H0; 0-59 minutes) relative to control baseline regardless of ultimate degree of injury. However, good outcome patients' UCH-L1, Tau, and S100B levels trended downward shortly thereafter, while biomarker levels in the poor outcome group remained elevated. This divergence resulted in statistically significant difference between good and poor outcome groups at H0 for Tau and UCH-L1, and H6 in S100B (p<0.05). Thus, for these biomarkers a downward trend suggested good outcome, while stable or further increasing levels forecast poor prognosis and may reflect ongoing secondary brain injury.

Though individual biomarkers reached thresholds for 100% specificity for poor neurologic outcome as early as 6-12 hours (Tau and UCH-L1), time to concurrent maximal (100%) sensitivity and specificity was delayed until D3. Furthermore, the clinical utility of individual biomarker levels was constrained by outliers as demonstrated by substantial within-biomarker variability and range overlap between good and poor outcome patients. The combination of multiple biomarker derangements into a single, objective score mitigated this variability, and allowed the summation of various biomarkers to provide separation of good from poor outcome. One notable deviation from the overall pattern of biomarker trajectory was in the case of a subject in the poor outcome group with relatively low absolute biomarker concentrations and low trajectory changes, and yet ultimately had WLST for non-neurological medical futility. This will be further discussed in the study limitations.

The hypothesis that serial serum concentrations of neuronal and astroglial proteins could be used to prognosticate neurologic outcome was further tested using trajectory analyses and machine learning. Independent of information regarding patient outcome, trajectory analysis sorted patient biomarker data into two distinct classes, i.e. low and high trajectory groups with high concordance between trajectory group and neurologic outcome.

Neuroprognostic uncertainty after OHCA may lead to overly aggressive care despite medical futility or inappropriate WLST despite possible meaningful recovery; both can be avoided by accurate outcome prediction. Clinicians may become discouraged by early subjective indications of poor neurologic outcome, and patients' surrogate decision-makers choose early WLST in the belief that the patient would not want prolonged dependence upon life support in a neurologically devastated condition. Furthermore, despite guidelines and studies that suggest that delayed awakening (>72 hours from ROSC) is not uncommon,[19,22,23] it is estimated that in the United States alone, 1,500 patients per year who would have survived with a favorable neurological outcome die due to inappropriate early WLST.[24] Early, objective, quantifiable, and reliable prediction tools are of paramount importance for patients' post-OHCA surrogate decision-makers. Serial measurement and combined analyses of biomarkers of brain injury are promising avenues in neuroprognostication. Future large-scale studies are needed to validate this approach.

TABLE 6

Characteristics of control, good-, and poor-neurological outcome patients.

| Characteristics | Control (n = 10) | Poor Outcome (n = 12) | Good Outcome (n = 10) | p-value |
|---|---|---|---|---|
| Age in years, mean (SD)* | 58.3 (18.22) | 64.58 (14.10) | 55.56 (14.37) | 0.620 |
| Male sex, n (%)* | 6 (60.0) | 8 (66.67) | 7 (70.0) | 0.891 |
| Race, n (%)* | | | | |
| African American | 2 (20.0) | 2 (16.67) | 1 (10.0) | 0.821 |
| White | 8 (80.0) | 10 (83.33) | 9 (90.0) | |
| Cardiac Arrest Type, n (%) | | | | 0.005 |
| Asystole | | 5 (41.67) | 0 | |
| PEA | | 5 (41.67) | 2 (20.0) | |
| VF/VT | | 2 (16.67) | 8 (80.0) | |
| Witnessed, Yes, n (%) | | 10 (83.33) | 9 (90.0) | 0.650 |
| TTM, Yes, n (%) | | 8(90.0) | 8 (100.0) | 0.598 |
| Downtime (minutes), mean (SD) | | 42,54 (25.37) | 21.00 (12,39) | 0.025 |

Note:
p-values are calculated from Chi-square/Fishers test for categorical variables and the student-t or ANOVA test for continuous variables.
*comparing across control vs. poor vs. good outcomes

TABLE 7

Median and interquartile range (IQR) of biomarkers in control, good outcome, and poor outcome patients.

| Biomarkers | Time | Control (N = 10) | | Good Outcome (N = 10) | | Poor Outcome (N = 12) | | p-value |
|---|---|---|---|---|---|---|---|---|
| | | Median | IQR | Median | IQR | Median | IQR | |
| GFAP, pg/ml | H0 | 215.06 | (144.96-296.29) | 475.73 | (323.26-699.31) | 706.75 | (309.67-1154.47) | 0.429 |
| | H6 | 261.08 | (181.21-785.66) | 180.82 | (150.40-397.99) | 1319.62 | (188.45-6321.33) | 0.063 |
| | H12 | 246.2 | (227.27-622.97) | 425.13 | (370.36-630.63) | 5953.82 | (1712.48-65054.99) | <0.001 |
| | H18 | 280.76 | (255.24-450.88) | 349.02 | (304.87-524.23) | 5791.62 | (1715.54-124839.94) | 0.002 |
| | H24 | 202.22 | (173.64-382.03) | 364.61 | (255.03-543.67) | 9354.88 | (3404.67-222350.10) | 0.001 |
| | D2 | 199.92 | (199.92-199.92) | 389.37 | (184.23-699.26) | 5280.79 | (4501.07-381018.12) | 0.015 |
| | D3 | 459.92 | (459.92-459.92) | 428.76 | (180.76-563.87) | 9613.2 | (3019.78-15442.31) | 0.013 |
| | D4 | NA | NA | 318.68 | (235.58-356.31) | 8078.98 | (8078.98-8078.98) | 0.117 |
| | D5 | NA | NA | 392.9 | (234.47-532.33) | 16176.08 | (16176.08-16176.08) | 0.134 |
| | D6 | NA | NA | 337.92 | (305.07-614.60) | 20087.61 | (7491.97-32683.25) | 0.053 |
| NFL, pg/ml | H0 | 71.34 | (32.13-74.92) | 80.25 | (54.15-112.07) | 60.93 | (44.74-134.27) | 0.083 |
| | H6 | 64.35 | (39.04-68.58) | 47.46 | (31.58-82.21) | 61.26 | (56.66-181.34) | 0.087 |
| | H12 | 78.67 | (78.67-78.86) | 63.93 | (40.63-68.47) | 897.64 | (347.96-1990.68) | <0.001 |
| | H18 | 81.96 | (54.53-86.78) | 56.2 | (41.30-62.93) | 2825.08 | (894.85-5942.75) | <0.001 |
| | H24 | 78.49 | (65.86-85.29) | 61.96 | (59.82-65.32) | 5800.96 | (2634.46-12326.59) | <0.001 |
| | D2 | 95.1 | (95.1-95.1) | 62.22 | (58.10-86.99) | 15055.49 | (5237.03-112892.93) | <0.001 |
| | D3 | 91.36 | (91.36-91.36) | 73.03 | (65.63-121.16) | 17090.62 | (16859.09-112892.93) | 0.013 |
| | D4 | NA | NA | 80.70x | (65.63-121.16) | 7013.71 | (7013.71-7013.71) | 0.117 |
| | D5 | NA | NA | 124.76 | (87.50-140.50) | 7313.98 | (7313.98-7313.98) | 0.134 |
| | D6 | NA | NA | 172.22 | (135.94-187.27) | 8832.18 | (5651.63-12012.74) | 0.053 |
| Tau, pg/ml | H0 | 1.8 | (0.95-4.6) | 30.94 | (7.96-51.02) | 124.24 | (53.41-238.08) | 0.025 |
| | H6 | 1.79 | (0.99-2.86) | 5.3 | (1.94-12.52) | 31.61 | (15.84-255.13) | 0.002 |
| | H12 | 1.34 | (1.34-3.49) | 7.49 | (4.07-16.90) | 94.27 | (27.71-383.89) | 0.003 |
| | H18 | 3.43 | (1.44-4.88) | 8.67 | (3.15-16.25) | 74.1 | (21.13-270.37) | 0.002 |
| | H24 | 2.6 | (0.49-5.56) | 5.97 | (3.05-13.60) | 82.4 | (28.10-780.32) | <0.001 |
| | D2 | 1.86 | (1.86-1.86) | 4.19 | (2.75-7.74) | 576.33 | (87.75-2096.77) | 0.001 |
| | D3 | 0.82 | (0.82-0.82) | 3.73 | (3.01-4.69) | 399.19 | (206.51-568.61) | 0.013 |
| | D4 | NA | NA | 5.83 | (3.29-6.07) | 251.26 | (251.26-251.26) | 0.117 |
| | D5 | NA | NA | 4.12 | (1.93-4.69) | 139.07 | (139.07-139.07) | 0.134 |
| | D6 | NA | NA | 2.58 | (1.83-9.73) | 263.48 | (206.33-320.63) | 0.053 |

TABLE 7-continued

Median and interquartile range (IQR) of biomarkers in control, good outcome, and poor outcome patients.

| | | Control (N = 10) | | Good Outcome (N = 10) | | Poor Outcome (N = 12) | | |
|---|---|---|---|---|---|---|---|---|
| Biomarkers | Time | Median | IQR | Median | IQR | Median | IQR | p-value |
| UCH-L1, pg/ml | H0 | 56.89 | (20.65-153.33) | 897.5 | (374.63-1600.47) | 2475.55 | (1897.84-4098.17) | 0.008 |
| | H6 | 58.4 | (16.36-85.02) | 768.43 | (243.91-890.77) | 1065.87 | (508.61-3682.32) | 0.017 |
| | H12 | 95.88 | (95.88-146.36) | 417.51 | (383.70-447.47) | 1986.74 | (1312.73-10266.91) | 0.003 |
| | H18 | 44.24 | (38.29-76.8) | 231.65 | (210.55-369.78) | 1865.43 | (684.22-9786.68) | <0.001 |
| | H24 | 139.19 | (77.42-178.8) | 263.92 | (152.23-521.12) | 3570.71 | (670.95-23532.97) | 0.001 |
| | D2 | 46.3 | (46.3-46.3) | 111.27 | (89.69-655.13) | 5069.67 | (823.03-32054.91) | 0.003 |
| | D3 | 79.3 | (79.3-79.3) | 77.53 | (58.82-188.82) | 3387.74 | (1228.08-7678.40) | 0.013 |
| | D4 | NA | NA | 136.56 | (84.57-248.09) | 2036.96 | (2036.96-2036.96) | 0.117 |
| | D5 | NA | NA | 175.22 | (114.79-471.94) | 1505.45 | (1505.45-1505.45) | 0.134 |
| | D6 | NA | NA | 242 | (134.46-691.14) | 1962.59 | (1888.39-2036.79) | 0.245 |
| S100B, pg/ml | H0 | 43.73 | (14.95-66.92) | 1946.7 | (1342.05-3126.59) | 2149.28 | (722.07-3369.95) | 0.947 |
| | H6 | 32.22 | (18.61-68.17) | 123.49 | (69.93-290.28) | 895.37 | (359.80-1199.08) | 0.002 |
| | H12 | 44.02 | (25.56-59.31) | 82.73 | (46.71-144.21) | 478.43 | (240.35-3393.20) | 0.003 |
| | H18 | 43 | (34.95-68.03) | 82.61 | (50.78-84.65) | 349.28 | (198.75-2864.77) | <0.001 |
| | H24 | 33.52 | (18.7-37.06) | 71.34 | (37.35-89.96) | 472.19 | (208.00-2999.26) | 0.001 |
| | D2 | 263.31 | (263.31-263.31) | 30.73 | (19.44-53.02) | 234.54 | (182.52-2993.97) | 0.002 |
| | D3 | 188.02 | (188.02-188.02) | 29.21 | (21.32-37.05) | 184.94 | (97.70-253.54) | 0.013 |
| | D4 | NA | NA | 25.05 | (18.70-48.62) | 19.63 | (19.63-19.63) | 0.601 |
| | D5 | NA | NA | 13.72 | (3.64-38.36) | 101.15 | (101.15-101.15) | 0.134 |
| | D6 | NA | NA | 14.37 | (1.70-38.79) | 123.44 | (66.05-180.84) | 0.121 |
| 4-marker composite | H0 | 100 | (100.00-100.00) | 100 | (100.00-100.00) | 100 | (100.00-100.00) | N/A |
| | H6 | 143.85 | (95.91-205.6) | 49.71 | (46.70-70.12) | 67.75 | (47.46-761.53) | 0.184 |
| | H12 | 206.79 | (193.76-284.47) | 78.03 | (52.03-111.25) | 749.4 | (198.46-4870.63) | 0.003 |
| | H18 | 121.18 | (104.63-526.48) | 60.59 | (47.59-102.10) | 1744.77 | (342.18-8637.14) | <0.001 |
| | H24 | 387.36 | (146.15-745.63) | 66.84 | (42.11-112.29) | 2559.3 | (860.80-16233.44) | <0.001 |
| | D2 | 271.4 | (271.4-271.4) | 73.07 | (38.34-106.66) | 7883.43 | (438.83-47797.76) | <0.001 |
| | D3 | 251.2 | (251.2-251.2) | 59.18 | (35.26-75.35) | 8894.74 | (3294.05-9872.45) | 0.0126 |
| | D4 | NA | NA | 50.69 | (32.10-79.43) | 3849.79 | (3849.79-3849.79) | 0.1172 |
| | D5 | NA | NA | 72.23 | (47.36-.91.85) | 4293.78 | (4293.78-4293.78) | 0.134 |
| | D6 | NA | NA | 70.74 | (58.57-103.10) | 3518.39 | (2942.15-4094.62) | 0.053 |

P-values compare good vs poor outcomes.

TABLE 8

ROC-derived cutoffs for 100 percent sensitivity and specificity of poor neurologic outcome.

| | GFAP | | | NFL | | | Tau | | | UCH-L1 | | | S100B | | | 4-Marker | | |
|---|---|---|---|---|---|---|---|---|---|---|---|---|---|---|---|---|---|---|
| Time point | Cutoff (pg/ml) | Sens (%) | Spec (%) | Cutoff (pg/ml) | Sens (%) | Spec (%) | Cutoff (pg/ml) | Sens (%) | Spec (%) | Cutoff (pg/ml) | Sens (%) | Spec (%) | Cutoff (pg/ml) | Sens (%) | Spec (%) | Cutoff (pg/ml) | Sens (%) | Spec (%) |
| H0 | — | — | — | — | — | — | 1479 | 8.33 | 100 | 4670 | 16.67 | 100 | — | — | — | — | — | — |
| H6 | — | — | — | — | — | — | 31.6 | 54.55 | 100 | 1031 | 63.64 | 100 | 509.37 | 72.73 | 100 | 141.3 | 45.45 | 100 |
| H12 | 1513 | 90 | 100 | 173.7 | 90 | 100 | 148.1 | 50 | 100 | 1312 | 80 | 100 | 396.97 | 70 | 100 | 569.7 | 70 | 100 |
| H18 | 1226 | 90.91 | 100 | 200.2 | 90.91 | 100 | 74.09 | 54.55 | 100 | 684.2 | 81.82 | 100 | 276.1 | 66.67 | 100 | 122.4 | 90.91 | 100 |
| H24 | 1500 | 91.67 | 100 | 2787 | 75 | 100 | 33.71 | 75 | 100 | 2488 | 66.67 | 100 | 239.9 | 75 | 100 | 605.73 | 91.67 | 100 |
| D2 | 4501 | 85.71 | 100 | 5237 | 85.71 | 100 | 87.75 | 85.71 | 100 | 3214 | 71.43 | 100 | 182.5 | 83.33 | 100 | 1438 | 85.71 | 100 |
| D3 | 3019 | 100 | 100 | 16859 | 100 | 100 | 399.1 | 33.33 | 100 | 1228 | 100 | 100 | 97.69 | 100 | 100 | 3294 | 100 | 100 |

Biomarker and 4 marker (UCH-L1, GFAP, Tau and NF-L) concentration cutoff values for 100% specificity for poor neurological outcome were derived.
100% specificity for poor outcome was reached as early as 6 hours for Tau and S100B, and at 12 hours for GFAP, NF-L, UCH-L1.
Furthermore, serum concentrations cutoffs with both 100% sensitivity as well as specificity for poor neurological outcomes were also noted for each biomarker.

4. Extensions, Modifications and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

REFERENCES

1. Virani S S, Alonso A, Benjamin E J, et al. Heart disease and stroke statistics—2020 update: a report from the American Heart Association. *Circulation.* 2020: E139-E596.
2. Reis C, Akyol O, Araujo C, et al. Pathophysiology and the monitoring methods for cardiac arrest associated brain injury. *International journal of molecular sciences.* 2017; 18 (1): 129.

3. Moulaert VRMP, Verbunt J A, van Heugten C M, Wade D T. Cognitive impairments in survivors of out-of-hospital cardiac arrest: a systematic review. *Resuscitation.* 2009; 80 (3): 297-305.
4. Buanes E A, Gramstad A, Søvig K K, et al. Cognitive function and health-related quality of life four years after cardiac arrest. *Resuscitation.* 2015; 89:13-18.
5. Steinbusch C V M, van Heugten C M, Rasquin S M C, Verbunt J A, Moulaert V R M. Cognitive impairments and subjective cognitive complaints after survival of cardiac arrest: a prospective longitudinal cohort study. *Resuscitation.* 2017; 120:132-137.
6. Sasson C, Rogers M A M, Dahl J, Kellermann A L. Predictors of survival from out-of-hospital cardiac arrest: a systematic review and meta-analysis. Circulation: Cardiovascular *Quality and Outcomes.* 2010; 3 (1): 63-81.
7. Kempton H, Vlok R, Thang C, Melhuish T, White L. Standard dose epinephrine versus placebo in out of hospital cardiac arrest: a systematic review and meta-analysis. *The American Journal of Emergency Medicine.* 2019; 37 (3): 511-517.
8. Zhou S E, Maciel C B, Ormseth C H, Beekman R, Gilmore E J, Greer D M. Distinct predictive values of current neuroprognostic guidelines in post-cardiac arrest patients. *Resuscitation.* 2019; 139:343-350.
9. Hong J Y, Lee D H, Oh J H, et al. Grey-white matter ratio measured using early unenhanced brain computed tomography shows no correlation with neurological outcomes in patients undergoing targeted temperature management after cardiac arrest. *Resuscitation.* 2019; 140:161-169.
10. Lee B K, Kim W Y, Shin J, et al. Prognostic value of gray matter to white matter ratio in hypoxic and non-hypoxic cardiac arrest with non-cardiac etiology. *The American journal of emergency medicine.* 2016; 34 (8): 1583-1588.
11. Gul S S, Huesgen K W, Wang K K, Mark K, Tyndall J A. Prognostic utility of neuroinjury biomarkers in post out-of-hospital cardiac arrest (OHCA) patient management. *Medical hypotheses.* 2017; 105:34-47.
12. Stammet P, Wagner D R, Gilson G, Devaux Y. Modeling serum level of s100ß and bispectral index to predict outcome after cardiac arrest. *Journal of the American College of Cardiology.* 2013; 62 (9): 851-858.
13. Stammet P, Collignon O, Hassager C, et al. Neuron-specific enolase as a predictor of death or poor neurological outcome after out-of-hospital cardiac arrest and targeted temperature management at 33 C and 36 C. *Journal of the American College of Cardiology.* 2015; 65 (19): 2104-2114.
14. Moseby-Knappe M, Mattsson N, Nielsen N, et al. Serum neurofilament light chain for prognosis of outcome after cardiac arrest. *JAMA neurology.* 2019; 76 (1): 64-71.
15. Wihersaari L, Ashton N J, Reinikainen M, et al. Neurofilament light as an outcome predictor after cardiac arrest: a post hoc analysis of the COMACARE trial. *Intensive care medicine.* 2020:1-10.
16. Ebner F, Moseby-Knappe M, Mattsson-Carlgren N, et al. Serum GFAP and UCH-L1 for the prediction of neurological outcome in comatose cardiac arrest patients. *Resuscitation.* 2020.
17. Cronberg T, Brizzi M, Liedholm L J, et al. Neurological prognostication after cardiac arrest—recommendations from the Swedish Resuscitation Council. *Resuscitation.* 2013; 84 (7): 867-872.
18. Stiell I G, Nesbitt L P, Nichol G, et al. Comparison of the Cerebral Performance Category score and the Health Utilities Index for survivors of cardiac arrest. *Annals of emergency medicine.* 2009; 53 (2): 241-248.
19. Dragancea I, Wise M P, Al-Subaie N, et al. Protocol-driven neurological prognostication and withdrawal of life-sustaining therapy after cardiac arrest and targeted temperature management. *Resuscitation.* 2017; 117:50-57.
20. Nagin D S, Jones B L, Passos V L, Tremblay R E. Group-based multi-trajectory modeling. *Statistical Methods in Medical Research.* 2018; 27 (7): 2015-2023.
21. Berger R P, Bazaco M C, Wagner A K, Kochanek P M, Fabio A. Trajectory analysis of serum biomarker concentrations facilitates outcome prediction after pediatric traumatic and hypoxemic brain injury. *Developmental neuroscience.* 2010; 32 (5-6): 396-405.
22. Rey A, Rossetti A O, Miroz J-P, Eckert P, Oddo M. Late awakening in survivors of postanoxic coma: early neurophysiologic predictors and association with ICU and long-term neurologic recovery. *Critical care medicine.* 2019; 47 (1): 85-92.
23. Paul M, Bougouin W, Geri G, et al. Delayed awakening after cardiac arrest: prevalence and risk factors in the Parisian registry. *Intensive care medicine.* 2016; 42 (7): 1128-1136.
24. Elmer J, Torres C, Aufderheide T P, et al. Association of early withdrawal of life-sustaining therapy for perceived neurological prognosis with mortality after cardiac arrest. *Resuscitation.* 2016; 102:127-135.
25. Mattsson N, Cullen N C, Andreasson U, Zetterberg H, Blennow K. Association between longitudinal plasma neurofilament light and neurodegeneration in patients with Alzheimer disease. *JAMA neurology.* 2019; 76 (7): 791-799.
26. Callaway C W, Donnino M W, Fink E L, et al. Part 8: post-cardiac arrest care: 2015 American Heart Association guidelines update for cardiopulmonary resuscitation and emergency cardiovascular care. *Circulation.* 2015; 132 (18_suppl_2): S465-S482.
27. Sandroni C, Cariou A, Cavallaro F, et al. Prognostication in comatose survivors of cardiac arrest: an advisory statement from the European Resuscitation Council and the European Society of Intensive Care Medicine. *Intensive care medicine.* 2014; 40 (12): 1816-1831.
28. Coppler P J, Elmer J, Calderon L, et al. Validation of the Pittsburgh Cardiac Arrest Category illness severity score. *Resuscitation.* 2015; 89:86-92.

What is claimed is:

1. A method of adjusting life support treatment of a patient following cardiac arrest, the method comprising:
   obtaining a first biological fluid sample selected from the group consisting of blood, serum, and plasma from the subject at a first time period after the cardiac arrest, the first time period comprising a time up to 1 hr following the cardiac arrest;
   providing life support treatment to the patient;
   determining a level of two or more neurological markers in the first biological fluid sample;
   obtaining at least one second biological fluid sample selected from the group consisting of blood, serum, and plasma from the subject at one or more subsequent time periods after the cardiac arrest, the one or more subsequent time periods comprising about 6 hr, about 12 hr, about 18 hr, about 24 hr and/or about 48 hr following the cardiac arrest;
   determining a level of the two or more neurological markers in the at least one second biological fluid sample;

obtaining, on a processor, a first data that indicates values for two or more neurological biomarkers in the first biological sample;

obtaining, on the processor, subsequent data that indicates values for the two or more neurological biomarkers in the at least one second biological sample; and determining, on the processor, third data that indicates a prediction of a neurological outcome of the patient during a treatment of the patient based on the first data and the subsequent data, prediction being a good neurological outcome or a bad neurological outcome;

and (i) continuing the life support treatment to the patient if the prediction is a good neurological outcome or (ii) stopping the life support treatment to the patient if the patient is a bad neurological outcome;

wherein the two or more neurological biomarkers comprise glial fibrillary acidic protein (GFAP), ubiquitin carboxyl terminal hydrolase L1 (UCHL1), tau, neurofilament light chain (NF-L) or Tau; and wherein the life support treatment comprises application of one or more of a feeding tube, total parenteral nutrition, mechanical ventilation, heart/lung bypass, urinary catheterization, dialysis, cardiopulmonary resuscitation or defibrillation.

2. The method of claim 1, wherein the determining the third data comprises determining one of a ratio or a difference for each neurological biomarker between the value of the neurological biomarker at the subsequent time and the value of the neurological biomarker at the first time and wherein the prediction is based on comparing the ratio or the difference with a threshold ratio or threshold difference.

3. The method of claim 1, wherein the determining the third data comprises:

determining, on the processor, a value of a score for each neurological biomarker based on a ratio of the value of the neurological biomarker at the subsequent time period to the value of the neurological biomarker at the first time period; and determining, on the processor, a value of a composite score for the two or more neurological biomarkers based on a sum of the value of the score for the two or more neurological biomarkers divided by a quantity of the two or more neurological biomarkers.

4. The method of claim 3, wherein the determining the third data further comprises comparing the value of the composite score with a value of a threshold composite score such that, optionally, a good neurological outcome is based on the value of the composite score being less than the value of the threshold composite score and a bad neurological outcome is based on the value of the composite score being greater than the value of the threshold composite score.

5. The method of claim 4, further comprising determining a model for predicting the neurological outcome of the patient, comprising:

obtaining, on the processor, preliminary first data for the values of the two or more neurological biomarkers at the first time period during treatment of a plurality of patients;

obtaining, on the processor, preliminary subsequent data for the values of the two or more neurological biomarkers at the subsequent time period during the treatment;

determining, on the processor, the value of the composite score for the two or more neurological biomarkers for the plurality of patients;

assigning, on the processor, a neurological outcome to each patient at the first time period and the subsequent time period; and determining, on the processor, the value of the threshold composite score such that the value of the composite score is less than the value of the threshold composite score for the patients with a good neurological outcome at the subsequent time period and the value of the composite score is greater than the value of the threshold composite score for the patients with a bad neurological outcome at the subsequent time period.

6. The method of claim 1, wherein first data and subsequent data is logarithmically transformed to obtain normal distribution.

7. The method of claim 1, further comprising, using the processor, standardizing a deviation of the subsequent data from the first data by dividing individual neurological biomarker values of the two or more neurological biomarkers at the subsequent time period by the respective individual neurological biomarker values at the first time period to generate a quotient and multiplying the quotient by a predetermined factor.

8. The method of claim 7, wherein the predetermined factor is 100.

9. The method of claim 7, further comprising generating, with the processor, a composite marker score at multiple subsequent time periods derived from the weighted sum of each neurological biomarker's deviations from the respective neurological biomarker value at the first time period.

10. The method of claim 1, wherein the two or more neurological biomarkers comprise four or more neurological biomarkers.

11. The method of claim 1, wherein the two or more neurological biomarkers comprise four or more of glial fibrillary acidic protein (GFAP), ubiquitin carboxyl terminal hydrolase L1 (UCHL1), tau, neurofilament light chain (NF-L) and Tau.

12. The method of claim 1, wherein the prediction is for a future time period that is after the subsequent time period, wherein at least one of:

the future third time period is a future discharge time period of the patient from a medical facility treating the patient; and the future third time period is a fixed time period up to 6 months after the cardiac arrest.

* * * * *